US009292145B2

(12) United States Patent
Berget et al.

(10) Patent No.: US 9,292,145 B2
(45) Date of Patent: Mar. 22, 2016

(54) MULTI-USER MULTI-TOUCH PROJECTED CAPACITANCE TOUCH SENSOR

(71) Applicant: ELO Touch Solutions, Inc., Milpitas, CA (US)

(72) Inventors: Damien Berget, Sunnyvale, CA (US); Kenneth Andrew Feehan, Belmont, CA (US); Paul Leonard Futter, Cary, NC (US); David Samuel Hecht, San Diego, CA (US); Joel Christopher Kent, Fremont, CA (US); Robert William Kitchin, Los Gatos, CA (US); Kenneth John North, San Carlos, CA (US); James Roney, Fremont, CA (US); Kyu-Tak Son, Mountain View, CA (US); Jung Verheiden, San Francisco, CA (US); Forrest Kim Wunderlich, El Granada, CA (US)

(73) Assignee: ELO Touch Solutions, Inc., Milpitas, CA (US)

( * ) Notice: Subject to any disclaimer, the term of this patent is extended or adjusted under 35 U.S.C. 154(b) by 69 days.

(21) Appl. No.: 14/322,605

(22) Filed: Jul. 2, 2014

(65) Prior Publication Data

US 2015/0009175 A1    Jan. 8, 2015

Related U.S. Application Data

(60) Provisional application No. 61/843,850, filed on Jul. 8, 2013.

(51) Int. Cl.
*G06F 3/044* (2006.01)
*G06F 3/041* (2006.01)

(52) U.S. Cl.
CPC .............. *G06F 3/044* (2013.01); *G06F 3/0418* (2013.01)

(58) Field of Classification Search
CPC ................................ G06F 3/044; G06F 3/0418
See application file for complete search history.

(56) References Cited

U.S. PATENT DOCUMENTS

| 8,525,799 | B1 * | 9/2013 | Grivna | G06F 3/0416 345/173 |
|---|---|---|---|---|
| 2007/0074913 | A1 | 4/2007 | Geaghan et al. | |
| 2008/0150906 | A1 * | 6/2008 | Grivna | G06F 3/0416 345/173 |
| 2009/0128516 | A1 * | 5/2009 | Rimon | G06F 3/0412 345/174 |

(Continued)

OTHER PUBLICATIONS

International Search Report and Written Opinion of the International Searching Authority directed to related International Patent Application No. PCT/US2014/045230, mailed Nov. 13, 2014; 12 pages.

*Primary Examiner* — Shaheda Abdin
(74) *Attorney, Agent, or Firm* — Sterne, Kessler, Goldstein & Fox P.L.L.C

(57) ABSTRACT

Techniques for providing multi-user multi-touch projected capacitive touch sensors are disclosed herein. Some embodiments may include a touch sensor including a touch substrate with a touch surface, a sensing array, and a controller. The sensing array may be configured to provide sense signals indicating a first touch and a second touch occurring concurrently on the touch surface of the touch substrate. The controller may be configured to receive the sense signals from the sensing array and based on the sense signals, determine whether the first touch and the second touch share at least one anti-ghost. In response to determining that the first touch and the second touch share the at least one anti-ghost, the controller may be configured associate the first touch and the second touch with a common touch entity, such as an individual person.

52 Claims, 45 Drawing Sheets

(56) References Cited

U.S. PATENT DOCUMENTS

| | | | |
|---|---|---|---|
| 2010/0051354 A1* | 3/2010 | Ningrat | G06F 3/044 178/18.06 |
| 2010/0096193 A1 | 4/2010 | Yilmaz et al. | |
| 2010/0245286 A1* | 9/2010 | Parker | G06F 3/0416 345/174 |
| 2010/0289769 A1* | 11/2010 | Watanabe | G06F 3/0418 345/174 |
| 2010/0328265 A1 | 12/2010 | Hotelling et al. | |
| 2011/0025638 A1 | 2/2011 | Salaverry et al. | |
| 2011/0221701 A1 | 9/2011 | Zhang et al. | |
| 2012/0146944 A1* | 6/2012 | Lee | G06F 3/0416 345/174 |

* cited by examiner

2806

2800

3500

3520

3540

3560

MULTI-USER MULTI-TOUCH PROJECTED CAPACITANCE TOUCH SENSOR

BACKGROUND OF THE INVENTION

1. Field of the Invention

Embodiments of the invention relate, generally, to touch sensors including multi-user multi-touch functionality.

2. Background Art

Projected capacitive touch (PCAP) technology uses electric fields from embedded electrodes projected through glass layers that are influenced by finger touches with the result of changes in measured capacitances. For example, at each "point" or intersection of embedded electrodes, a distinct mutual capacitance change due to touch activity can be measured or "addressed." PCAP touch sensors are currently found in portable devices such as smartphones, tablets, laptops, etc. and are configured to receive multiple concurrent touches from a single person to enable multi-touch functionality.

BRIEF SUMMARY OF THE INVENTION

Embodiments to improve touch sensors are described herein. Some embodiments may include a touch sensor including a touch substrate with a touch surface, a sensing array, and a controller. The sensing array may be configured to provide sense signals indicating a first touch and a second touch occurring concurrently on the touch surface of the touch substrate. The controller may be configured to receive the sense signals from the sensing array and based on the sense signals, determine whether the first touch and the second touch share at least one anti-ghost. In response to determining that the first touch and the second touch share the at least one anti-ghost, the controller may be configured associate the first touch and the second touch with a common touch entity, such as an individual person. Furthermore, in response to determining that the first touch and the second touch fail to share an anti-ghost, the controller may be configured to associate the first touch with a first touch entity and the second touch with a second touch entity different from the first touch entity.

Some embodiments may provide for a machine-implemented method. The method may include: receiving sense signals from a sensing array, the sensing array configured to provide the sense signals indicating a first touch and a second touch occurring concurrently on a touch surface of a touch substrate; based on the sense signal, determining whether the first touch and the second touch share at least one anti-ghost; and in response to determining that the first touch and the second touch share the at least one anti-ghost, associating the first touch and the second touch with a common touch entity. In some embodiments, the method may further include: in response to determining that the first touch and the second touch fail to share the at least one anti-ghost, associating the first touch with a first touch entity and the second touch with a second touch entity different from the first touch entity.

Some embodiments may include circuitry and/or media configured to implement the methods and/or other functionality discussed herein. For example, one or more processors, and/or other machine components may be configured to implement the functionality discussed herein based on instructions and/or other data stored in memory and/or other non-transitory computer readable media.

These as well as additional features, functions, and details of various embodiments are described below. Similarly, corresponding and additional embodiments are also described below.

BRIEF DESCRIPTION OF THE DRAWINGS/FIGURES

Having thus described various embodiments in general terms, reference will now be made to the accompanying drawings, which are not necessarily drawn to scale, and wherein:

FIG. 21 shows an example top electrode substrate layer of an XYUV sensing array in accordance with some embodiments;

DETAILED DESCRIPTION OF THE INVENTION

Embodiments will be described more fully hereinafter with reference to the accompanying drawings, in which some, but not all embodiments contemplated herein are shown. Indeed, various embodiments may be implemented in many different forms and should not be construed as limited to the embodiments set forth herein; rather, these embodiments are provided so that this disclosure will satisfy applicable legal requirements. Like numbers refer to like elements throughout.

Some embodiments may provide for a projected capacitive (PCAP) touch sensor that supports multi-touch functionality for multiple users at the same time. For multiple touches occurring concurrently, the touch sensor may be configured to determine touches that belong to a common touch entity and initiate a common touch entity interaction mode accordingly for those touches. The touch sensor may also determine that touches belong to different touch entities and may initiate a multi-touch entity interaction mode. For example, in the multi-touch entity interaction mode, multiple common touch entity interaction modes may be initiated for two or more users concurrently.

Figure 1:
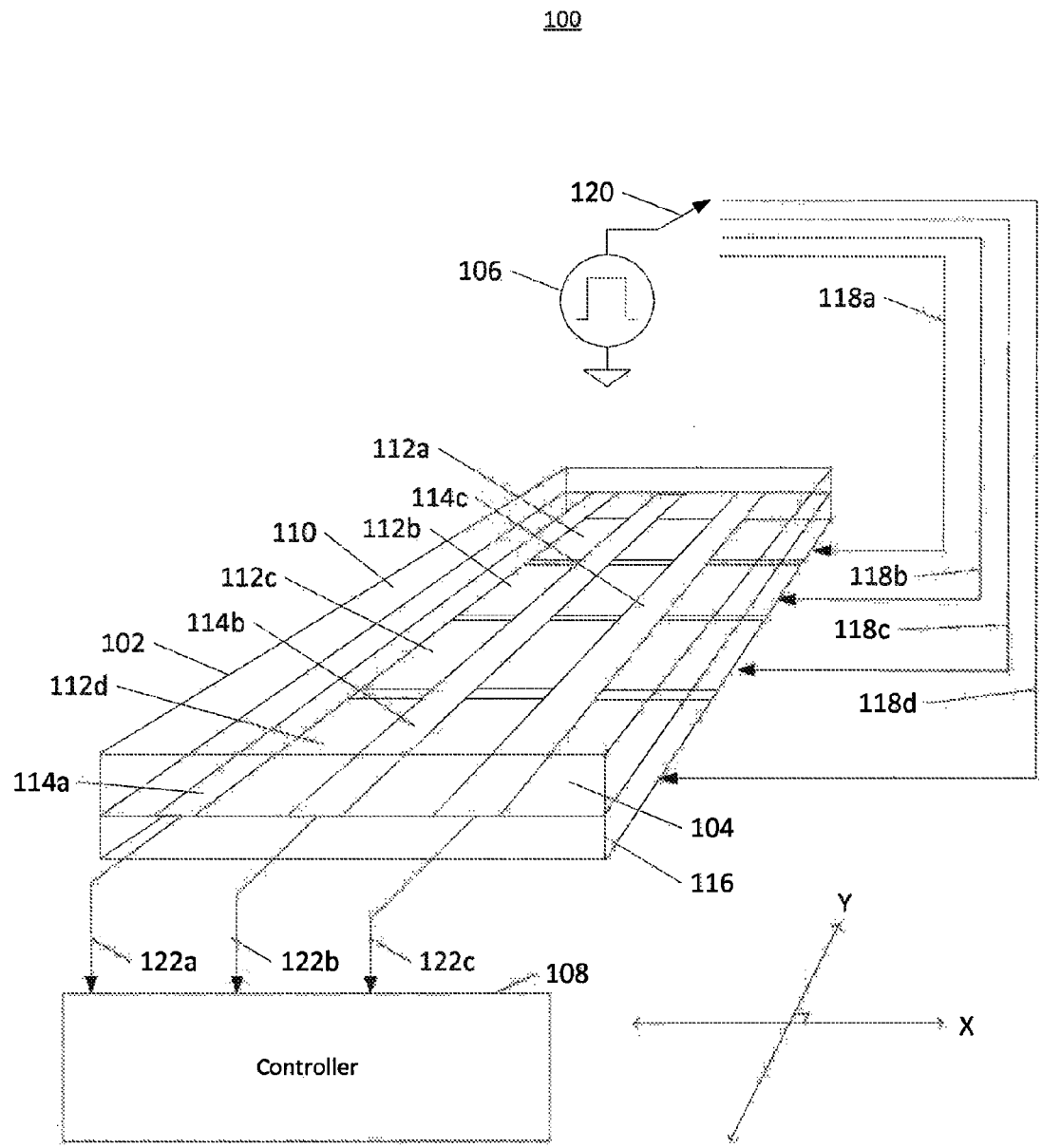
FIG. 1 shows an example touch sensor in accordance with some embodiments.

FIG. 1 shows an example projected capacitive touch sensor 100 ("touch sensor 100") in accordance with some embodiments. Touch sensor 100 may include touch substrate 102, sensing array 104, signal generator 106, and controller 108.

Figure 30:
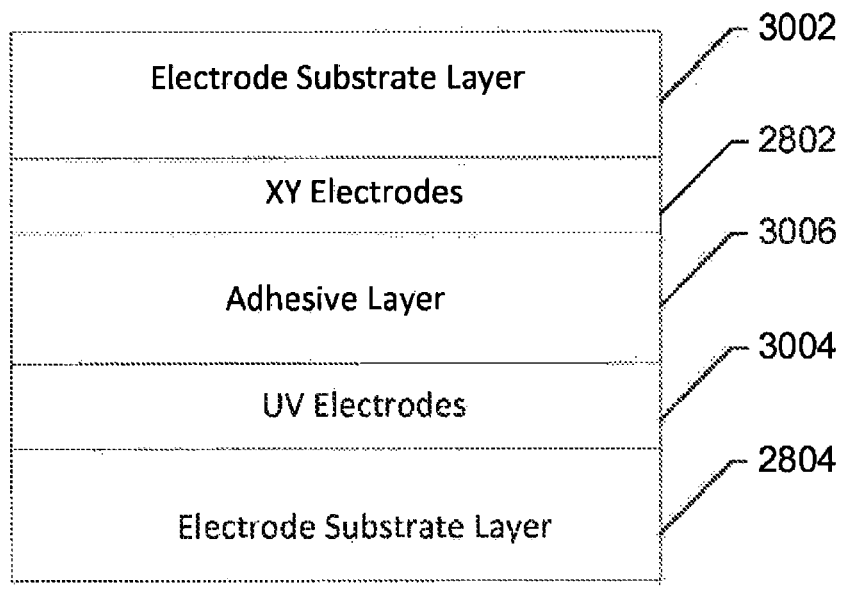
FIG. 30 shows an example cross sectional view of the XYUV sensing array shown in FIG. 28 in accordance with some embodiments.

Touch substrate 102 may be formed of optically transparent material(s), including a laminated stack of transparent materials (such as shown in FIG. 30), capable of propagating electromagnetic fields generated by sensing array 104. Touch substrate 102 may include touch surface 110 for receiving one or more touches (e.g., concurrently).

Sensing array 104 may define a plurality of sensing axes of touch sensor 100. For example, sensing array 104 may include X axis electrodes that define an X sensing axis and Y axis electrodes that define a Y sensing axis. The X and Y sensing axes are example reference axis that may be used for touch detection, although other (e.g., arbitrary) sensing axes may be used. In some embodiments, electrodes associated with a sensing axis may be oriented perpendicular to the sensing axis direction so that a signal associated with an electrode corresponds to a more-or-less well defined value of the sensing axis coordinate. Where two (e.g., perpendicular and/or otherwise intersecting) sensing axes are used, touch sensor 100 may be referred to herein as an "XY touch sensor." In various other embodiments, sensing array 104 may define more than two sensing axes, such as XYU (e.g., 3), XYUV (e.g., 4), or more sensing axes. Here "sensing" in "sensing axis" may refer to a reference axis for sensing touches and does not necessarily a connection with sensing (e.g., vs. drive) electronics.

Sensing array 104 may include Y axis electrodes 112a, 112b, 112c and 112d (sometimes referred to herein collectively as "electrodes 112") and X axis electrodes 114a, 114b and 114c (sometimes referred to herein collectively as "electrodes 114"). For example, each of electrodes 112 and 114 can be line-shaped electrodes that individually span across sensing axes. Other electrode shapes and arrangements may be used, some examples of which are discussed in greater detail below. In some embodiments, sensing array 104 may include one or more electrode substrate layers, such one or more layers of glass or a polymer material such as Polyethylene terephthalate (PET) (e.g., substrate layer 116), on which sensing array 104 may be formed (e.g., of indium tin oxide (ITO)). In FIG. 1, only a small number of electrodes 112 and 114 are shown to avoid unnecessarily overcomplicating the disclosure, although sensing array 104 may include more or less electrodes (e.g., depending on size, touch resolution, etc. of the touch sensor).

Sensing array 104 may be configured to provide sense signals indicating one or more touches, such as to controller 108 and/or other sense electronics. Sensing array 104 may be configured to receive input signals from signal generator 106, which in various embodiments, may be included within controller 108 and/or may be implemented in drive electronics separate from controller 108 (e.g., as shown in FIG. 1). For example, via control of selectable switch 120, signal generator 106 may be configured to selectively send the input signals via input lines 118a, 118b, 118c and 118d to each of Y axis electrodes 112a, 112b, 112c and 112d, respectively. With reference to the shown embodiment, Y axis electrodes 112a, 112b, 112c and 112d may operate in a drive mode and be referred to as "drive electrodes."

Sensing array 104, via X axis electrodes 114, may be configured to generate sense signals for touch determination. For example, X axis electrodes 114a, 114b and 114c may be configured to send the sense signals to controller 108 and/or other sense electronics via output lines 122a, 122b and 122c. Here, X axis electrodes 114 may operate in a sense mode and be referred to as "sense electrodes." For example, X axis electrodes 114 may be conductively isolated from Y axis electrodes 112 such that a mutual capacitance may be formed between Y axis electrodes 112 and Y axis electrodes 114. Furthermore, upon receiving the input signals, Y axis electrodes 112 may configured to generate electromagnetic fields that propagate through touch substrate 102 and interact with one or more touches on touch surface 110 of touch substrate 102. In particular, a touch may cause a detected decrease in mutual capacitance between at least one drive electrode and at least one sense electrode that is present in the sense signals (e.g., as compared with a baseline mutual capacitance between drive and sense electrodes in the absence of a touch), which may be interpreted as a touch location controller 108.

Controller 108 may include circuitry (e.g., one or more processors) configured to execute firmware and/or software programs stored in one or more memory devices to perform the functionality disclosed herein for providing multi-user multi-touch functionality. In some embodiments, controller 108 may interface with a computer system, such as a personal computer, interactive digital signage, multi-user device (e.g., a multi-player gaming table), embedded system, kiosk, user terminal, and/or other machine as a human-to-machine interface device. The computer system may include a main controller with one or more processors configured to execute firmware and/or software programs stored in one or more memory devices. Via the execution of the pogroms, the computer system may generate a visual component (and/or display element) that is sent to a display device for display. The visual component may include a user interface that is operable using the touch sensor. In various embodiments, controller 108 may be implemented on separate or the same hardware as main controller.

Figure 2:
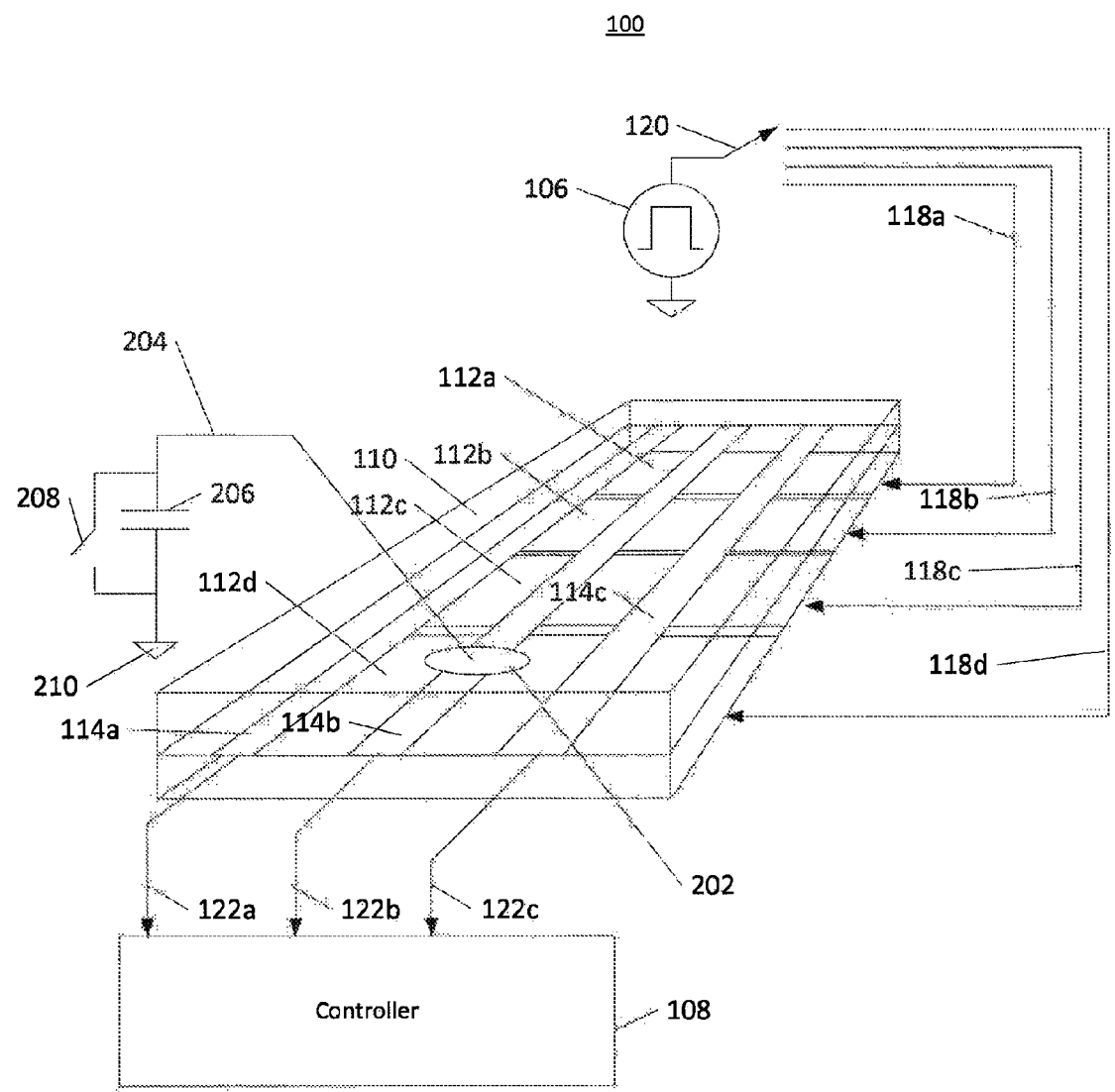
FIG. 2 shows an example touch sensor receiving a touch in accordance with some embodiments.

FIG. 2 shows an example touch sensor 100 including a touch in accordance with some embodiments. Touch sensor 100 (e.g., via touch surface 110) may be configured to detect one or more touches, such as touch 202. Touch 202 may be a detectable altering of the electrical properties of touch sensor 100, which may result from a touch entity, such as from a finger of a person, making contact with touch sensor 100. In some embodiments, touch 202 may be detected when a stylus or other pointing apparatus touches touch sensor 100. The touch entity is shown in FIG. 2 as being represented by touch entity circuit equivalent 204. Touch entity circuit equivalent 204 may include ground capacitor 206, ground switch 208 and ground 210. Generally, ground capacitor 206 may represent a capacitance between the touch entity and ground 210.

If the touch entity is a user standing in front of touch sensor 100, a contribution to the ground capacitor 206 may be from the proximity of the user's feet to a concrete pad under a floor with the soles of the user's shoes and a carpet on the floor acting as an insulating gap in the ground capacitor 206. The numerical value of capacitance of ground capacitor 206 may vary. For example, if the touch entity is a user who initially is wearing thin soled shoes, and then switches to wearing thick platform shoes made of an insulating material, the numerical value of capacitance of ground capacitor 206 will decrease. When the touch entity is thoroughly grounded (e.g., standing in a puddle of water and/or wearing a grounded anti-static wrist strap), there is a direct connection to ground that may be represented by a closed switch 208.

Figure 3:
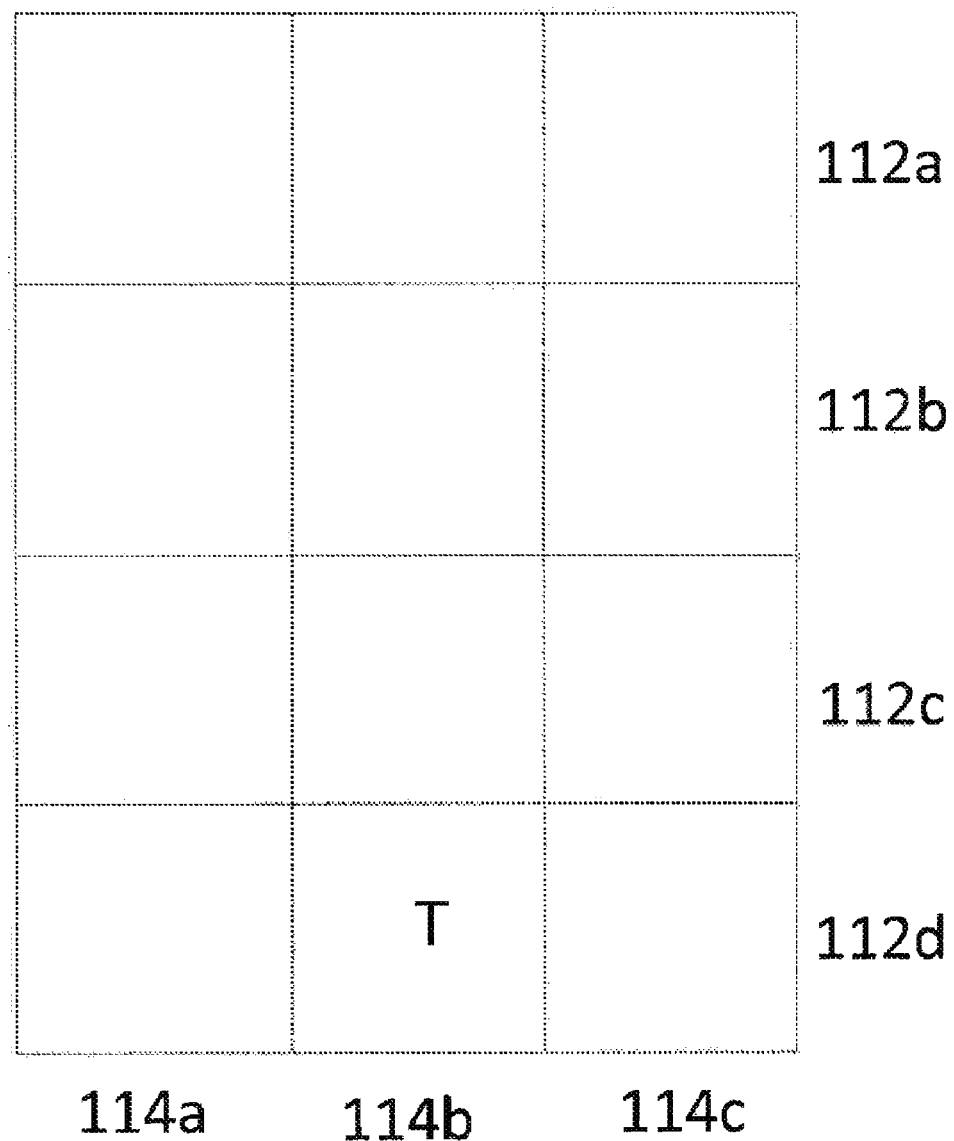
FIG. 3 shows an example sense signal data matrix including a touch in accordance with some embodiments.

FIG. 3 shows an example sense signal data matrix 300 in accordance with some embodiments. In some embodiments, touch sensor 100 may be configured to operate sensing cycles for touch detection. Within a sensing cycle, sense signals may be generated that include sense signal data represented by sense signal data matrix 300. In this example, a sensing cycle may represent a "snapshot" of touch activity on touch sensor 100 within a finite duration of time that may appear instantaneous to the touch entity.

With reference to FIGS. 2 and 3, during a sensing cycle, sense electrodes 114a, 114b and 114c may be placed in the sense mode for generating the sense signals. Each drive electrode may selectively (e.g., via switch 120) receive input signals from signal generator 106. For example, drive electrode 112a may receive the input signal via input line 118a and drive electrodes 112b, 112c and 112d may be inactivated (e.g., not being driven with an input signal). Mutual capacitances between drive electrode 112a and each of sense electrodes 114a, 114b and 114c may be represented in sense signals and sent to controller 108 via output lines 122a, 122b and 122c, respectively. Because there is no touch on touch surface 110 corresponding with the location of drive electrode 112a (e.g., touch 202 is at a location corresponding only with drive electrode 118d), each of the sense signals on output lines 122a, 122b and 122c may represent the baseline mutual capacitance, as shown by blank entries 122a-114a, 122a-114b and 122a-114c within sense signal data matrix 300.

During the same sensing cycle, drive electrode 112b may next receive the input signal via input line 118b and drive electrodes 112a, 112c and 112d may be inactivated. Mutual capacitances between drive electrode 112b and each of sense electrodes 114a, 114b and 114c may be represented in sense signals and sent to controller 108 via output lines 122a, 122b and 122c, respectively. Because there is no touch on touch surface 110 corresponding with the location of drive electrode 112b, each of the sense signals on output lines 122a, 122b and 122c may represent the baseline mutual capacitance, as shown by blank entries 122b-114a, 122b-114b and 122b-114c within sense signal data matrix 300.

During the same sensing cycle, drive electrode 112c may next receive the input signal via input line 118c and drive electrodes 112a, 112b and 112d may be inactivated. Mutual capacitances between drive electrode 112c and each of sense electrodes 114a, 114b and 114c may be represented in sense signals and sent to controller 108 via output lines 122a, 122b and 122c, respectively. Because there is no touch on touch surface 110 corresponding with the location of drive elect ode 112c, each of the sense signals on output lines 122a, 122b and 122c may represent the baseline mutual capacitance, as shown by blank entries 122c-114a, 122c-114b and 122c-114c within sense signal data matrix 300.

During the same sensing cycle, drive electrode 112d may next receive the input signal via input line 118d and drive electrodes 112a, 112b and 112c may be inactivated. Mutual capacitances between drive electrode 112d and each of sense electrodes 114a, 114b and 114c may be represented in sense signals and sent to controller 108 via output lines 122a, 122b and 122c, respectively. Because touch 202 is present on the portion of touch surface 110 corresponding with the location of drive electrode 112d and sense electrode 114b, the sense signals on output line 122b may represent a mutual capacitance that is less than the baseline mutual capacitance, as shown by "T" entry 112d-114b within sense signal data matrix 300. For example, touch entity circuit equivalent 208 may act as an extension of drive electrode 112c that pulls some of the electrical energy from sensing array 104 to ground 210, thereby decreasing mutual capacitance between drive electrode 112c and sense electrode 112b from the baseline mutual capacitance. Because touch 202 is not present on touch surface 110 at locations corresponding with sense electrodes 114a and 114c, each of the sense signals on output lines 122a and 122c may represent the baseline mutual capacitance, as shown by blank entries 112d-114a and 112d-114c within sense signal data matrix 300. Depending on sensing array design, a touch, such as touch 202, may result in multiple non-zero entries such as weak signals in entries 112d-114a, 112c-114b and 112d-114c as well as a strong touch signal in entry 112d-114b. In some embodiments, such secondary weaker signals may be used to provide greater precision in touch location determinations. Nevertheless, for clarity of presentation, such weak secondary signals are neglected in FIG. 3 (and similar FIGS. 5 and 7).

Figure 4:
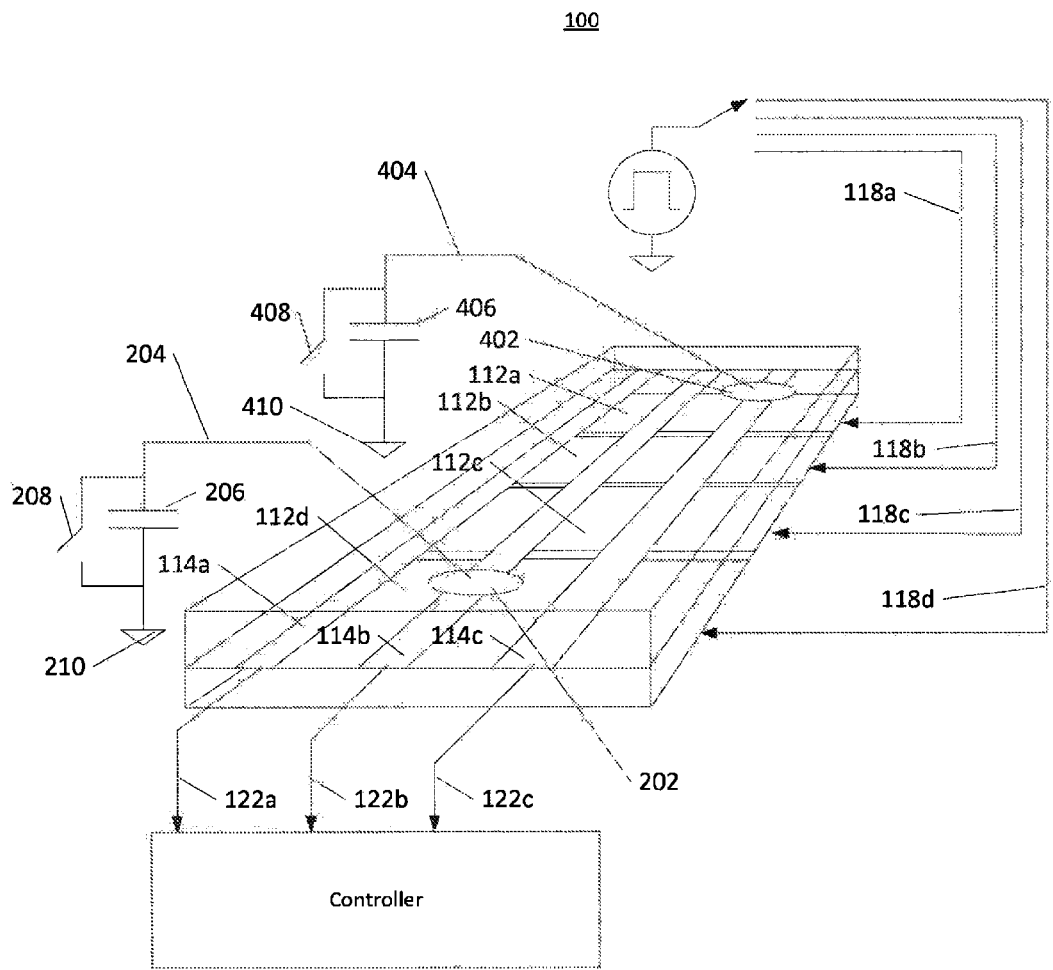
FIG. 4 shows an example touch sensor receiving two touches in accordance with some embodiments.

FIG. 4 shows an example touch sensor 100 including two touches from different touch entities in accordance with some embodiments. Touch 202 may be generated by a first touch entity that is the same touch entity as discussed above and shown in FIG. 2. Touch 402 may be generated by a second touch entity different from the touch entity that generated touch 202. For example, touch 202 may be generated by a finger of a first person and touch 402 may be generated by a finger of a second person. As such, touch 402 is shown in FIG. 4 as represented by touch entity circuit equivalent 404 including ground capacitor 406, ground switch 408, and ground 410. Touch 202 and 402 may be generated from different touch entities that are not touching each other or otherwise in electrically conductive contact, except perhaps with a common ground via grounds 210 and 410. The discussion above regarding touch entity circuit equivalent 204 may be applicable to touch entity circuit equivalent 204.

Figure 5:
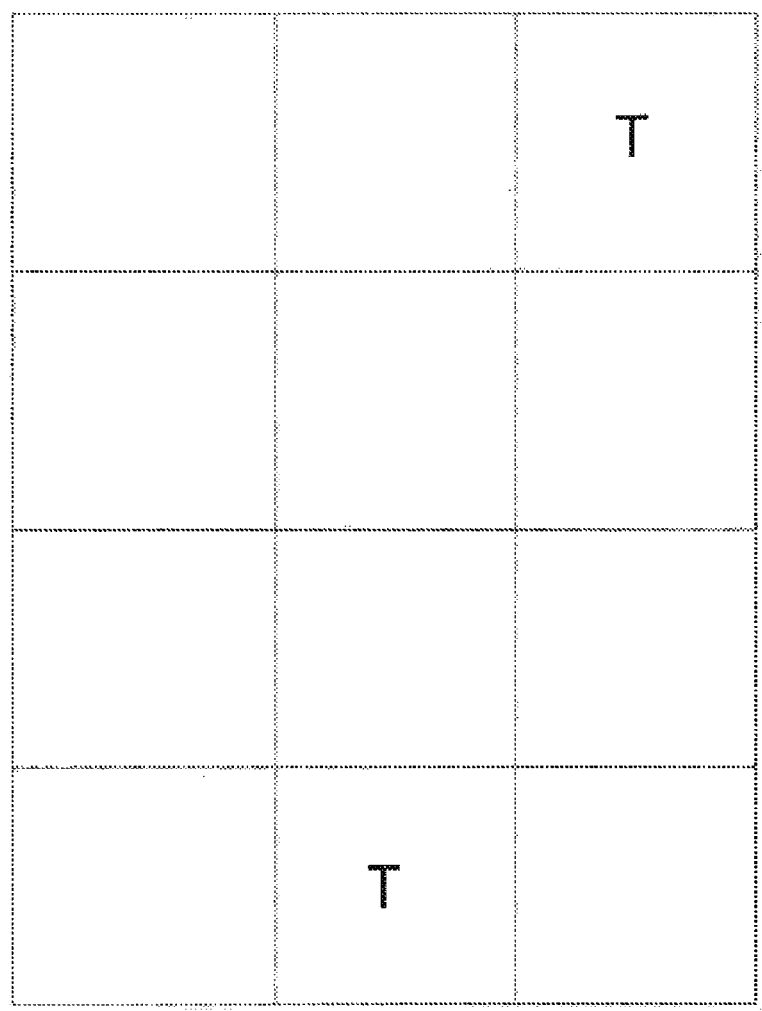
FIG. 5 shows an example sense signal data matrix including two touches in accordance with some embodiments.

FIG. 5 shows an example sense signal data matrix 500 in accordance with some embodiments. Within a sensing cycle, sense signals may be generated that include sense signal data represented by sense signal data matrix 500. For example, because touch 402 is also present on touch surface 110 corresponding with the location of drive electrode 112a and sense electrode 114c, the sense signals on output line 122c may represent a mutual capacitance that differs from (e.g., is less than) the baseline mutual capacitance, as shown by "T" entry 112a-114c within sense signal data matrix 300. As such, one or more (e.g., concurrent) touches may be detected by touch sensor 100, such as within the same sensing cycle.

Multi-User Multi-Touch Based on Anti-Ghosts

Figure 6:
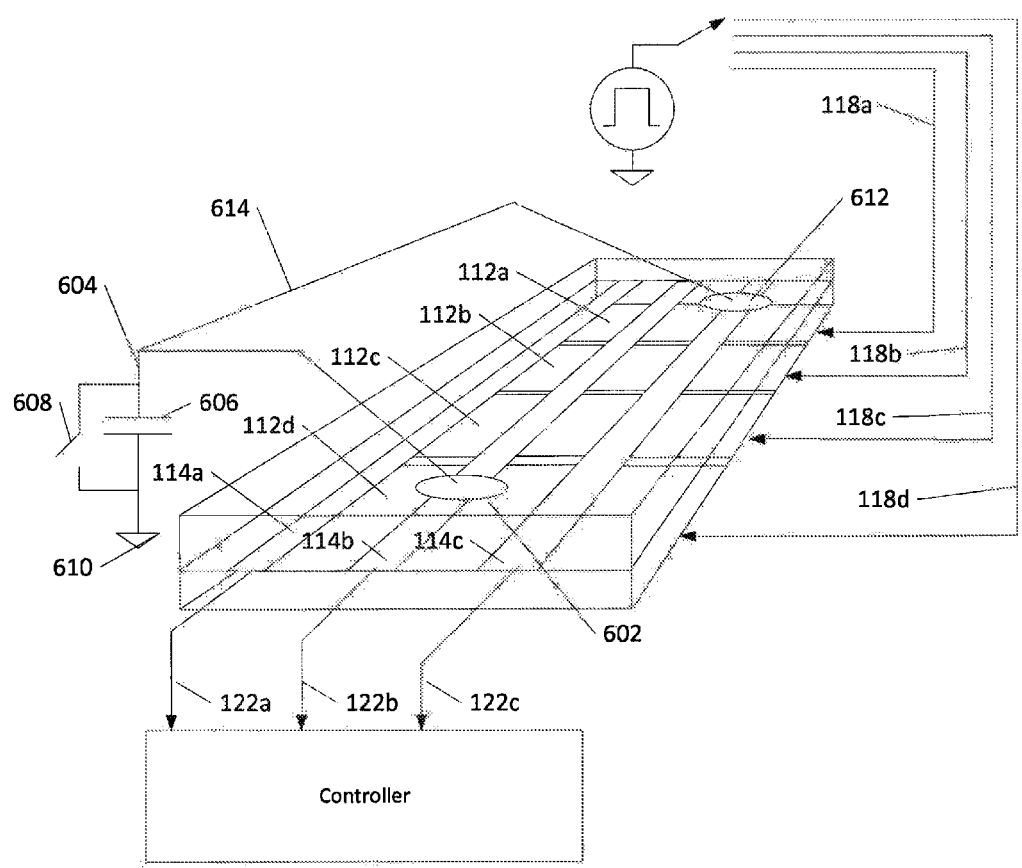
FIG. 6 shows an example touch sensor receiving two touches from a common touch entity in accordance with some embodiments.

FIG. 6 shows an example touch sensor 100 including two touches from a common touch entity in accordance with some embodiments. As discussed in greater detail below, as a result of the design of the sensing array, touch 602 and touch 612 may share one or more anti-ghosts when generated from the common touch entity. For example, touch 602 and touch 612 may be determined to be associated with a common touch entity when touch 602 and touch 612 share at least one anti-ghost. Touch 602 and touch 612 would have been associated with different touch entities had an absence of a common anti-ghost been detected (e.g., as shown by the entries of sense signal data matrix 500).

A touch entity, as used herein, may refer to an individual person and/or two or more people in electrically conductive contact with each other. For example, touch 602 and touch 612 may be generated by a first finger and a second finger, respectively, of an individual person. In another example, touch 602 and touch 612 may be generated by a first finger of a first person and a second finger of a second person where the people are touching each other or otherwise in electrically conductive contact. In either case, the touch entity generating touches 602 and 612 may be represented by touch entity circuit equivalent 604. Touch entity equivalent circuit 604 may include ground capacitor 606, ground switch 608, connection 614, and ground 610. The discussion above regarding touch entity circuit equivalent 204 may be applicable to touch entity equivalent circuit 604. Furthermore, connection 614 may provide electrical conduction between touches 602 and 612 via the touch entity. For example, connection 614 may represent an electrical correction between a first finger (e.g., generating touch 602) and a second finger (e.g., generating touch 612) through the hand/body where the touch entity is an individual. In another example, connection 614 may represent an electrical connection between a finger of a first person and a finger of a second person through the bodies of the first and second people where the touch entity includes the first and second person.

Figure 7:
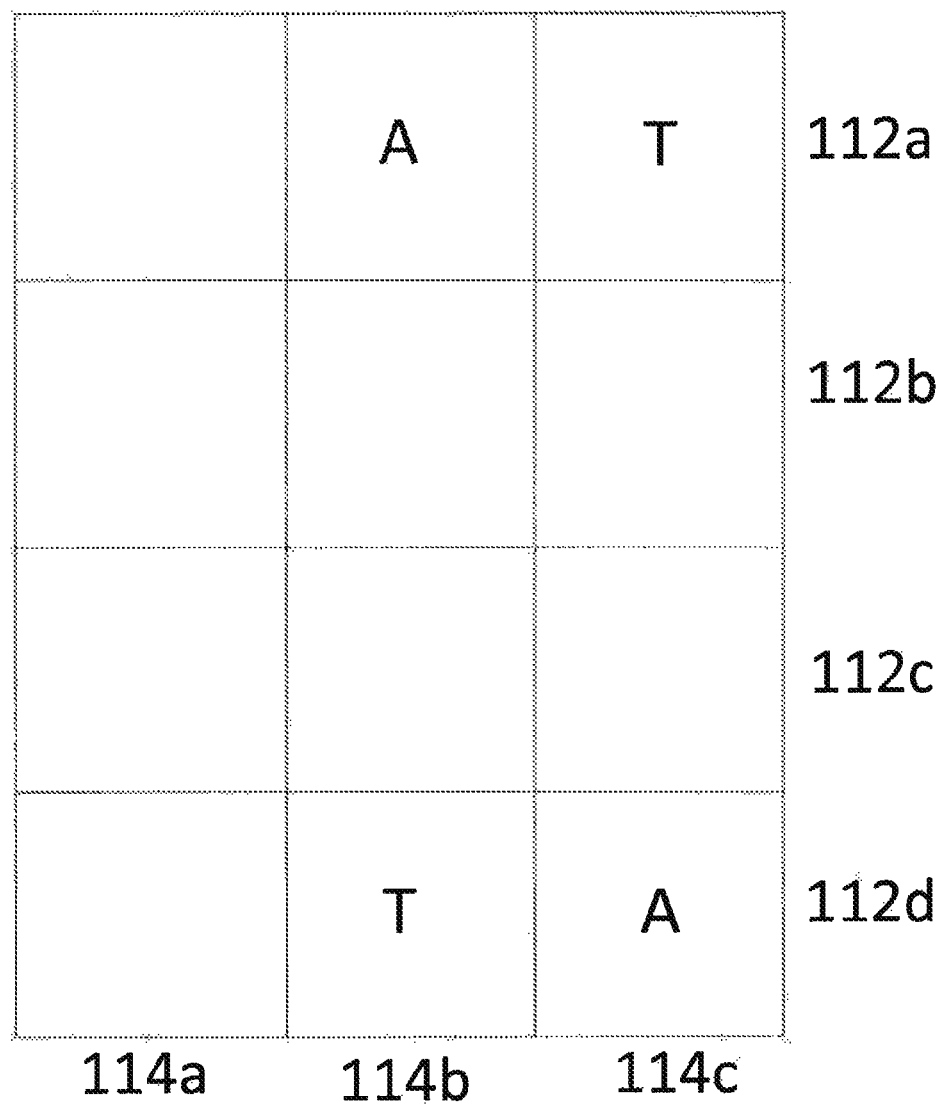
FIG. 7 shows an example sense signal data matrix receiving two touches from a common touch entity in accordance with some embodiments.

FIG. 7 shows an example sense signal data matrix 700 in accordance with some embodiments. Sense signal data matrix 700 may represent sensing signal data generated by touch sensor 100 in response to two touches from a common touch entity. With reference to FIGS. 6 and 7, a sensing cycle may be initiated similar to the sensing cycle described above with reference to FIGS. 2 and 3. For example, sense electrodes 114a, 114b and 114c may be placed in the sense mode for generating the sense signals. Drive electrode 112a may receive the input signal via input line 118a and drive electrodes 112b, 112c and 112d may be inactivated. Mutual capacitances between drive electrode 112a and each of sense electrodes 114a, 114b and 114c may be represented in sense signals and sent to controller 108 via output lines 122a, 122b and 122c, respectively. Because touch 612 is present on touch surface 110 corresponding with the location of drive electrode 112a and sense electrode 114c, the sense signals on output line 122c may represent a mutual capacitance that is less than the baseline mutual capacitance, as shown by "T" entry 112a-114c within sense signal data matrix 700. However, unlike in FIG. 4 (e.g., for separate touches 202 and 402), electrical energy may also flow from drive electrode 112a through the touch entity via connection 614 to sense electrode 114b (e.g., at touch 602), thereby increasing the mutual capacitance of sense electrode 114b from the baseline mutual capacitance. The increase in mutual capacitance caused by connection 614 may be determined to be an anti-ghost, as shown by "A" entry 112d-114b within sense signal data matrix 700. Note that there is physically no touch at the intersection of electrodes 112a and 114b, so the change in measured mutual capacitance at entry 112a-114b is an artifact or "ghost." The "anti" in the lexicon "anti-ghost" is chosen to highlight the fact that this signal artifact of increased measured mutual capacitance is opposite in algebraic sign from decreased mutual capacitance measured at true touch locations. In some embodiments, such as depending on design of sensing arrays, electronics, etc., anti-ghosts may be of decreased mutual capacitance while true touches may be of increased mutual capacitance.

During the same sensing cycle, drive electrode 112d may receive the input signal via input line 118d and drive electrodes 112a, 112b and 112c may be inactivated. Mutual capacitances between drive electrode 112d and each of sense electrodes 114a, 114b and 114c may be represented in sense signals and sent to controller 108 via output lines 122a, 122b and 122c, respectively. Because touch 602 is present on touch surface 110 corresponding with the location of drive electrode 112d and sense electrode 114b, the sense signals on output line 122b may represent a mutual capacitance that is less than the baseline mutual capacitance, as shown by "T" entry 112d-114b within sense signal data matrix 700. However, unlike in FIG. 4 (e.g., for separate touches 202 and 402), electrical energy may also flow through the touch entity via connection 614 to sense electrode 114c, thereby increasing the mutual capacitance of sense electrode 114c from the baseline mutual capacitance. The increase in mutual capacitance caused by connection 614 may be determined to be an anti-ghost, as shown by "A" entry 112d-114c within sense signal data matrix 700.

Figure 8A:
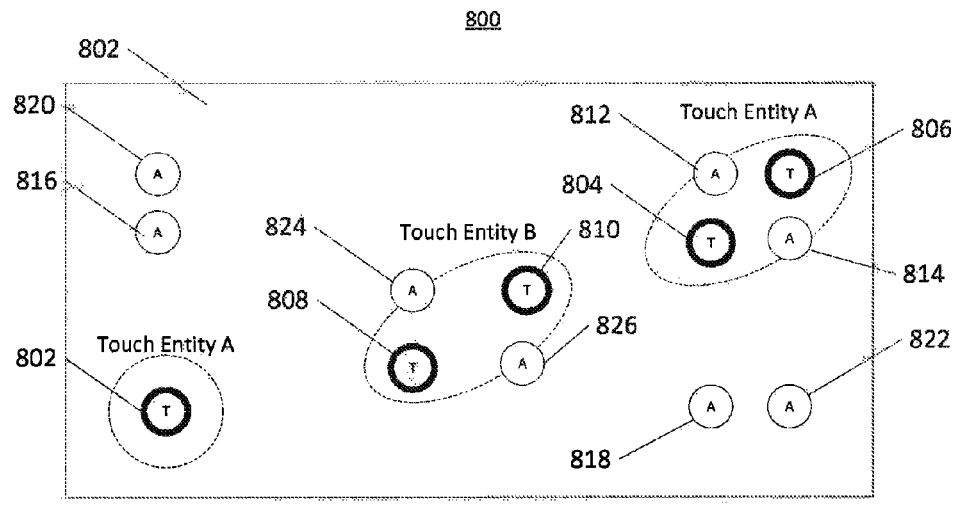
FIGS. 8A and 8B show example sense signal data plots in accordance with some embodiments.
Figure 8B:
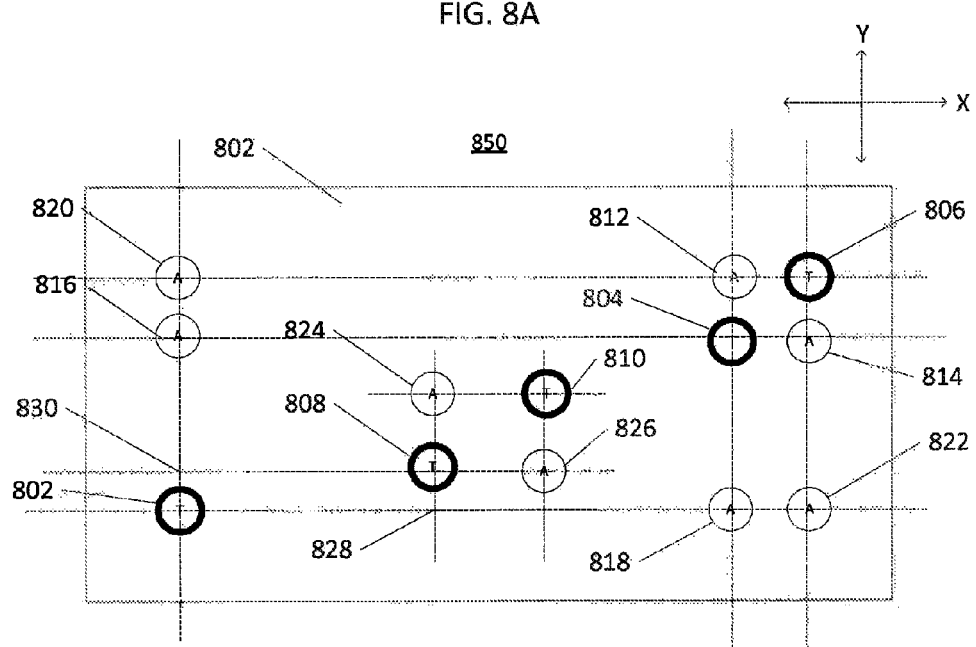

FIGS. 8A and 8B show example sense signal data plots 800 and 850, respectively, in accordance with some embodiments. Like FIGS. 3, 5 and 7, FIGS. 8A and 8B represent tables of entries corresponding to intersections between drive and sense electrodes. However, signal data plots 800 and 850 more explicitly represent an embodiment where the number of electrodes of a sensing array is large (e.g. 100 drive electrodes 112 and 200 sense electrodes 114). For clarity of presentation, FIGS. 8A and 8B is not shown as numerous small entry boxes as in FIGS. 3, 5 and 7, but rather represent electrodes 112 as a quasi-continuous horizontal axis and electrodes 114 as a quasi-continuous vertical axis. Sense signal data plots 800 and 850 may be generated based on the sense signal data received from sensing array 104, such as during a sensing cycle. Sense signal plots 800 and 850 may include background 802 representing the baseline mutual capacitance between drive and sense electrodes. Touches 802, 804 and 806 may be generated by a first touch entity (e.g., touch entity A) and may represent mutual capacitance values less than the baseline mutual capacitance. Similarly, touches 808 and 810 may be generated by a second touch entity (e.g., touch entity B) and may also represent mutual capacitance values less than the baseline mutual capacitance.

Because touches 802, 804 and 806 are from a common touch entity (e.g., touch entity A), circuitry discussed herein can be configured to detect an anti-ghost associated with any two pairs of touches 802, 804 and 806. Upon detecting an anti-ghost associated with a pair of touches from the sense signals received from the sensing array, the circuitry may be further configured to determine that pair of touches "share" an anti-ghost. For example, anti-ghosts 812 and 814 may be determined to be shared by touches 804 and 806, anti-ghosts 816 and 818 may be determined to be shared by touches 802 and 804, and anti-ghosts 820 and 822 may be determined to be shared by touches 802 and 806. Similarly, because touches 808 and 810 are from a common touch entity (e.g., touch entity B), anti-ghosts 824 and 826 may be determined to be shared by touches 808 and 810. As shown in FIG. 8B, anti-ghosts may be detected at intersections of projections of two touches of a touch entity along sensing axis directions (e.g., the X and Y sensing axis). For example, anti-ghost 818 may be detected at the intersection of the projection of touch 802 along the X sensing axis and the projection of touch 804 along the Y sensing axis. Similarly, anti-ghost 816 may be detected at the intersection of the projection of touch 802 along the Y sensing axis direction and the projection of touch 804 along the X sensing axis direction.

As shown in sense signal data plot 850, two touches from different touch entities do not share anti-ghosts. For example, no anti-ghost may be detected at intersections 828 and 830 of projections along sensing axes of touch 802 (from touch entity A) and projections along sensing axes of touch 808 (from touch entity B).

Figure 9:
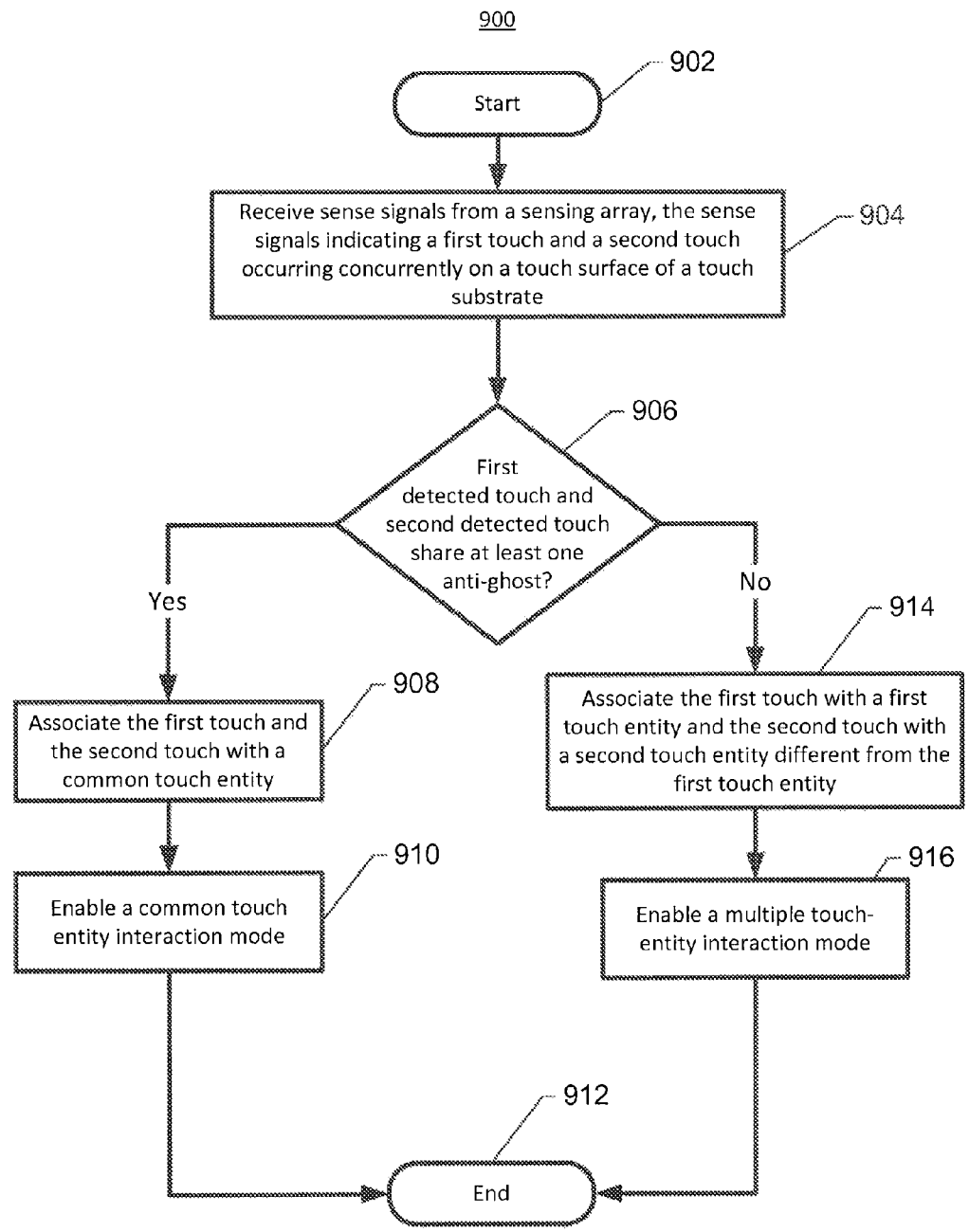
FIG. 9 shows an example method for providing multi-user multi-touch functionality on a touch sensor based on anti-ghosts performed in accordance with some embodiments.

FIG. 9 shows an example method 900 for providing multi-user multi-touch functionality on a touch sensor based on anti-ghosts performed in accordance with some embodiments. Method 900 may be performed to leverage the anti-ghost effect discussed above. In some embodiments, method 900 may be performed by a controller and/or other suitably configured circuitry, such as controller 108 of touch sensor 100 shown in FIG. 1.

Method 900 may begin at 902 and proceed to 904, where the controller may be configured to receive sense signals from a sensing array. The sense signals may indicate a first touch and a second touch occurring concurrently on a touch surface of a touch substrate, such as touch surface 110 of touch substrate 102 of touch sensor 100. In some embodiments, the sense signals may represent sense signal data acquired during sensing cycles of touch sensor 100. As such, the first touch and the second touch may occur "concurrently" on the touch surface when present during a single sensing cycle. For example, the first touch and the second touch may first occur (e.g., begin) simultaneously and may be maintained for the single sensing cycle. Furthermore, the first touch and the second touch may occur "concurrently" despite beginning at separate times. For example, the first touch may occur (e.g. begin) prior to the second touch and may be maintained on the touch surface such that the first touch is concurrent with the second touch (e.g., for the single sensing cycle).

At 906, the controller may be configured to determine whether the first touch and the second touch share at least one anti-ghost based on the sense signals. For example, and as discussed above in connection with FIGS. 6-8B (e.g., touches 602 and 612 of FIG. 6), the controller may be configured to determine that the first touch and the second touch share the at least one anti-ghost when the at least one anti-ghost is present at an intersection of projections of the first touch and the second touch along sensing axes of the touch controller (e.g., as defined by sensing array 102). Similarly, the controller may be configured to determine that the first touch and the second touch fail to share the at least one anti-ghost when no anti-ghost is present at any intersections of the first touch and the second touch along sensing axes of the touch controller (e.g., touches 202 and 204 of FIG. 4 and as shown by the sense signal data matrix 500 in FIG. 5).

In response to the controller determining that the first touch and the second touch share the at least one anti-ghost, method 900 may proceed to 908, where the controller may be configured to associate the first touch and the second touch with a common touch entity. As discussed above, the common touch entity may be an individual person or may be two or more people in electrically conductive contact.

At 910, the controller may be configured to enable a common touch entity interaction mode. For example, the first touch and the second touch may be used to determine a multi-touch capability of touch controller 110 such as pinch to zoom, two-finger scrolling, secondary select, and/or any other suitable multi-touch input. Method 900 may then proceed to 912 and end.

Returning to 906, in response to determining that the first touch and the second touch fail to share the at least one anti-ghost (e.g., do not share any anti-ghosts), method 900 may proceed to 914, where the controller may be configured to associate the first touch with a first touch entity and the second touch with a second touch entity different from the first touch entity. For example, the first touch entity may be a first person and the second touch entity may be a second person.

At 916, the controller may be configured to enable a multiple touch-entity interaction mode. For example, the first touch and the second touch may each be used to determine separate single touch capability of touch controller 110. Although method 900 is discussed with respect to two touches, it is appreciated that more than two touches may be detected in the sense signals. For example, a third touch may be detected and share at least one anti-ghost with the first touch and no anti-ghosts with the second touch. Here, common touch entity interaction mode may be enabled for the first and third touch and multiple touch-entity interaction mode be enabled for the second touch and the combination of the first touch and the third touch. In that sense, a multiple touch-entity interaction mode may include two or more separate common touch entity interaction modes. Method 900 may then end at 912.

Figure 10:
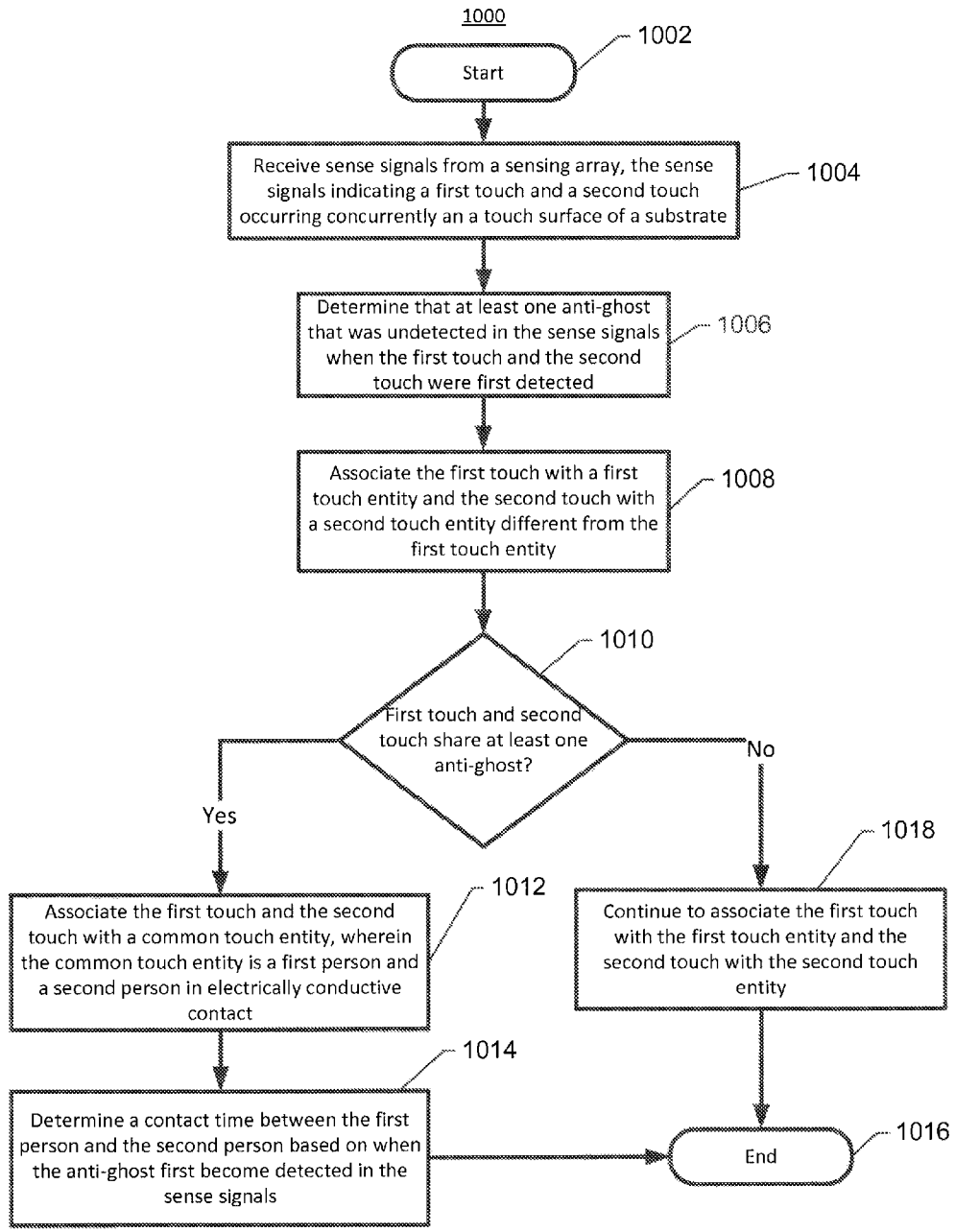
FIG. 10 shows an example method for determining (e.g., physical, electrically conductive) contact between individual users based on anti-ghosts performed in accordance with some embodiments.

FIG. 10 shows an example method 1000 for determining contact between individual users based on anti-ghosts performed in accordance with some embodiments. Method 1000 may be performed to leverage the fact that anti-ghosts may also be generated when two or more individual people make electrically conductive contact (e.g., touching each other while also concurrently touch the touch sensor). In some embodiments, method 1000 may be performed by a controller and/or other suitably configured circuitry, such as controller 108 of touch sensor 100 shown in FIG. 1.

Method 1000 may begin at 1002 and proceed to 1004, where the controller may be configured to receive sense signals from a sensing array, the sense signals indicating a first touch and a second touch occurring concurrently at a touch surface of a substrate. The discussion above at 904 of method 900 may be applicable at 1004.

At 1006, the controller may be configured to determine that at least one anti-ghost that was undetected in the sense signals when the first touch and the second touch were first detected. For example, the determination at 906 of method 900 may be performed in a first sensing cycle when the first touch and the second touch are initially detected. Here, the first touch and the second touch may be determined to fail to share the at least one ant-ghost, indicating that the first touch and the second touch are associated with different touch entities when the first touch and the second touch were first detected. At 1008, the controller may be configured to associate the first touch with a first touch entity and the second touch with a second touch entity different from the first touch entity.

At 1010, the controller may be configured to determine whether the first touch and the second touch share at least one anti-ghost. For example, the first touch and the second touch may be maintained on the touch sensor following the first sensing cycle, such as for several sensing cycles including a second sensing cycle. In the second sensing cycle, the determination at 906 of method 900 may be repeated.

In response to determining that the first touch and the second touch share the at least one anti-ghost, method 1000 may proceed to 1012, where the controller may be configured associate to the first touch and the second touch with a common touch entity, wherein the common touch entity is a first person and a second person in electrically conductive contact. For example, the first person and the second person may have made electrically conductive contact with each other causing the at least one anti-ghost to appear that was not present when the first person and the second person were not in electrically conductive contact at 1006. In some embodiments, a multi-user common touch entity interaction mode may be enabled. For example, the multi-user common touch entity interaction mode may allow the touch sensor to provide inputs (e.g., to a main controller, application, operating system, device, etc.) indicating whether or not users of the common touch entity are touching each other.

At 1014, the controller may be configured to determine a contact time between the first person and the second person based on when the anti-ghost first become detected in the sense signals. For example, the contact time may indicate when the first person and the second person came into electrically conductive contact. Method 1000 may then end at 1016.

Returning to 1010, in response to determining that the first and second touch fail to share the at least one anti-ghost, method 1000 may proceed to 1018, where the controller may be configured to continue to associate the with the first touch entity and the second touch with the second touch entity. As discussed above at 916 of method 900, the controller may farther be configured to initiate a multiple touch-entity interaction mode. Method 1000 may then proceed to 1016 and end.

For simplicity and clarity of presentation, the example flow chart of FIG. 10 does not show all the iterative loops that may be present in some embodiments. For example, after it has been determined at 1018 that first and second touch entities are not yet in electrical contact, method 1000 may iteratively loop back to decision step 1010 (e.g., many times) until contact is made and method 1000 may proceed to 1012. Furthermore, method 1000 may be generalized to recognize not only the initiation of electrical contact between two users, but also the breaking of such electrical contact. Hence, in some embodiments, the controller may be configured to associate the first touch with the first touch entity and the second touch with the second touch entity upon disappearance of a shared anti-ghost. For example, in response to determining a shared anti-ghost disappeared after being detected as being shared by the first touch and the second touch, the controller may be configured to detect that a first person and a second person discontinued electrically conductive contact with each other. Furthermore, the controller may be configured to determine a release time and/or initiate a multi-touch entity interaction mode.

Anti-Ghost Overlap

Figure 11:
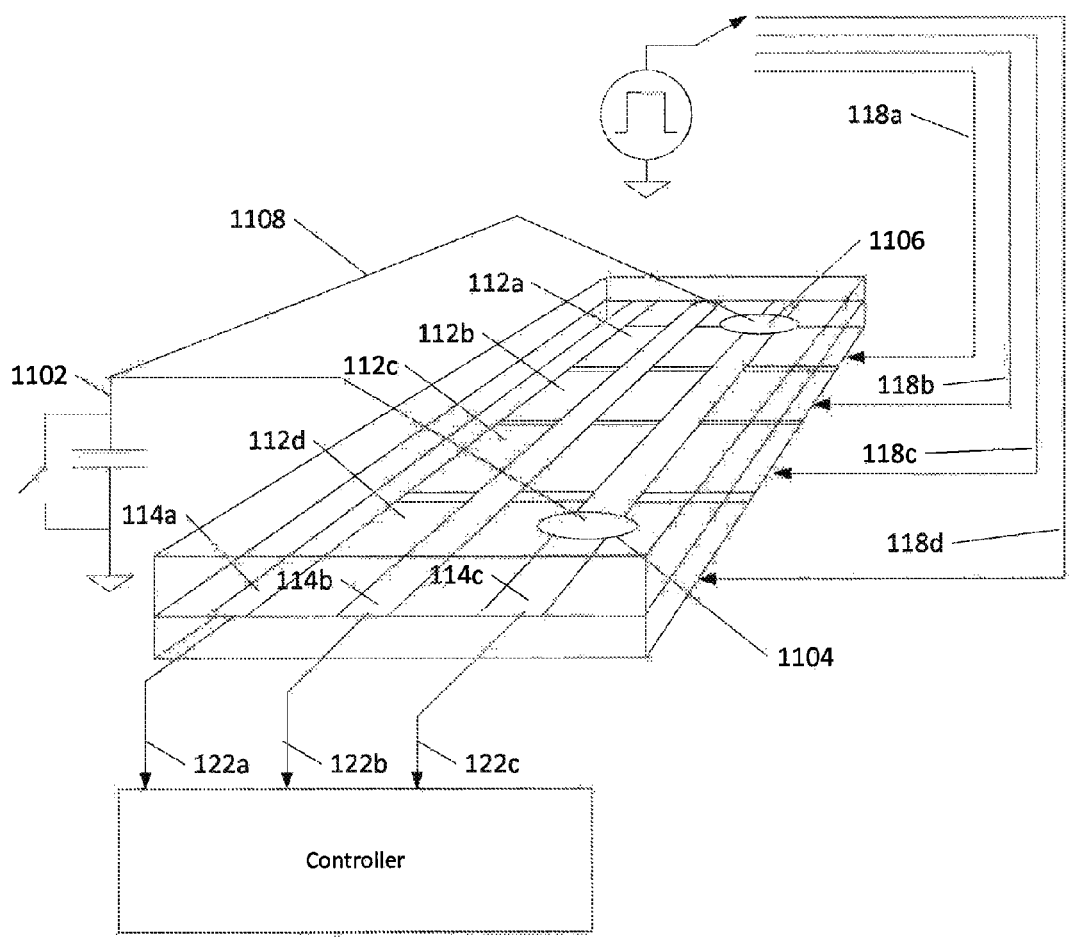
FIG. 11 shows an example touch sensor receiving two touches along a sensing axis in accordance with some embodiments.

The discussion above regarding anti-ghosts and when they are detected may not always be applicable, such as when an anti-ghost overlaps (e.g., in location) with a touch. For example, an overlapping anti-ghost may occur when a first touch and a second touch are located along a common sensing axis (e.g., share a common X or Y coordinate on an XY touch sensor). FIG. 11 shows an example touch sensor 100 including two touches from a common touch entity along a common sensing axis in accordance with some embodiments. The discussion above regarding touch entity circuit equivalent 604 of FIG. 6 may be applicable to touch entity circuit equivalent 1102. Unlike touches 602 and 612 in FIG. 6, however, in some embodiments touches 1104 and 1106 are both along sense electrode 114c that defines (e.g., along with the other sense electrodes) the X sensing axis. As such, touches 1104 and 1106 are along the common X sensing axis.

Figure 12:
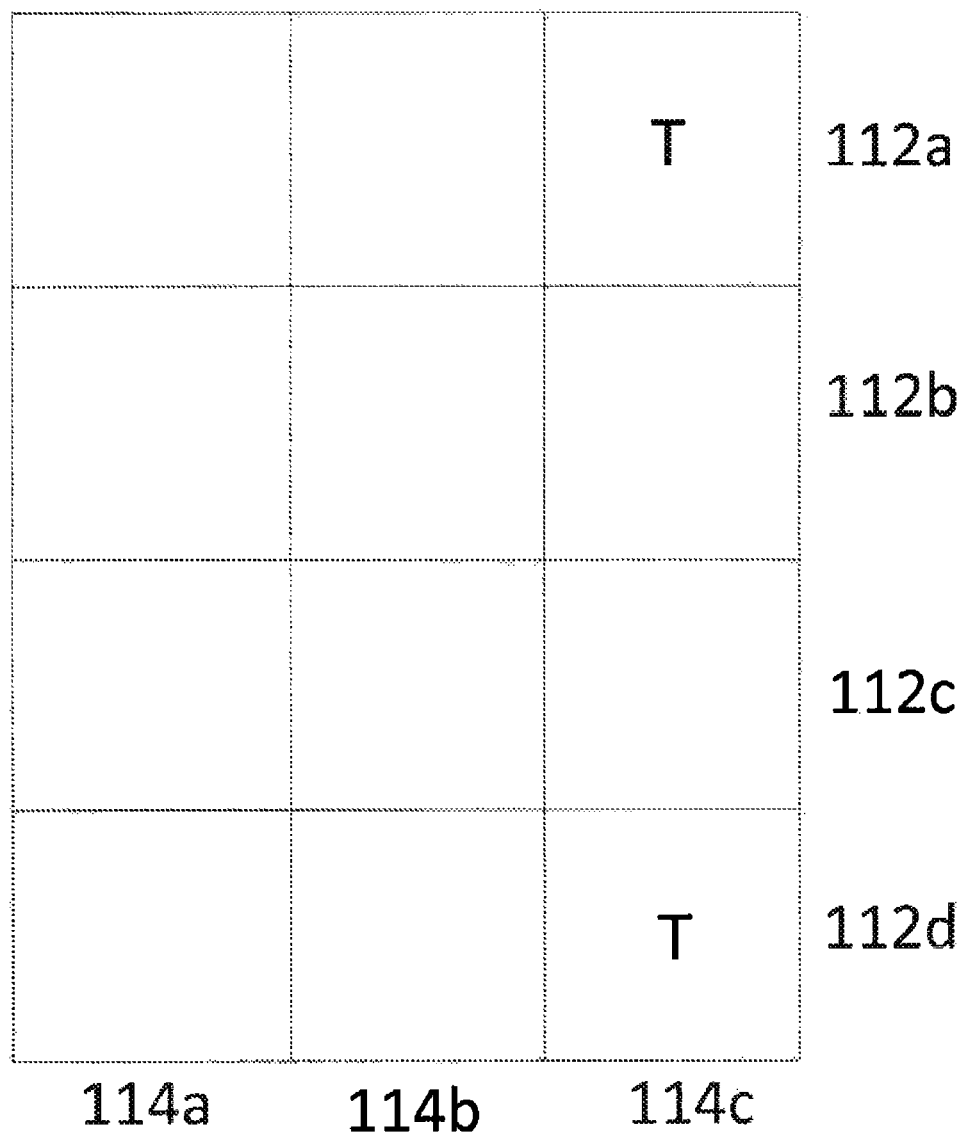
FIG. 12 shows an example sense signal data matrix including two touches along a sensing axis in accordance with some embodiments.

FIG. 12 shows an example sense signal data matrix 1200 in accordance with some embodiments. Sense signal data matrix 1200 may represent sensing signal data generated in a sensing cycle by touch sensor 100 in response to two concurrent touches from a common touch entity along a common sensing axis, as shown in FIG. 11 (e.g., for touches 1104 and 1106 along the common X sensing axis defined by sense electrode 114c). As shown in sense signal data matrix 1200, no anti-ghosts are readily present despite the fact that touches 1104 and 1106 are generated by the same touch entity because touches 1104 and 1106 are along a common sensing axis. Because anti-ghost signals "A" are generally smaller in magnitude than touch signals "T", an overlapping anti-ghost "A" and touch signal "T" may appear as a touch signal "T" with a somewhat reduced signal magnitude.

For example, sensing cycles may be performed as discussed above. Sense electrodes 114a, 114b and 114c may be placed in the sense mode for generating the sense signals. Drive electrode 112a may receive the input signal via input line 118a and drive electrodes 112b, 112c and 112d may be inactivated. Because touch 1106 is detected on touch surface 110 corresponding with the location of drive electrode 112a and sense electrode 114c, the sense signals on output line 122c may represent a mutual capacitance that is less than the baseline mutual capacitance, as shown by "T" entry 112a-114c within sense signal data matrix 1200. Circuitry may also drive electrical energy from drive electrode 112a through the touch entity via connection 1108 to sense electrode 114c at touch 1104, thereby increasing the mutual capacitance detected at sense electrode 114c relative to the reduced mutual capacitance that would have resulted from touch 1106 alone. In some embodiments, the magnitude of the measured mutual capacitance decrease from touch 1106 may be much larger than the increase in measured mutual capacitance from the anti-ghost effect resulting from connection 1108 and touch 1104. Here, the net effect may be a decreased measured mutual capacitance, or a "T", for entry 112a-114c despite the contribution from the anti-ghost effect.

Similarly, the increase in mutual capacitance caused by connection 1108 does not cause an anti-ghost at entry 112a-114c within sense signal data matrix 1200, because touch 1104 is also present and overlapping, as shown by "T" entry 112d-114c within sense signal data matrix 1200. For example, within the same sensing cycle, drive electrode 112d may receive the input signal via input line 118d and drive electrodes 112a, 112b and 112c may be inactivated. Because touch 1104 is present on touch surface 110 corresponding with the location of drive electrode 112d and sense electrode 114c, the sense signals on output line 122c may represent a mutual capacitance that is less than the baseline mutual capacitance, as shown by "T" entry 112a-114c within sense signal data matrix 1200. Electrical energy may also be driven from drive electrode 112d through the touch entity via connection 1108 to sense electrode 114c at touch 1106, thereby increasing the detected mutual capacitance of sense electrode 114c relative to the reduced mutual capacitance that would have resulted from touch 1104 alone. The net effect is still a decreased measured mutual capacitance despite the contribution from the anti-ghost effect. Hence, the increase in mutual capacitance caused by connection 1108 does not cause an anti-ghost at entry 112a-114c within sense signal data matrix 1200 because overlapping touch 1106 is also present.

Figure 15:
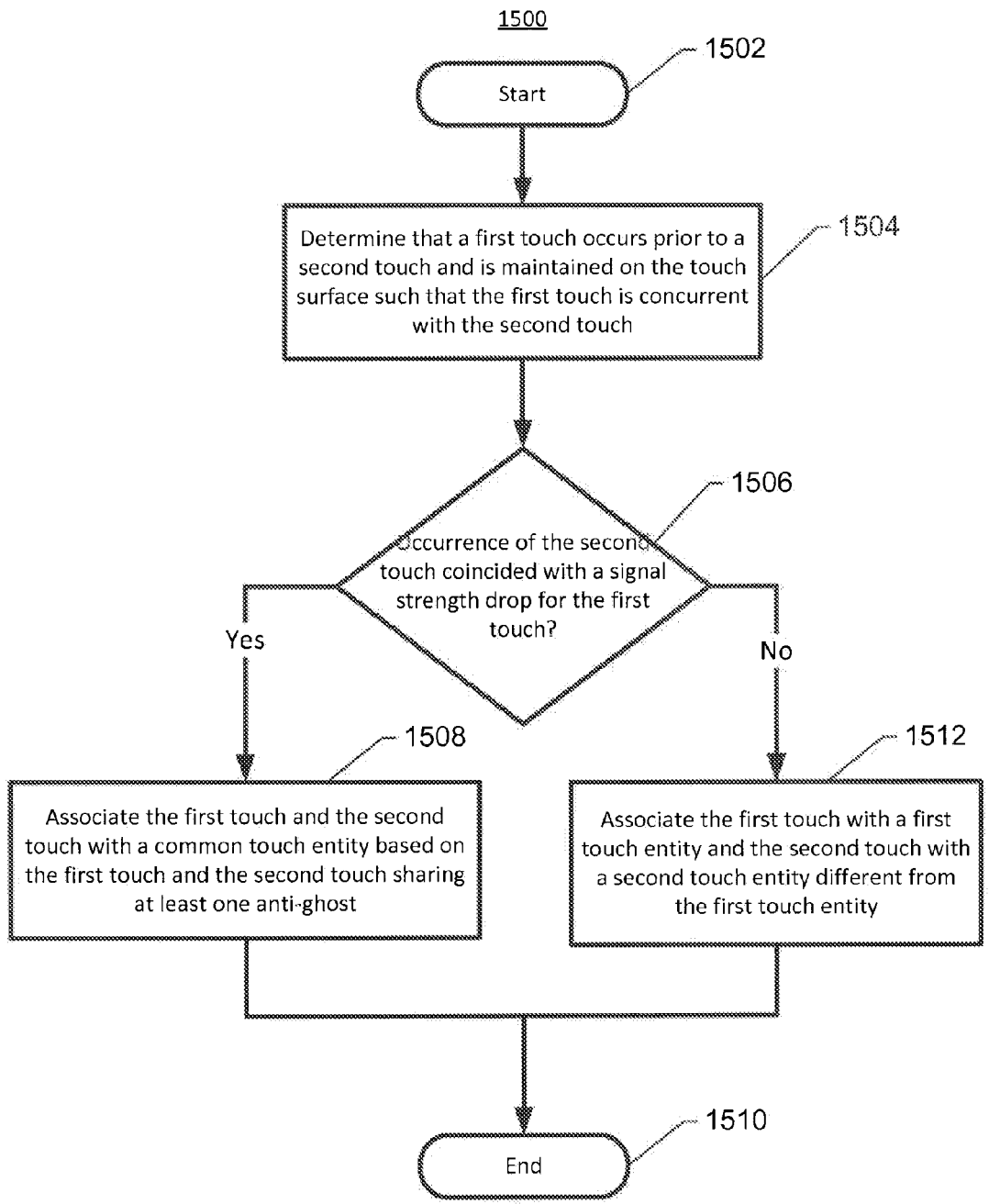
FIG. 15 shows an example method for providing multi-user multi-touch functionality based on signal strength of touches performed in accordance with some embodiments.
Figure 16A:
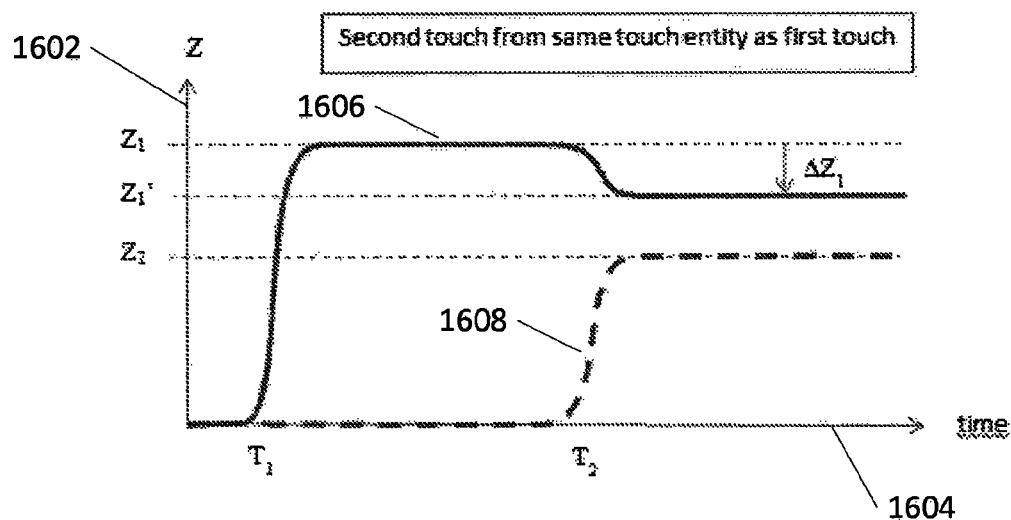
FIGS. 16A and 16B show example sense signal strength data plots in accordance with some embodiments.
Figure 16B:
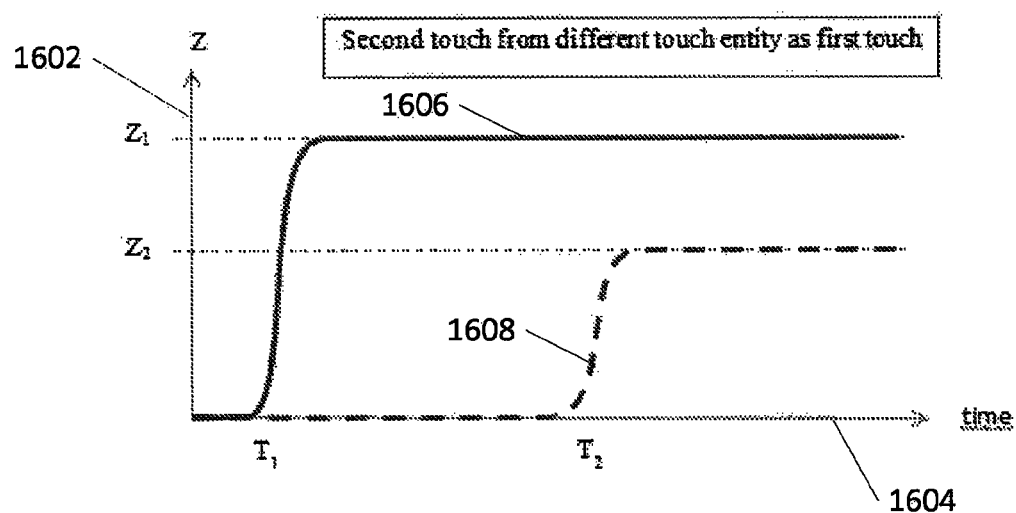

As discussed in greater detail with respect to FIGS. 15-16B, the increase in mutual capacitance caused by connection 1108 at entries 112a-114c and 112a-114b may represent a smaller signal strength effect than the decrease in mutual capacitance caused by touches 1104 and 1106. As such, when a detected touch overlaps with an expected anti-ghost, the touch may be readily detected based on the sense signals while (e.g., overlapping) anti-ghosts are less readily apparent (e.g., despite touches 1104 and 1106 being generated by the common touch entity), as shown in sense signal data matrix 1200.

Figure 13:
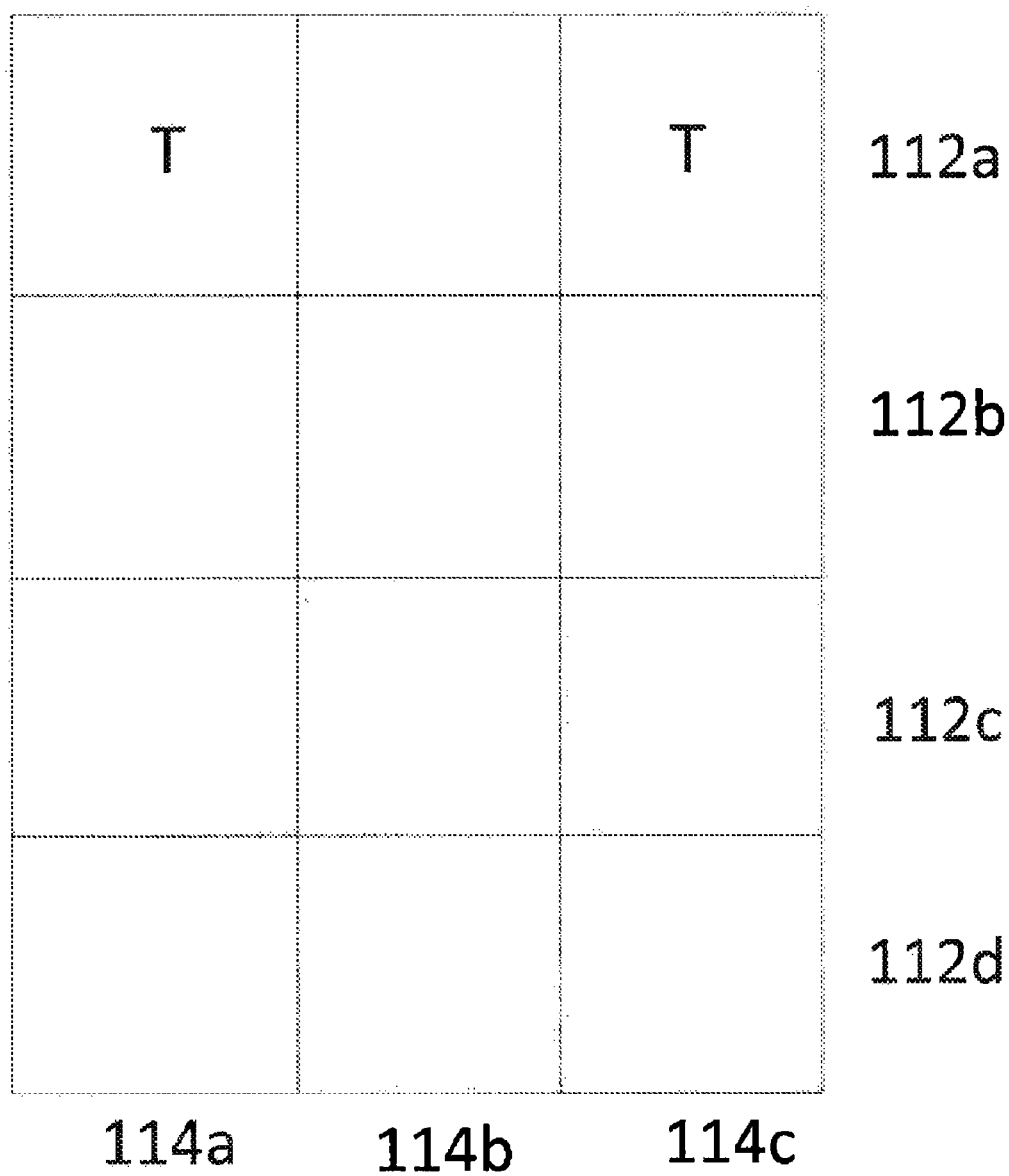
FIG. 13 shows an example sense signal data matrix including two touches along a second sensing axis in accordance with some embodiments.

FIG. 13 shows an example sense signal data matrix 1300 in accordance with some embodiments. Sense signal data matrix 1300 may represent sensing signal data generated by touch sensor 100 (e.g., in a sensing cycle) in response to detecting two concurrent touches from a common touch entity along a second common sensing axis direction (e.g., the X sensing axis direction). For example, "T" entries 112a-114a and 112a-114c may each represent a detected touch along the common X sensing axis direction parallel to Y drive electrode 112a. For reasons similar to those described in connection with FIGS. 11 and 12, two or more touches along the X sensing axis direction may also be readily detected based on the sense signals while (e.g., overlapping) anti-ghosts are less readily apparent (e.g., despite the touches being generated by the common touch entity), as shown in sense signal data matrix 1300.

Example techniques for detecting overlapping anti-ghosts and, thus, addressing the anti-ghost overlap problems are discussed below. Some techniques may include modifications to controller configurations, the sensing array configurations, and/or sensing electronics configurations. In some embodiments, one or more of the techniques discussed herein may be implemented and/or techniques not explicated discussed herein (e.g., depending on the use requirements of touch controller 100).

Figure 14:
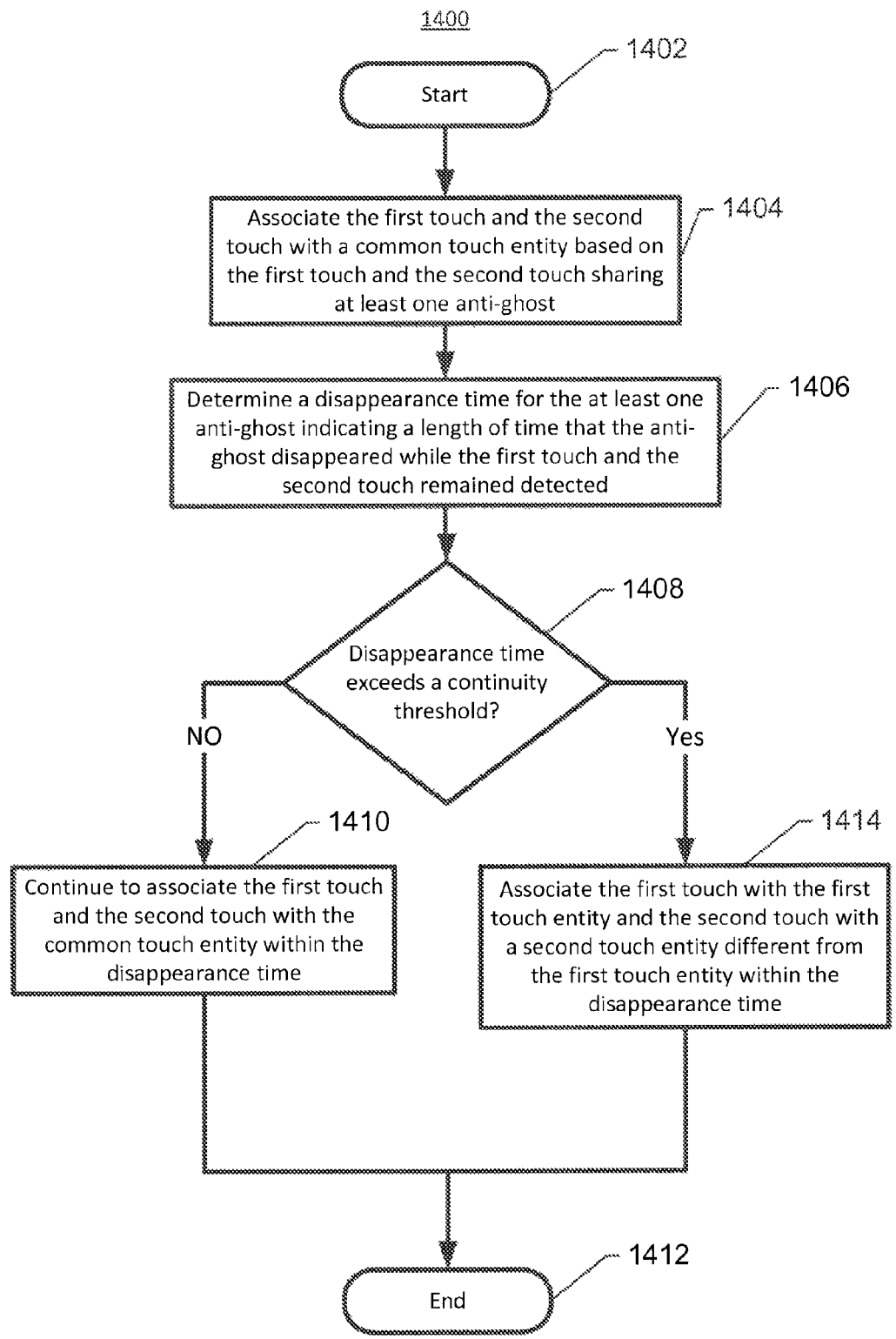
FIG. 14 shows an example method for providing multi-user multi-touch functionality based on continuity of anti-ghosts performed in accordance with some embodiments.

FIG. 14 shows an example method 1400 for providing multi-user multi-touch functionality based on monitoring continuity of anti-ghosts. In some embodiments, method 1400 may be performed to, at least partially, detect anti-ghosts that may occur at the same location as a detected touch. For example, method 1400 can be executed to determine whether a second touch belongs to the same touch entity as the first touch when two touches of a common touch entity are not along a common sensing axis (e.g., no anti-ghost overlap initially) when the two touches first become concurrent on the touch surface. In some embodiments, method 1400 may be performed by a controller and/or other suitably configured circuitry, such as controller 108 of touch sensor 100 shown in FIG. 1.

Method 1400 may begin at 1402 and proceed to 1404, where the controller may be configured to associate the first touch and the second touch with a common touch entity based on detecting the first touch, the second touch, and at least one anti-ghost generated by the sensor, and then determining the first touch and the second touch share the at least one anti-ghost. The discussion at 908 of method 900 may be applicable at 1404.

At 1406, the controller may be configured to determine a disappearance time for the at least one anti-ghost indicating a length of time that the anti-ghost disappeared while the first touch and the second touch remained detected. For example, the anti-ghost may be determined to have disappeared from the sense signals in a subsequent sensing cycle after a sensing cycle where the at least one anti-ghost was detected. In some embodiments, the disappearance time may be measured beginning at the disappearance of the at least one anti-ghost and ending at the reappearance of the at least one anti-ghost while the first touch and the second touch remained detected throughout.

At 1408, the controller may be configured to determine whether the disappearance time exceeds a continuity threshold. The continuity threshold may represent a predetermined length of time in which the controller may treat disappearance of the at least one anti-ghost as being caused by temporary anti-ghost overlap of moving touches. The continuity threshold may be measured using any suitable means, including a counter, sensor cycles, and/or processor clock cycles.

In response to determining that the disappearance time fails to exceed the continuity threshold, method 1400 may proceed to 1410, where the controller may be configured to continue to associate the first touch and the second touch with the common touch entity within the disappearance time. In some embodiments, temporary disappearance of the at least one anti-ghost may not effect operation of the touch sensor and/or the multi-user mode being implemented. For example, the touch sensor may continue to operate in the common touch entity interaction mode. Method 1400 may then end at 1412. Alternatively or additionally, pairs of touches previously identified as due to a common touch entity may continue indefinitely to be regarded as due to the common touch entity as long as the overlap condition exists (e.g., for which a lack of anti-ghosts is consistent with both common and separate touch entity interpretations of signals). In some embodiments, a pair of touches associated with a common touch entity may be re-interpreted as due to separate touch entities either when a time exceeds a continuity threshold, or when the overlap condition ends without the appearance of anti-ghosts, whichever occurs first.

Returning to 1408, in response to determining that the disappearance time exceeds the continuity threshold, method 1400 may proceed to 1414, where the controller may be configured to associate the first touch with a first touch entity and the second touch with a second touch entity different from the first touch entity within the disappearance time. Alternatively and/or additionally, the controller may be configured to determine that the first touch entity and the second touch entity lost electrically conductive contact during the disappearance time, such as when the common touch entity determined at 1404 includes multiple individual people corresponding with the first touch entity and the second touch entity at 1414. Method 1400 may then proceed to 1412 and end.

FIG. 15 shows an example method 1500 for providing multi-user multi-touch functionality based on signal strength of touches performed in accordance with some embodiments. Method 1500 may be performed to, at least partially, resolve the detection of touches associated with the same touch entity despite not detecting anti-ghosts due to the anti-ghosts overlapping with the touches. For example, method 1500 may be helpful when a first touch occurs prior to a second touch and is maintained on the touch surface such that the first touch is concurrent with the second touch. Independent of whether there is a potential anti-ghost overlap or not, the method 1500 may be performed to determine whether or not the second touch belongs to the same touch entity as the first touch. In that sense, method 1500 may be performed in response to the second touch being determined as being along a common sensing axis direction as the first touch and/or when the first touch occurs prior to the second touch regardless of whether the first touch and the second touch are along a common sensing axis. In some embodiments, like other methods discussed herein, method 1500 may be performed by a controller and/or other suitably configured circuitry, such as controller 108 of touch sensor 100 shown in FIG. 1.

Method 1500 may begin at 1502 and proceed to 1504, where the controller may be configured to determine that a first touch occurs prior (in time) to a second touch's initial occurrence, and the first touch is maintained on the touch surface such that the first touch is concurrent with the second touch. For example, where sensing cycles are used, the first touch may be detected and the second touch may be undetected in the sense signals in a first sensing cycle. In a subsequent sensing cycle, the first touch may be detected again (e.g., maintained through multiple sensing cycles in some embodiments) concurrently with the second touch.

At 1506, the controller may be configured to determine whether occurrence of the second touch coincided with a signal strength drop of the first touch. FIGS. 16A and 16B show example sense signal strength data plots 1600 and 1650, respectively, in accordance with some embodiments. In plots 1600 and 1650, "Z" represents the detected signal strength of a touch and is plotted along vertical axis 1602 against time, which is plotted along horizontal axis 1604. As shown in plot 1600 of FIG. 16A, first touch 1606 occurs at time $T_1$ prior to second touch 1608, which occurs at time $T_2$. Also at time $T_2$, signal strength $Z_1$ of first touch 1606 drops $\Delta Z_1$ to signal strength $Z_1'$. Here, occurrence of the second touch may be determined to have coincided with a signal strength drop for the first touch due to the processor detecting the overlapping anti-ghost with the first touch. Plots 1600 and 1650 show signal strengths for first touch 1606 and second touch 1608 relative to themselves over time, but not necessarily with respect to each other (e.g., $Z_1$ is not necessarily greater than $Z_2$ as shown).

As shown in plot 1650 of FIG. 16B, first touch 1606 also occurs at time $T_1$ prior to second touch 1608, which occurs at time $T_2$. However, at time $T_2$, signal strength $Z_1$ of first touch 1606 does not drop to lower signal strength. Here, occurrence of the second touch may be determined to have failed to coincide with a signal strength drop for the first touch.

In some embodiments, a coinciding signal strength drop for the first touch may indicate that placement of the second touch has caused the processor to detect a shared anti-ghost that overlaps with the first touch or the sensing array. As discussed above, a touch may cause a detected decrease in mutual capacitance and an anti-ghost may cause a detected increase in mutual capacitance, albeit at a smaller magnitude. As such, when the first touch overlaps with an anti-ghost shared by the first touch and the second touch, the circuitry may detect the anti-ghost and be configured to determine its presence based on an algorithm associated with the relative timing of a signal strength drop (e.g., $\Delta Z_1$), such as when the timing of the first touch is determined to have coincided with the occurrence of the second touch. Thus the detection of a signal strength drop (e.g., $\Delta Z_1$) provides a means of anti-ghost detection even when a true touch overlaps the position of the anti-ghost.

In response to determining, for example, that the occurrence of the second touch coincided with a signal strength drop associated with the first touch, method 1506 may proceed to 1508, where the controller may be configured to associate the first touch and the second touch with a common touch entity based on the first touch and the second touch sharing at least one detected anti-ghost, wherein the presence of the anti-ghost is extrapolated based on the relative timing of the first touch's signal strength drop. The discussion at 908 of method 900 may be applicable at 1508. Method 1500 may then proceed to 1510 and end.

In response to determining that the occurrence of the second touch failed to coincide with a signal strength drop for the first touch, method 1506 may proceed to 1512, where the controller may be configured to associate the first touch with a first touch entity and the second touch with a second touch entity different from the first touch entity. In this regard, there may still be a signal strength drop, but that signal strength drop may not be associated with an overlapping anti-ghost, because the timing of the signal strength drop did not sufficiently coincide (in time, clock cycles, and/or signature) with the second touch. The discussion at 914 of method 900 may be applicable at 1512. Method 1500 may then proceed to 1510 and end.

In some embodiments, touches are detected on projected capacitive systems through both mutual capacitance measurements (as described above) as well as self-capacitive measurements. Detection of changes in, or anomalous values of, the ratio of mutual-capacitance signal to self-capacitive signal for a touch may also be used in algorithms for determining whether or not two touches are from the same or different touch entities.

Figure 17:
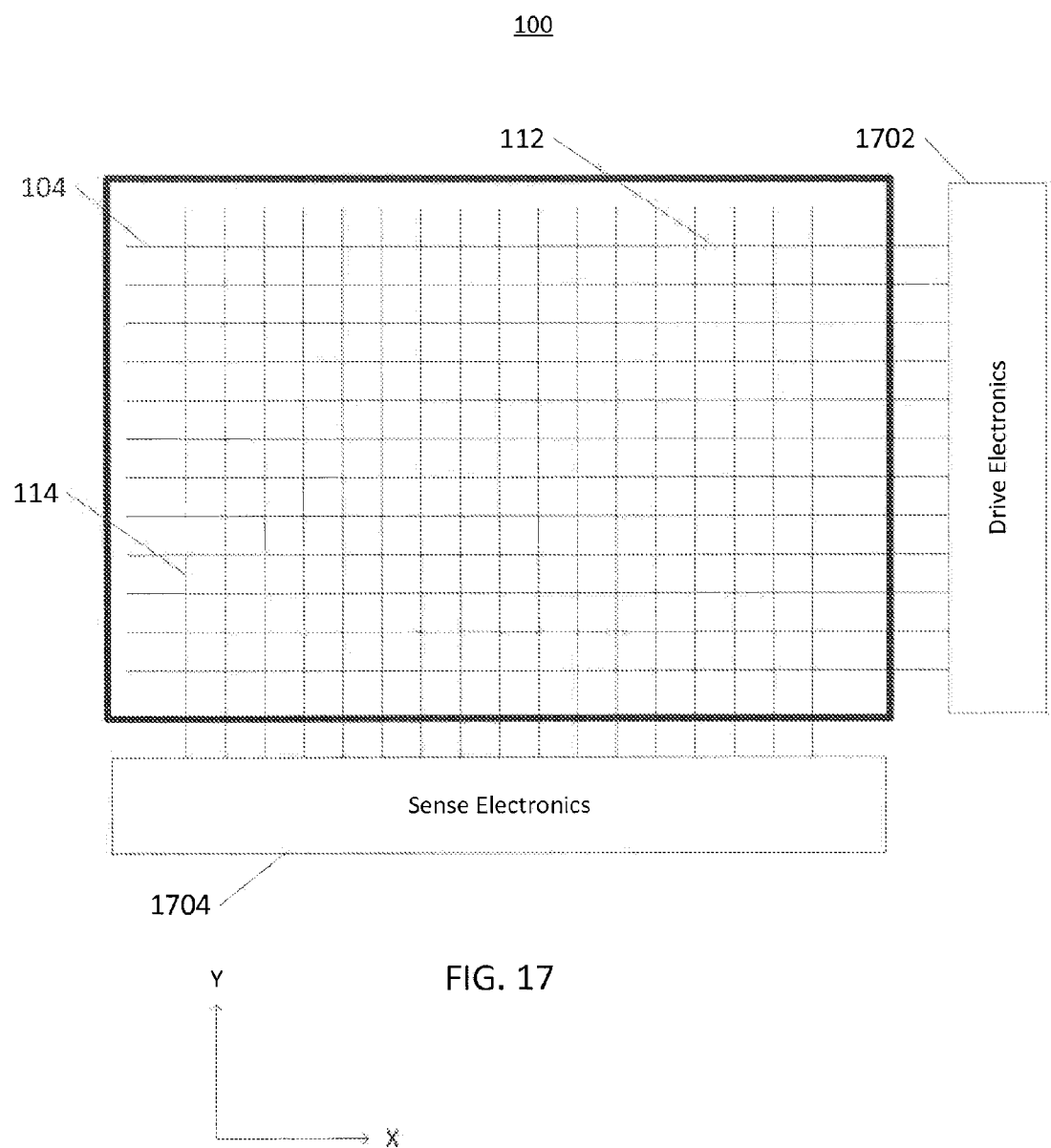
FIG. 17 shows an example touch sensor in accordance with some embodiments.

FIG. 17 shows an example touch sensor 100 in accordance with some embodiments. Here, touch sensor 100 as shown in FIG. 1 is shown in schematic plan view. Touch sensor 100 may include sensing array 104, drive electronics 1702, and sense electronics 1704. As discussed above in connection with FIG. 1, sensing array 104 may define two sensing axes, and in that sense, touch sensor 100 may be an example of an XY touch sensor. In particular, Y axis electrodes 112 may define the Y sensing axis and X axis electrodes 114 may define the X sensing axis.

Drive electronics 1702 may be configured to generate input signals to drive each of Y axis electrodes 112, and as such, Y axis electrodes 112 may operate in a drive mode as drive electrodes. In some embodiments, drive electronics 1702 may include signal generator 106 and switch 120, or the like. For example, in a sense cycle, drive electronics 1702 may be configured to send the input signal from signal generator 106 to each of Y axis electrodes 112 (e.g., one at a time). Sense electronics 1704 may be configured to set X axis electrodes 114 to a sense mode (e.g., connect to current or charge sensing virtual grounds) for detecting mutual capacitances associated with touches and/or anti-ghosts. In some embodiments, drive electronics 1702 and/or sense electronics 1704 may implemented via a controller or other suitable circuitry, such as controller 108 shown in FIG. 1.

Figure 18:
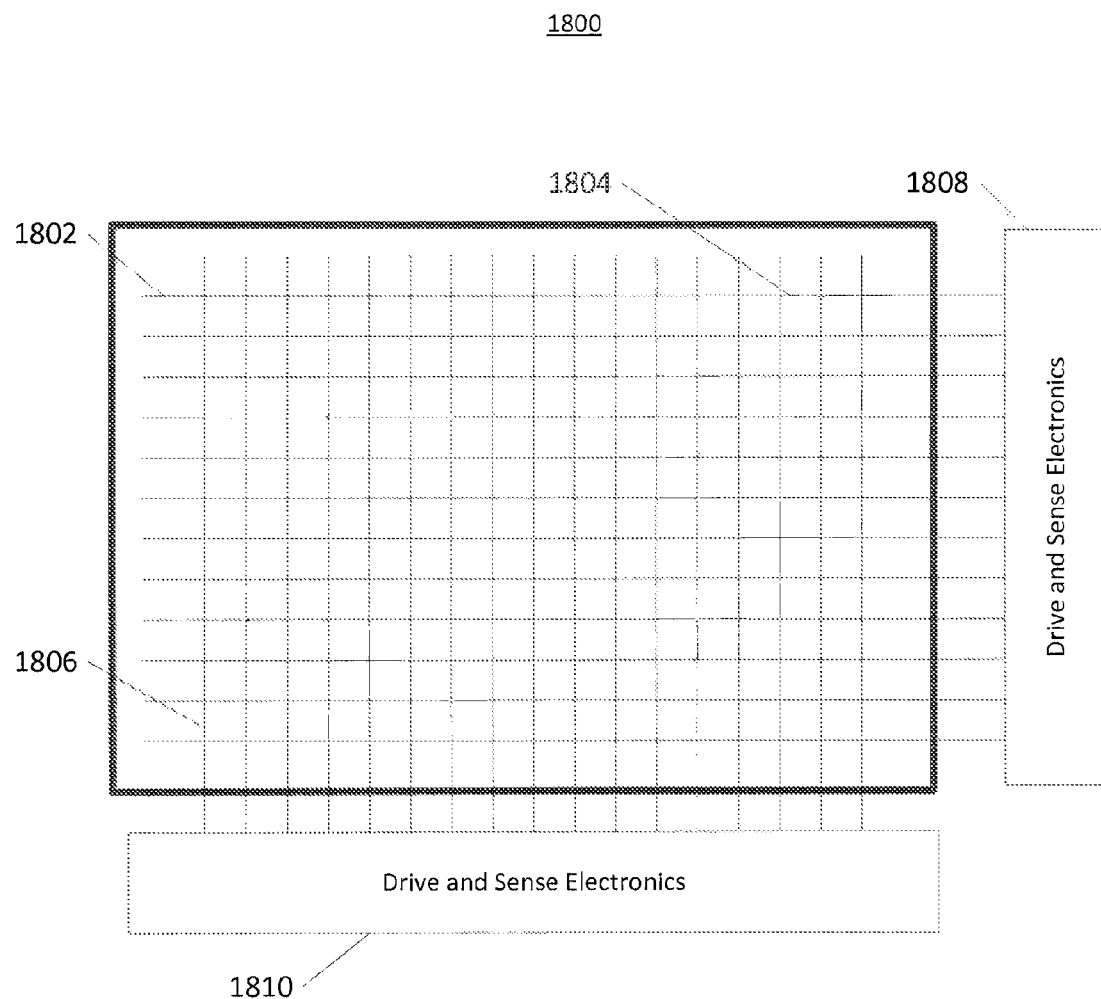
FIG. 18 shows an example touch sensor in accordance with some embodiments.

FIG. 18 shows an example touch sensor 1800 including drive and sense electrodes in accordance with some embodiments. Touch sensor 1800 may include sensing array 1802, including Y axis electrodes 1804 and X axis electrodes 1806. Touch sensor 1800 may further include drive and sense electronics 1808 and drive and sense electronics 1810.

Drive and sense electronics 1808 and 1810 may be configured to selectively perform both drive and sense functions, such as those described herein for drive electronics 1702 and sense electronics 1704 in FIG. 17. As such, both Y axis electrodes 1804 and X axis electrodes 1806 may selectively operate in the drive mode and the sense mode as drive and sense electrodes. In some embodiments, drive and sense electronics 1808 and/or 1810 may include one or more multiplexers for selecting between operation in the drive mode and sense mode for the drive and sense electrodes. In some embodiments, drive and sense electronics 1808 and/or 1810 may be implemented via a controller or other suitable circuitry, such as controller 108 shown in FIG. 1.

Figure 19:
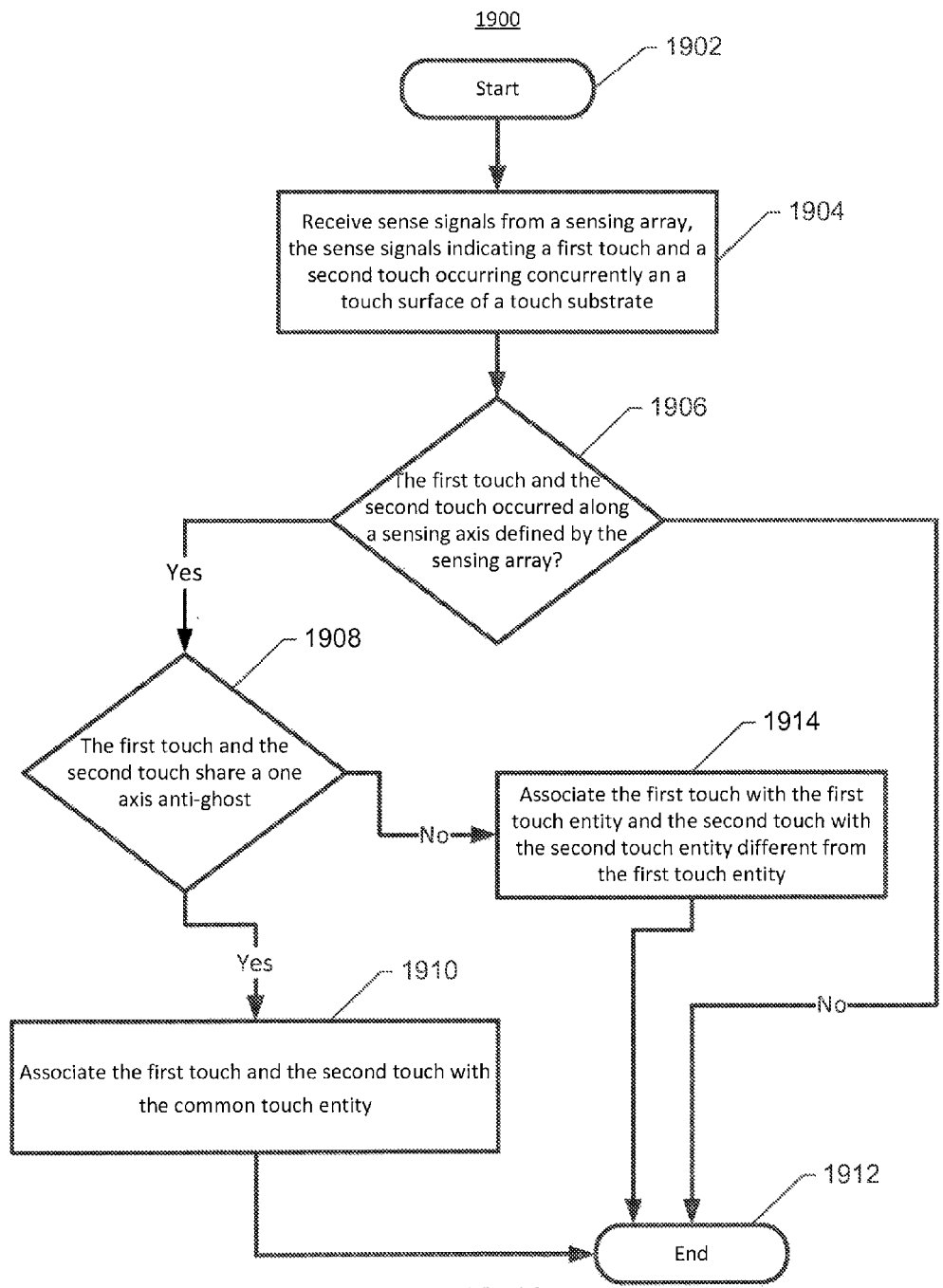
FIG. 19 shows an example method for providing multi-user multi-touch functionality based on one axis anti-ghost measurements performed in accordance with some embodiments.

FIG. 19 shows an example method 1900 for providing multi-user multi-touch functionality based on one axis anti-ghosts measurements performed in accordance with some embodiments. Method 1900 may be performed with touch sensors including drive and sense electronics and/or drive and sense electrodes, such as touch sensor 1800 shown in FIG. 18, to detect and/or otherwise resolve overlapping anti-ghosts and touches (e.g., to determine whether two touches along a sensing axis are generated by a common touch entity or different touch entities).

Method 1900 may begin at 1902 and proceed to 1904, where a controller of a touch sensor (e.g., touch sensor 1800) may be configured to receive sense signals from a sensing array. The sense signals may indicate a first touch and a second touch occurring concurrently on a touch surface of a touch substrate. The discussion above at 904 of method 900 may be applicable at 1904.

At 1906, the controller may be configured to determine whether the first touch and the second touch occurred along a sensing axis defined by the sensing array. As discussed above in connection with FIGS. 11-13, the first touch and the second touch may be detected and, thus, determined to have occurred along a sensing axis based on the sense signals received from the sensing array. In an example where the touch sensor is an XY touch sensor, the first touch and the second touch may be determined to have occurred along the X sensing axis (e.g., as shown in FIG. 13) or the Y sensing axis (e.g., as shown in FIG. 12). Similarly, for an XYU touch sensor, the first touch and the second touch may be determined to have occurred along a sensing axis when the first touch and the second touch occurred along any of the X, Y or U sensing axis.

Figure 20A:
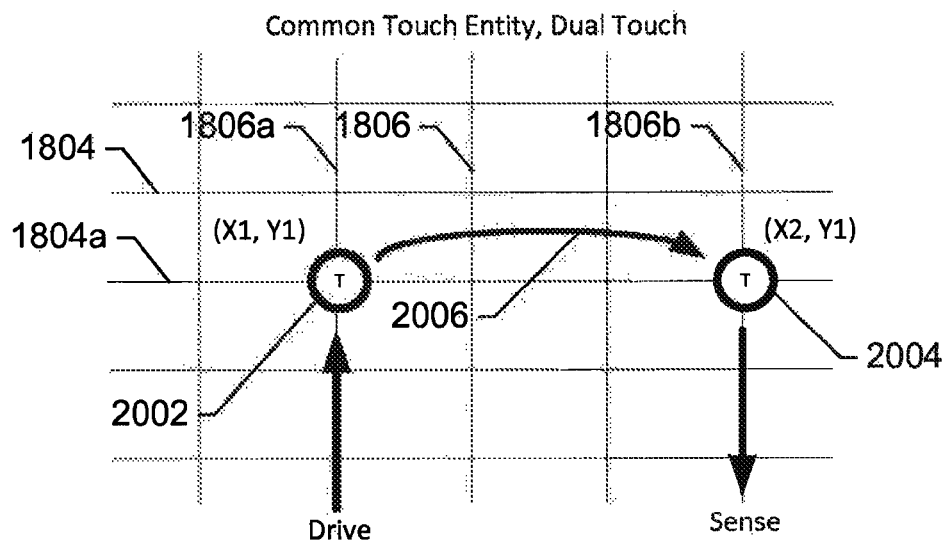
FIGS. 20A and 20B show an example sensing array for determining one axis anti-ghosts in accordance with some embodiments.
Figure 20B:
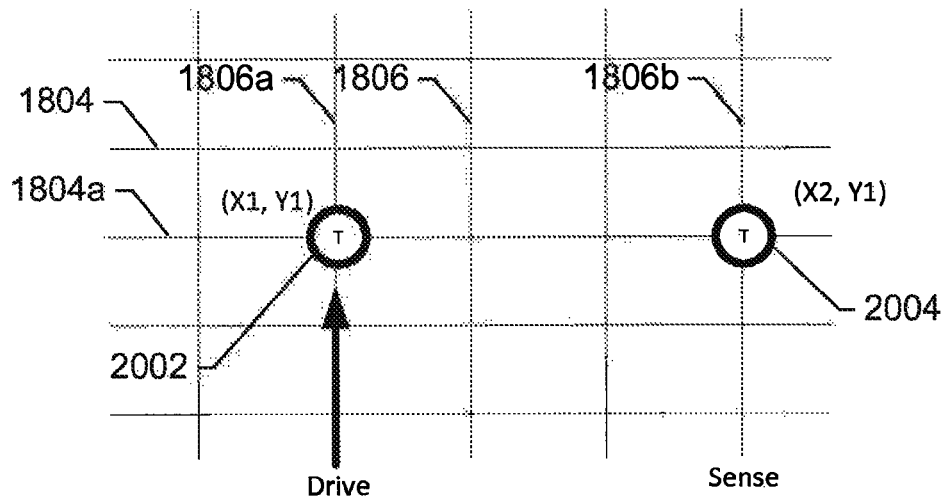

In response to determining that the first touch and the second touch occurred along a sensing axis defined by the sensing array, method 1900 may proceed to 1908, where the controller may be configured to determine whether the first touch and the second touch share a one axis anti-ghost. For example, the controller may be configured to determine whether an anti-ghost signal exists between the first touch and the second touch by using sensing electrodes of one axis only. FIGS. 20A and 20B show an example sensing array 1802 for determining one axis anti-ghosts in accordance with some embodiments. Sensing array 1802 may include Y axis electrodes 1804 and X axis electrodes 1806 that define X and Y sensing axis. After first touch 2002 (e.g., at coordinates (X1, Y1)) and second touch 2004 (e.g., at coordinates (X2, Y1)) are determined as having occurred along the X sensing axis direction (e.g., as detected at 1906 by switching Y axis electrodes 1804 to the drive mode and X axis electrodes 1806 to the sense mode, or vice versa), the controller and/or drive and sense electronics may be configured to operate a one axis anti-ghost sensing cycle for the X axis electrodes. The one axis anti-ghost sensing cycle may be performed to make one-axis anti-ghost measurements, among other things.

For example, the one axis anti-ghost sensing cycle may include switching X axis electrode 1806a (e.g., corresponding with X1 of first touch 2002) to the drive mode and switching X axis electrode 1806b to the sense mode. As shown in FIG. 20A, when touches 2002 and 2004 are from a common touch entity, electrical energy may flow via connection 2006 (e.g., the hand/body of an individual person) from drive electrode 1806a to sense electrode 1806b. For example, the controller may be configured to determine that detected touches 2002 and 2004 share a one axis anti-ghost. As electrodes 1806a and 1806b are parallel and never intersect, the corresponding one axis anti-ghost differs from the anti-ghosts indicated in FIGS. 7, 8A and 8B in having no obvious plan-view geometrical location. Nevertheless, such one axis anti-ghosts may still provide information with which to associate or separate pairs of touches.

As shown in FIG. 20B, when touches 2002 and 2004 are from different touch entities, and hence lacking connection 2006, the sensor will be unable to drive energy from drive electrode 1806a to sense electrode 1806b during the one axis anti-ghost sensing cycle. Because no energy is driven along this path, the circuitry can be configured to determine that touches 2002 and 2004 fail to share a one axis anti-ghost.

Additionally or alternatively, in response to determining the first touch and the second touch occurred along the same X sensing axis, the controller and/or drive and sense electronics may be configured to operate a one axis anti-ghost sensing cycle for the Y axis electrodes to determine whether there is an one-axis anti-ghost that the first touch and the second touch share.

Returning to FIG. 19, in response to determining that the first touch and the second touch share the one axis anti-ghost at 1908, method 1900 may proceed to 1910, where the controller may be configured to associate the first touch and the second touch with the common touch entity. The discussion above at 908 of method 900 may be applicable at 1910. Method 1900 may then proceed to 1912 and end.

In response to determining that the first touch and the second touch fail to share the one axis anti-ghost at 1908, method 1900 may proceed to 1914, where the controller may be configured to associate the first touch with a first touch entity and the second touch with a second touch entity different from the first touch entity. Additionally or alternatively, like any method discussed herein, the controller and/or other circuitry could be configured to execute another method for detecting overlapping anti-ghosts before determining that the touches are associated with the same and/or different touch entities. The discussion above at 914 of method 900 may be applicable at 1914. Method 1900 may then proceed to 1912 and end.

Returning to 1906, in response to determining that the first touch and the second touch failed to occur along a sensing axis, method 1900 may proceed to 1912 and end. For example, the one axis anti-ghost measurement may be not initiated. Instead, the controller may be configured to subsequently perform method 900 at 906, where the controller may be configured to determine whether the first touch and second touch share at least one anti-ghost based on sense signals (e.g., as generated by sensing cycles). Alternatively or additionally, in some embodiments, the one axis anti-ghost method may be used as the primary, rather than a secondary, method of associating touches; in this case decision step 1906 of method 1900 may be eliminated so that step 1904 proceeds unconditionally to decision step 1908.

Multi-Sensing Axis Touch Sensors

In some embodiments, a touch sensor may include more than two (e.g., XY) sensing axes. Additional sensing axes (e.g., XYU, XYUV, etc.) may allow for reliable anti-ghost overlap resolution for additional (e.g., greater than two) concurrent touches (e.g., such as when a first touch and a second touch are along a first sensing axis and the first touch and a third touch are along a second sensing axis). Furthermore, two touches generated by a common touch entity will share at least one (e.g., non-overlapping) anti-ghost even when the two touches are along a sensing axis.

Figure 21:
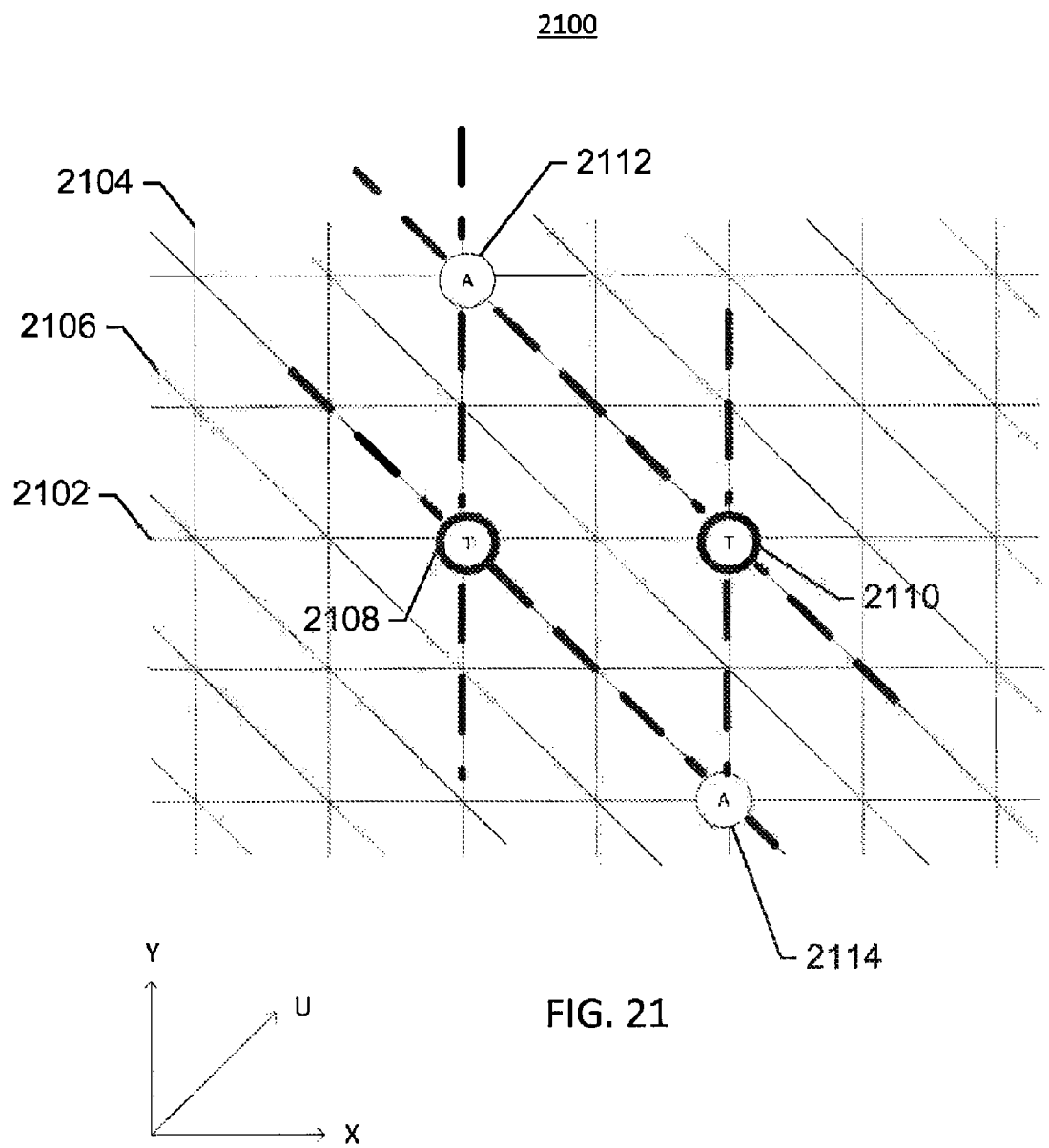
FIG. 21 shows an example XYU sensing array in accordance with some embodiments.

FIG. 21 shows an example XYU sensing array 2100 in accordance with some embodiments. XYU sensing array 2100 may include X axis electrodes 2104, Y axis electrodes 2102 and U axis electrodes 2106. X axis electrodes 2104 may define an X sensing axis, Y axis electrodes 2102 may define a Y sensing axis, and U axis electrodes 2106 may define a U sensing axis of XYU sensing array 2100. For two concurrent touches 2108 and 2110 from a common touch entity along the X sensing axis, touches 2108 and 2110 would only share overlapping anti-ghosts if the sensing array were an XY sensing array (e.g., as shown in FIG. 13). However, with the additional U sensing axis, anti-ghosts 2112 and 2114 can be detected by the controller and a determination can be made that touches 2108 and 2110 share (e.g., non-overlapping) anti-ghosts 2112 and 2114 at the intersections of projections of touches 2108 and 2110 perpendicular to X and U sensing axis directions. Here, anti-ghosts 2112 and 2114 may be XU anti-ghosts.

Figure 22:
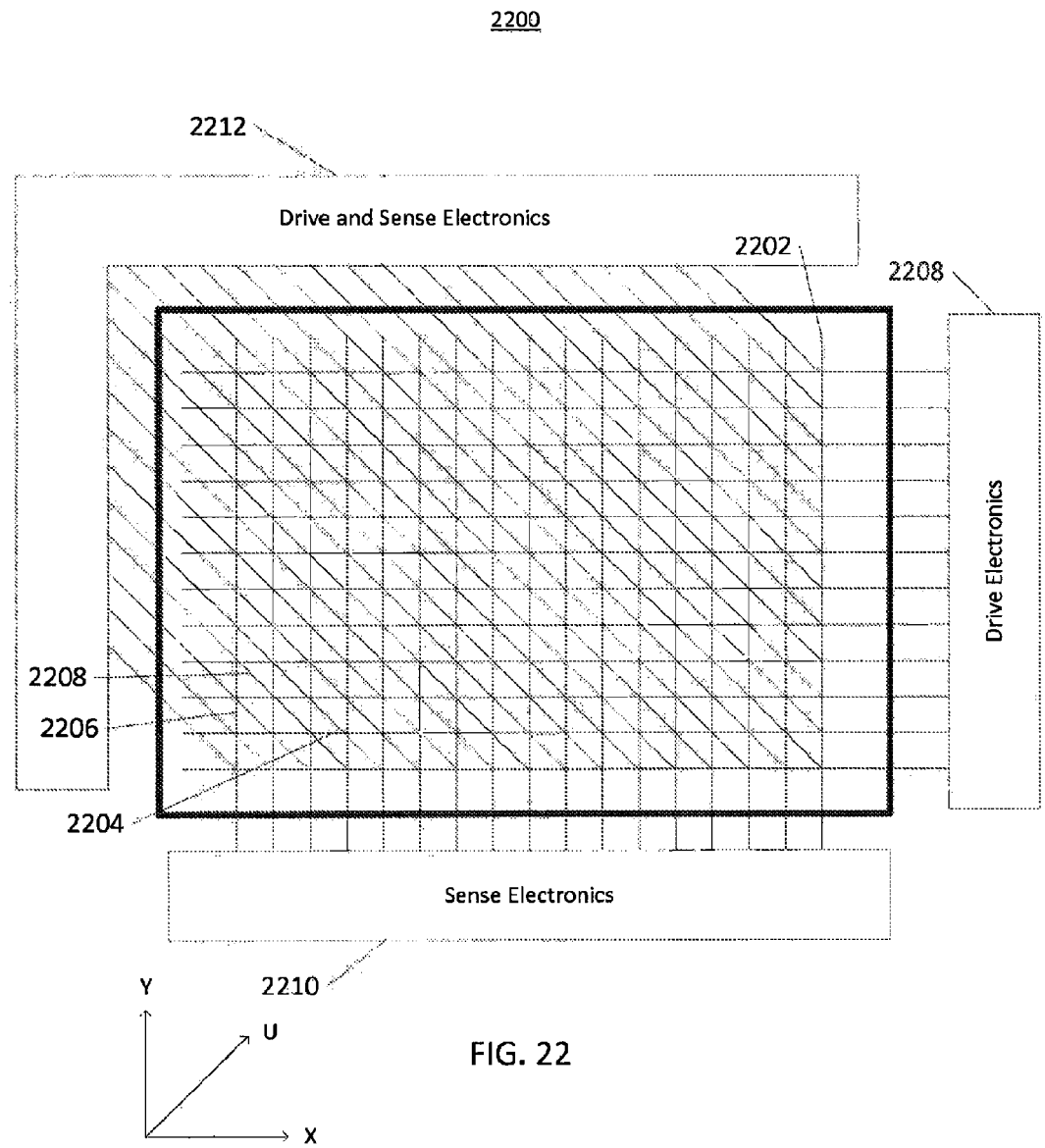
FIG. 22 shows an example XYU touch sensor in accordance with some embodiments.

FIG. 22 shows an example XYU touch sensor 2200 in accordance with some embodiments. XYU touch sensor 2200 is a three sensing axis touch sensor configured to perform (two axis) anti-ghost measurements. XYU touch sensor 2200 includes XYU sensing array 2202 including X axis electrodes 2206, Y axis electrodes 2204, and U axis electrodes 2208. XYU touch sensor 2200 further includes drive electronics 2208 connected with Y axis electrodes 2204 (e.g., drive electrodes), sense electronics 2210 connected with X axis electrodes 2206 (e.g., sense electrodes), and drive and sense electronics 2212 connected with U axis electrodes 2208 (e.g., drive and sense electrodes).

Drive and sense electronics 2212 can be configured to enable measurement of capacitance and, thus, detect anti-ghosts at XY, XU and YU electrode intersections. For example, if Y axis electrodes 2204 operates only in the drive mode and X axis electrodes 2206 operate only in the sense mode, U axis electrodes 2208 may operate in the drive mode to detect XU anti-ghosts and may operate in the sense mode to detect YU anti-ghosts. As shown, multi-axis touch sensors do not necessarily require drive and sense electronics for each sensing axis to support detection of all one axis anti-ghosts. In general, for a multi-axis touch sensor, one sensing axis may include only drive electronics, one sensing axis may include only sense electronics, and the remaining sensing axis may include drive and sense electronics.

Figure 23:
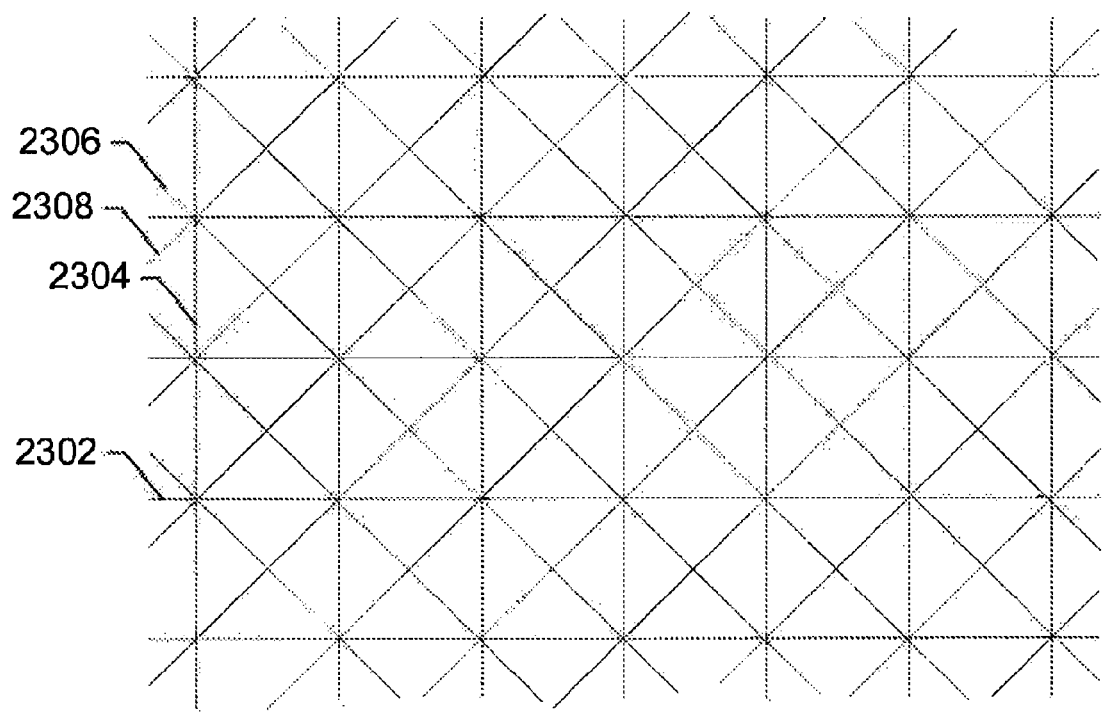
FIG. 23 shows an example XYUV sensing array in accordance with some embodiments.
Figure 23:
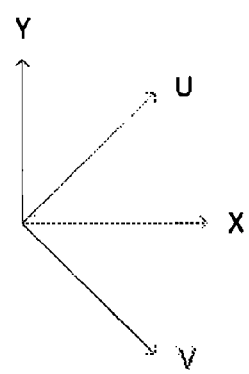

FIG. 23 shows an example XYUV sensing array 2300 in accordance with some embodiments. XYUV sensing array 2300 may include X axis electrodes 2304, Y axis electrodes 2302, U axis electrodes 2306, and V axis electrodes 2308. X axis electrodes 2304 may define an X sensing axis, Y axis electrodes 2302 may define a Y sensing axis, U axis electrodes 2306 may define a U sensing axis, and V axis electrodes 2308 may define a V sensing axis. In general, sensing axis orientations are not limited to the examples shown. For example, a three sensing axis touch sensor is not limited to the XYU orientation, and may include a more symmetric XUV orientation where there is a 60° angle between the directions of each sensing axis (e.g., as defined by the sensing array).

In some embodiments, a touch sensor may include more than four sensing axes. FIG. 21 shows a trend that an increase in the number of sensing axes may correspond with an increase in number of concurrent touches that may be supported without touch entity identification ambiguity (e.g., at least one non-overlapping anti-ghost is shared for each touch pair generated by a common touch entity). For example, two sensing axes (e.g., XY) touch sensor may support one touch without ambiguity not using one axis anti-ghost measurements and two touches without ambiguity using one axis anti-ghost measurements, as discussed above in connection with FIGS. 18-20. In another example, a three sensing axes (e.g., XYU) touch sensor may support three touches without ambiguity, regardless of whether one axis anti-ghost measurements are used.

Multi-Sensing Axis Sensing Arrays

Figure 24:
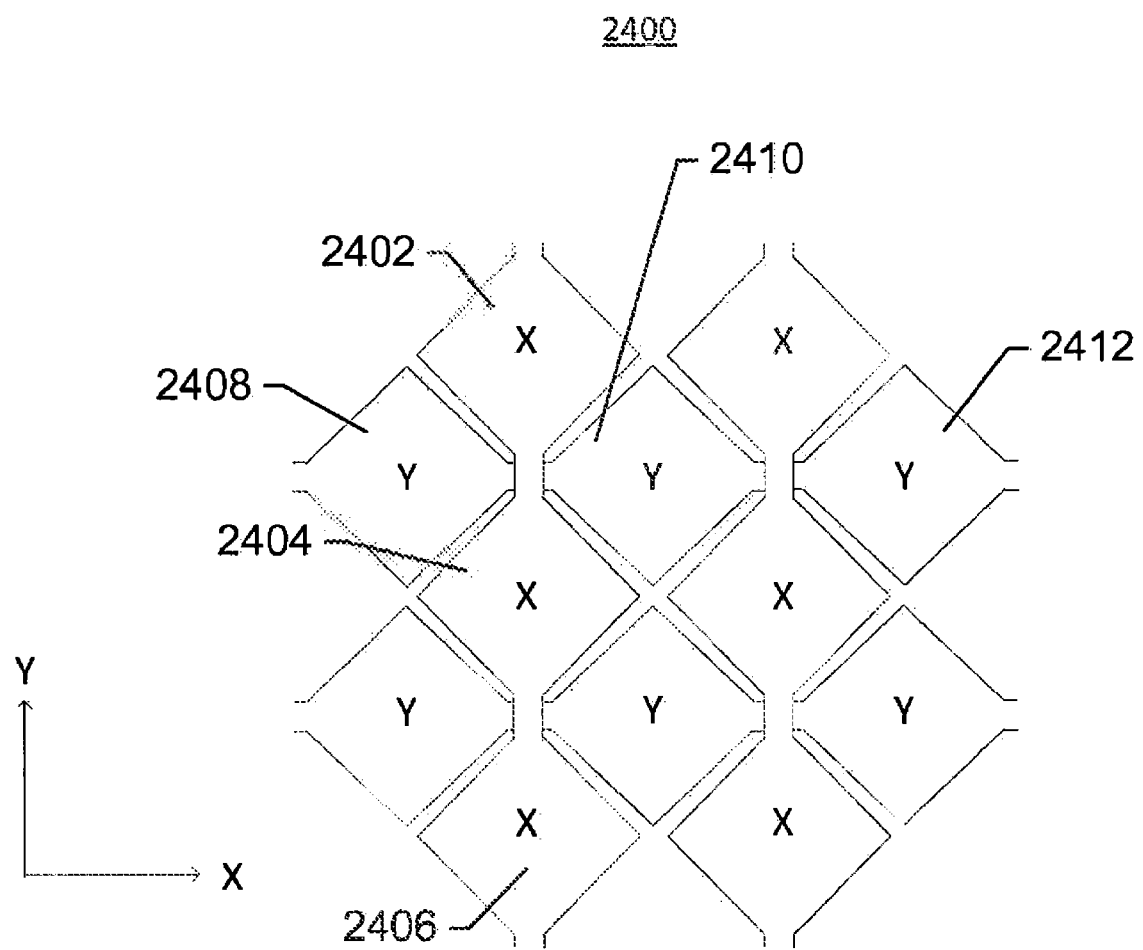
FIG. 24 shows an example XY sensing array including polygonal electrodes in accordance with some embodiments.

In some embodiments, a sensing array may include electrode geometries other than the stripe structures shown in FIG. 1 for X axis electrodes 114 and Y axis electrodes 112 of sensing array 104. FIG. 24 shows an example sensing array 2400 in accordance with some embodiments. Sensing array 2400 may include polygonal electrodes, with interconnected groups of electrodes defining the X and Y sensing axis. For example, interconnected electrodes 2402, 2404 and 2406 (e.g., as well as the other electrodes labeled "X") may define the X sensing axis and may be connected with drive and/or sense electronics (e.g., as shown in FIGS. 17 and 18). Similarly, interconnected electrodes 2408, 2410 and 2412 (e.g., as well as the other electrodes labeled "Y") may define the Y sensing axis and may also be connected with drive and/or sense electronics.

Figure 25:
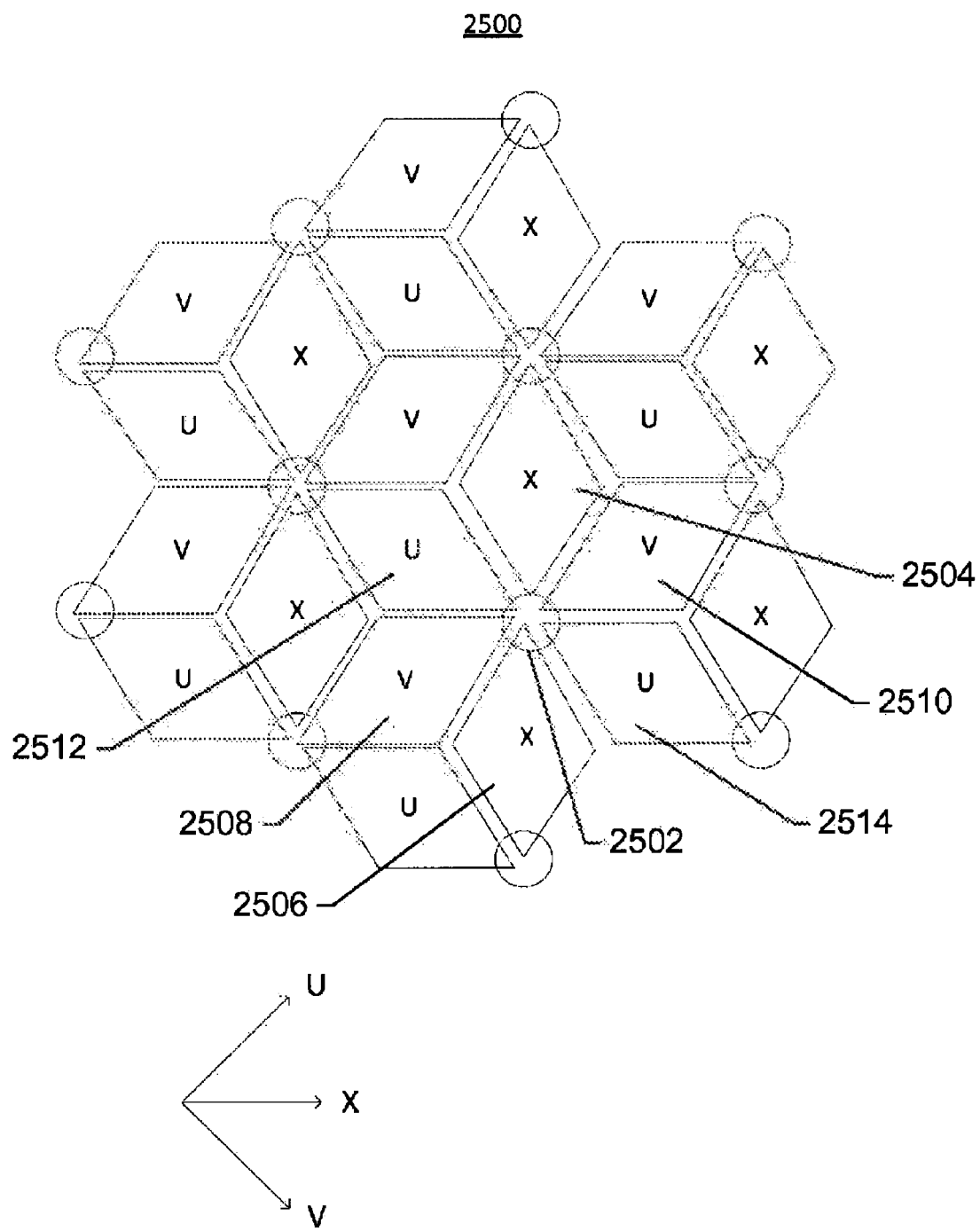
FIG. 25 shows an example XUV sensing array in accordance with some embodiments.

FIG. 25 shows an example XUV sensing array 2500 in accordance with some embodiments. XUV sensing array 2500 may include a first plurality of electrodes (e.g., X axis electrodes marked "X") that define an X sensing axis, a second plurality of electrodes (e.g., U axis electrodes marked "U") that define a U sensing axis, and a third plurality of electrodes (e.g., V axis electrodes marked "V") that define the V sensing axis. In some embodiments, each of the electrodes may be disposed on a single electrode substrate layer (e.g., via disposing ITO to form the electrodes on a glass or a polymer substrate such as PET). Advantageously, the XUV orientations may be symmetrically oriented with 60° angle between the directions of each sensing axis. Alternatively, the pattern of FIG. 25 may be subjected to any two-dimensional linear transformation to produce another design with different angles between the X, U, and V. For example, transforming the Cartesian coordinates of the plane of FIG. 25 with the shear matrix M where Mxx=2/√3, Mxy=0, Myx=1/√3 and Myy=1 would leave the X sensing direction unchanged, orient the V sensing direction to be in the Y direction, and orient the U direction at 45° between the X and Y directions, that is transform XUV into XYU.

Figure 26:
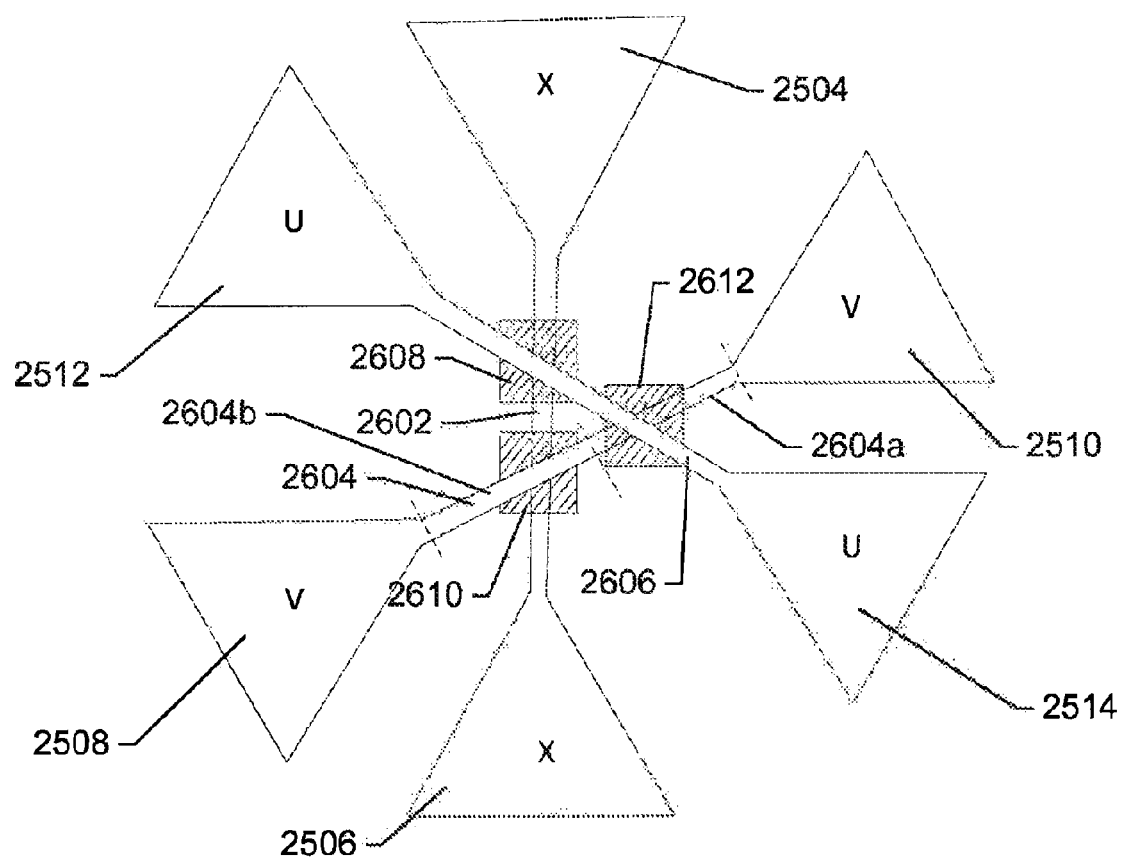
FIG. 26 shows an example single layer bridge of the XUV sensing array shown in FIG. 25 in accordance with some embodiments.

XUV sensing array 2500 may include one or more single layer bridges, such as single layer bridge 2502. Alternatively, multiple layer bridges may be used to make the desired connections, however to minimize manufacturing cost by reducing the number of manufacturing steps, single layer bridge designs may be preferable. At a single layer bridge, two electrodes of the first plurality of electrodes (e.g., X electrodes) may be electrically connected, two electrodes of the second plurality of electrodes (e.g., U electrodes) may be electrically connected, and two electrodes of the third plurality of electrodes may be electrically connected. FIG. 26 shows a more detailed view of single layer bridge 2502 in accordance with some embodiments. At single layer bridge 2502, X axis electrodes 2504 and 2506 may be connected with each other via conductive connection 2602, V axis electrodes 2508 and 2510 may be connected with each other via conductive connection 2604, and U axis electrodes 2512 and 2514 may be connected with each other via conductive connection 2606.

Electrodes defining different sensing axes may not be interconnected. Rather, single layer bridge 2502 may be configured to isolate electrodes of different sensing axes from conductive contact via one or more insulating layers. For example, conductive connection 2602 may be isolated from conductive connections 2604 and 2606 by insulating material 2610 and 2608, respectively. Furthermore, conductive connection 2604 may be isolated from conductive connection 2606 by insulating material 2612.

In some embodiments, conductive connections 2602, 2604 and 2606 are disposed such that they do not all intersect at one spatial location, in order to avoid requiring the manufacturing cost of multiple insulating material layers to electrically isolate each of conductive connections 2602, 2604 and 2606 and the intersection (e.g., connection 2602, first insulating material layer, connection 2604, second insulating material layer, and connection 2606). Rather, by spatially separating the intersections the conductive connections, a single layer of insulating material may be used. For example insulating materials 2608, 2610 and 2612 may define a thickness of the single layer of insulating material. As such, touch sensor thickness, manufacturing complexity (e.g., number of layering steps), and production costs may be reduced.

Figure 27:
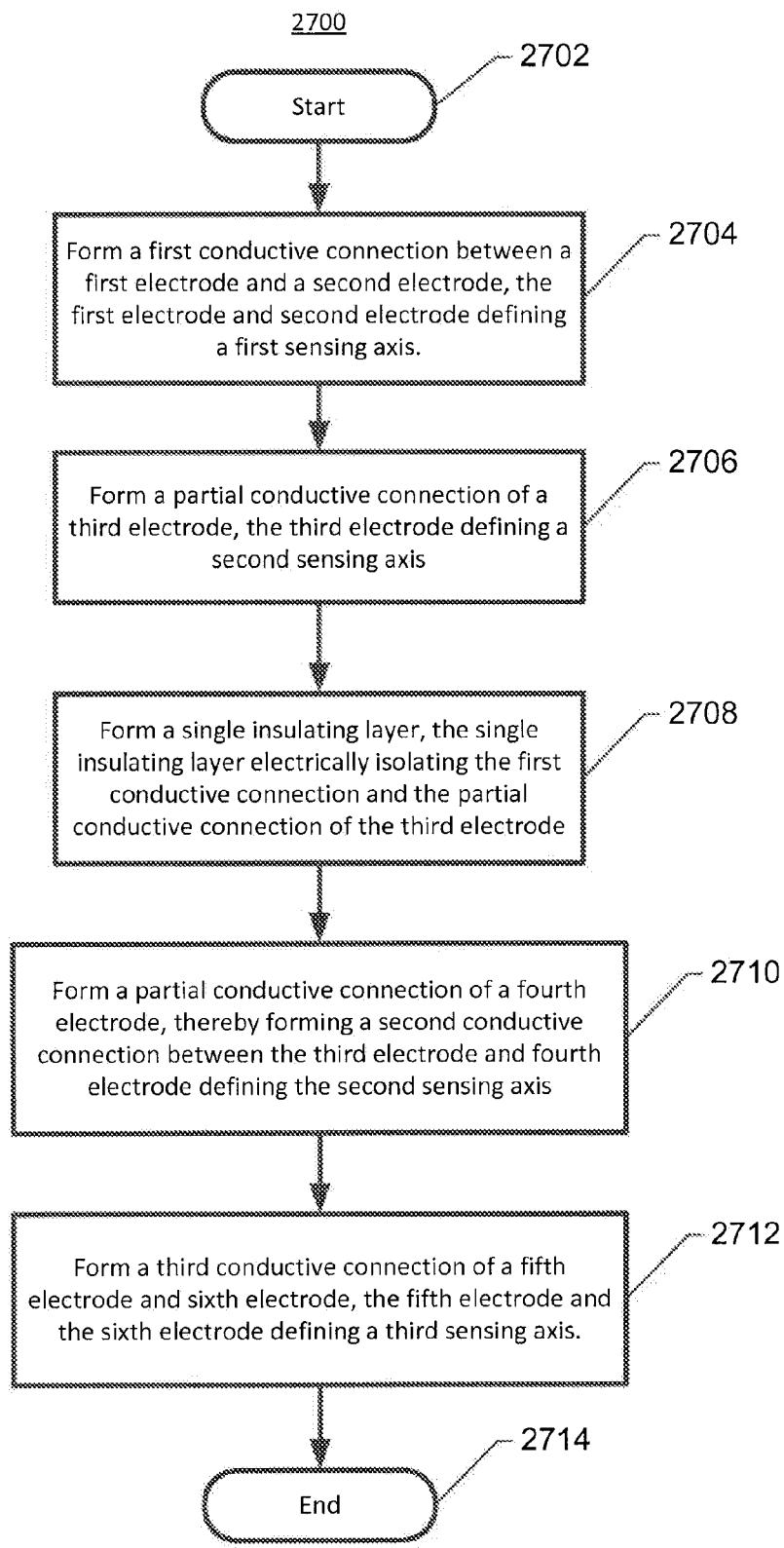
FIG. 27 shows an example method for manufacturing a single layer bridge performed in accordance with some embodiments.

FIG. 27 shows an example method 2700 for manufacturing a single layer bridge performed in accordance with some embodiments. Method 2700 may be performed, for example, to manufacture a plurality of single layer bridges of a sensing array and is described with reference to single layer bridge 2502 shown in FIG. 26.

Method 2700 may begin at 2702 and proceed to 2704, where a first conductive connection between a first electrode and a second electrode may be formed. The first electrode and the second electrode may define a first sensing axis of a sensing array. For example, conductive connection 2602 (e.g., as shown in FIG. 27) may be formed between X axis electrodes 2504 and 2506 that define the X sensing axis. In some embodiments, the conductive connections (e.g., like the electrodes) may be formed of ITO disposed on electrode substrate layer (e.g., glass). Furthermore, the conductive connections may be disposed before, after, or in the same ITO placement step as electrodes. In some embodiments, other transparent and electrically conductive materials other than ITO may be used for the electrodes and/or conductive connections.

At 2706, a partial conductive connection of a third electrode may be formed. The third electrode may define a second sensing axis. For example, partial conductive connection 2604a of conductive connection 2604 of V axis electrode 2510 may be formed, where V axis electrode 2510 may define the V sensing axis. However, the other portion of conductive connection 2604, namely partial conducive connection 2604b, is not be formed at 2607. In some embodiments, steps 2704 and 2706 may be performed during one and the same manufacturing step in order to minimize the number of manufacturing steps.

At 2708, a single insulating layer may be formed. The single insulating layer may electrically isolate the first conductive connection and the partial conductive connection of the third electrode, such as from other conductive connections formed on top of the single insulating layer. For example, the single insulating layer may include one or more insulating materials 2608, 2610 and 2612 that may define a thickness of the single layer of insulating material. In some embodiments, each of the one or more insulating materials may be formed in a single placement step.

At 2710, a partial conductive connection of a fourth electrode may be formed. The partial conductive connection of the fourth electrode may be electrically connected with the partial conductive connection of the third electrode, thereby forming a second conductive connection between the third electrode and fourth electrode defining the second sensing axis. For example, partial conductive connection 2604b of conductive connection 2604 of V axis electrode 2508 may be formed such that V axis electrodes 2508 and 2510 are connected via conductive connection 2604. V axis electrodes 2508 and 2510 may define the V sensing axis.

At 2712, a third conductive connection of a fifth electrode and sixth electrode may be formed. The fifth electrode and the sixth electrode defining a third sensing axis. For example, conductive connection 2606 of U axis electrodes 2512 and 2514 may be formed, where U axis electrodes 2512 and 2414 define the U sensing axis. Method 2700 may then proceed to 2714 and end. In some embodiments, steps 2710 and 2712 may be performed in the same manufacturing step in order to minimize the number of manufacturing steps.

Figure 28:
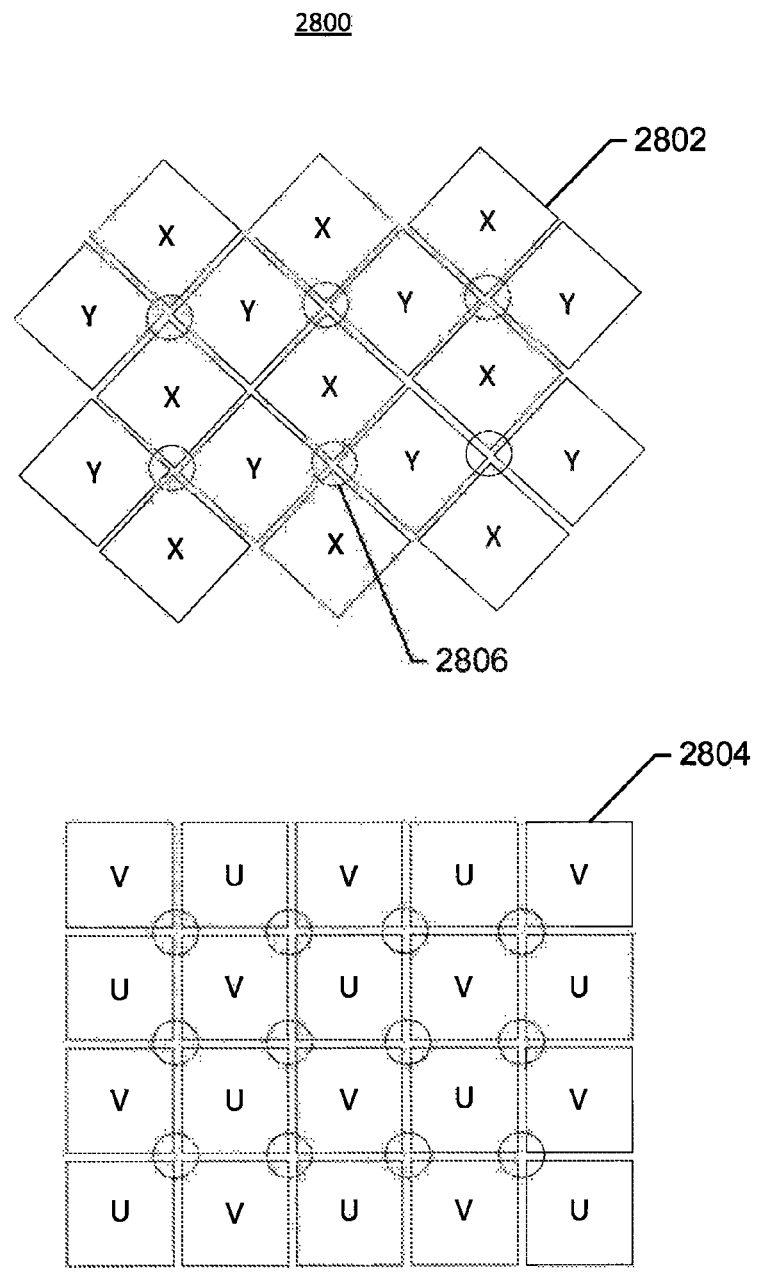
FIG. 28 shows an example of an XYUV sensing array in accordance with some embodiments.

FIG. 28 shows an example of an XYUV sensing array 2800 in accordance with some embodiments. XYUV sensing array 2800 may include two electrode substrate layers on which XY and UV electrodes may be disposed, respectively. For example, XYUV sensing array 2800 may include top electrode substrate layer 2802 and bottom electrode substrate layer 2804. X axis electrodes and Y axis electrodes (e.g., marked "X" and "Y," respectively) may be disposed on top electrode substrate layer 2802. U axis electrodes and V axis electrodes (e.g., marked "U" and "V," respectively) may be disposed on bottom electrode substrate layer 2804.

Figure 29:
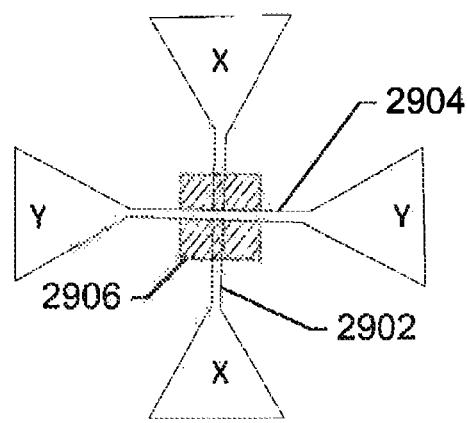
FIG. 29 shows an example single layer bridge of the XYUV sensing array shown in FIG. 28 in accordance with some embodiments.

The X axis electrodes and the Y axis electrodes may be interconnected to form the X and Y sensing axis via single layer bridges, such as single layer bridge 2806. FIG. 29 shows an example single layer bridge 2806 in accordance with some embodiments. At single layer bridge 2806, the X axis electrodes may be connected via conductive connection 2902 and the Y axis electrodes may be connected via conductive connection 2904. Furthermore, conductive connections 2902 and 2904 may be electrically isolated from each other via insulating material 2906.

FIG. 30 shows a cross sectional view of XYUV sensing array 2800 in accordance with some embodiments. XY electrodes 2802 may be disposed on top electrode substrate layer 3002. UV electrodes 2804 may be disposed on bottom electrode substrate layer 3004. Next, electrode substrate layers 2802 and 2804 may be joined, such as by adhesive layer 3006. In some embodiments, adhesive layer 3006 may be an optically clear adhesive. In some embodiments, XY electrodes and UV electrodes may be fabricated on opposite surfaces of a single substrate, which in turn may be bonded via an adhesive layer to a protective layer of glass or plastic.

Figure 31:
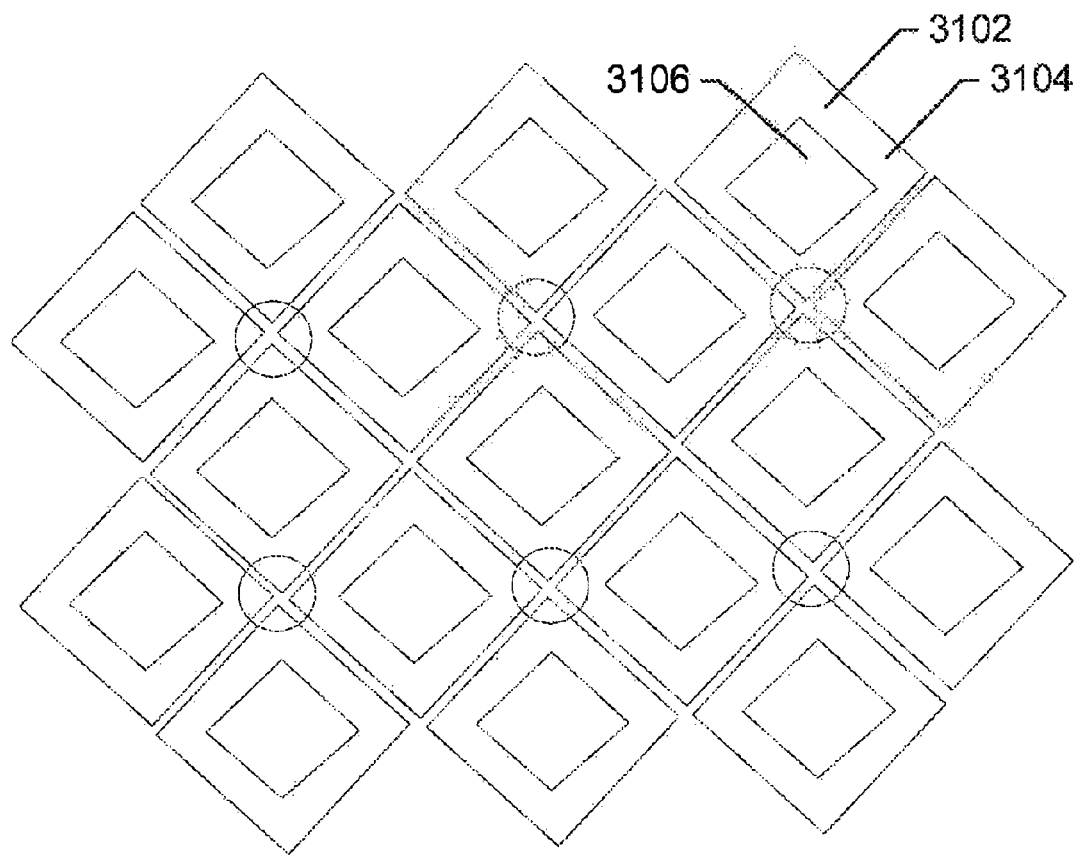
Figure 32:
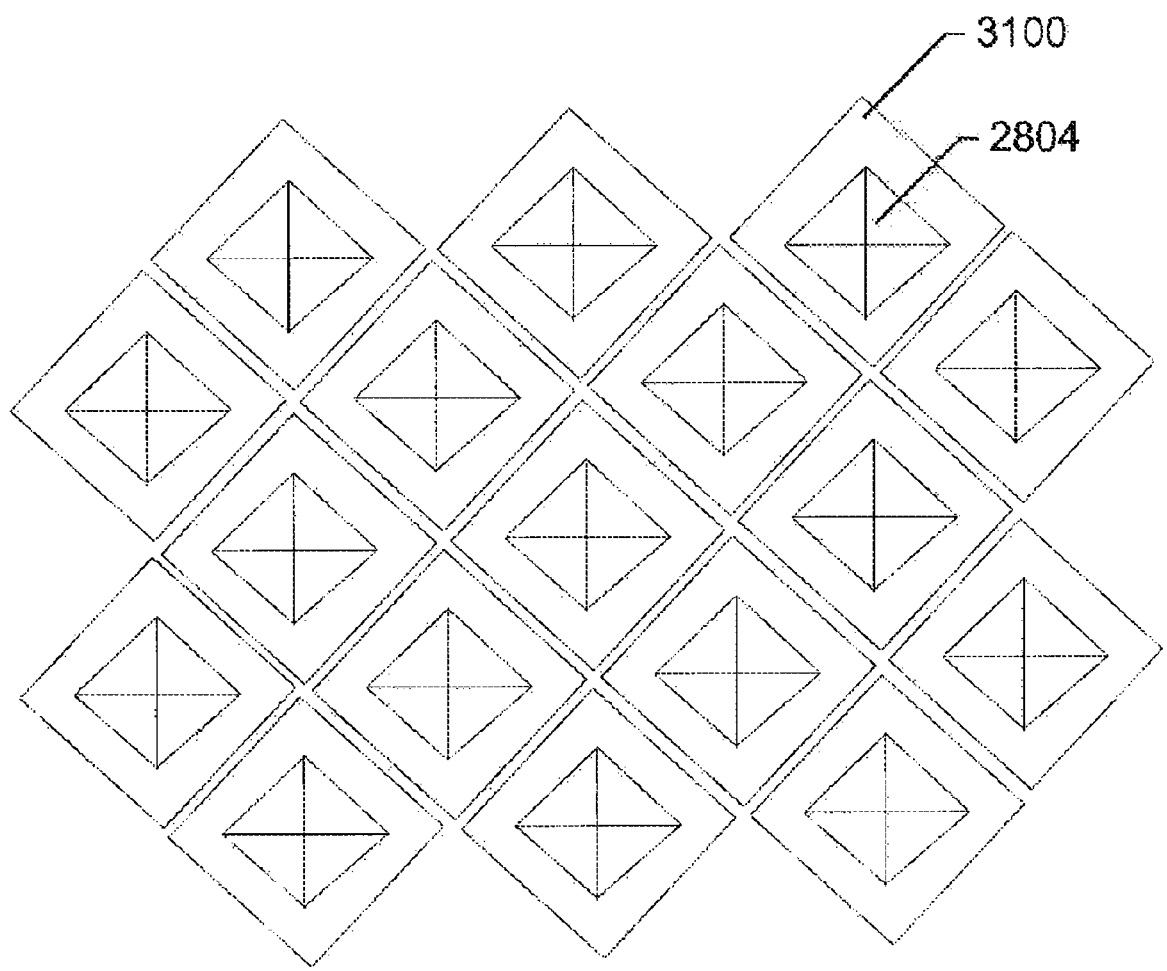
FIG. 32 shows an example XYUV sensing array including the top electrode substrate layer of FIG. 31 in accordance with some embodiments.

In some embodiments, a sensing array with multiple electrode substrate layers may include one or more bordered electrodes. FIG. 31 shows an example top electrode substrate layer 3100 in accordance with some embodiments. Unlike top electrode substrate layer 2802 (e.g., as shown in FIG. 28), top electrode substrate layer 3100 may include bordered electrodes 3102. Each bordered electrode 3102 may include border region 3104 and open (e.g., no ITO or other conductive material) region 3106. Open region 3106 may prevent shielding of a bottom electrode substrate layer (e.g., bottom electrode substrate layer 2804 shown in FIG. 28) from electrical interaction with touch entities by the top electrode substrate layer. FIG. 32 shows an example XYUV sensing array 3200 in accordance with some embodiments. XYUV sensing array 3200 may include top electrode substrate layer 3100 (e.g., with bordered electrodes) and bottom electrode substrate layer 2804 (e.g., as shown in FIG. 28). As show, the UV electrodes of bottom electrode substrate layer 2804 receive less shielding from touches through the open regions 3106 of bordered electrodes 3102 (e.g., as shown in FIG. 31).

Figure 33:
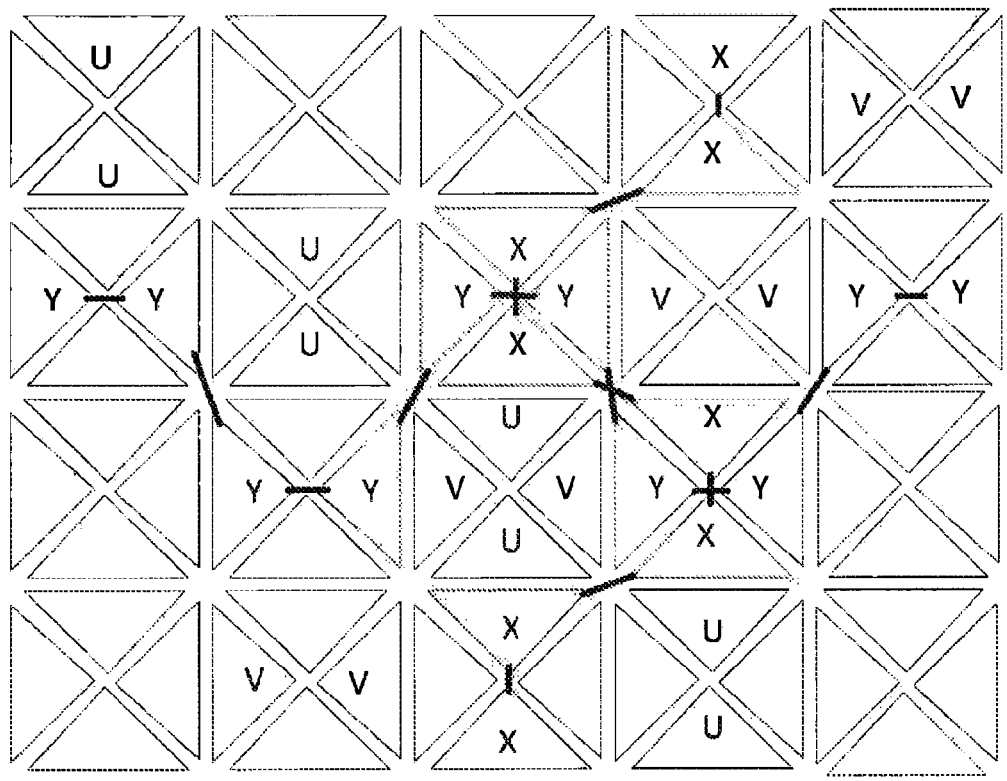
FIG. 33 shows an example XYUV sensing array in accordance with some embodiments.
Figure 33:
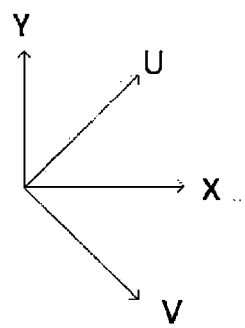
Figure 34:
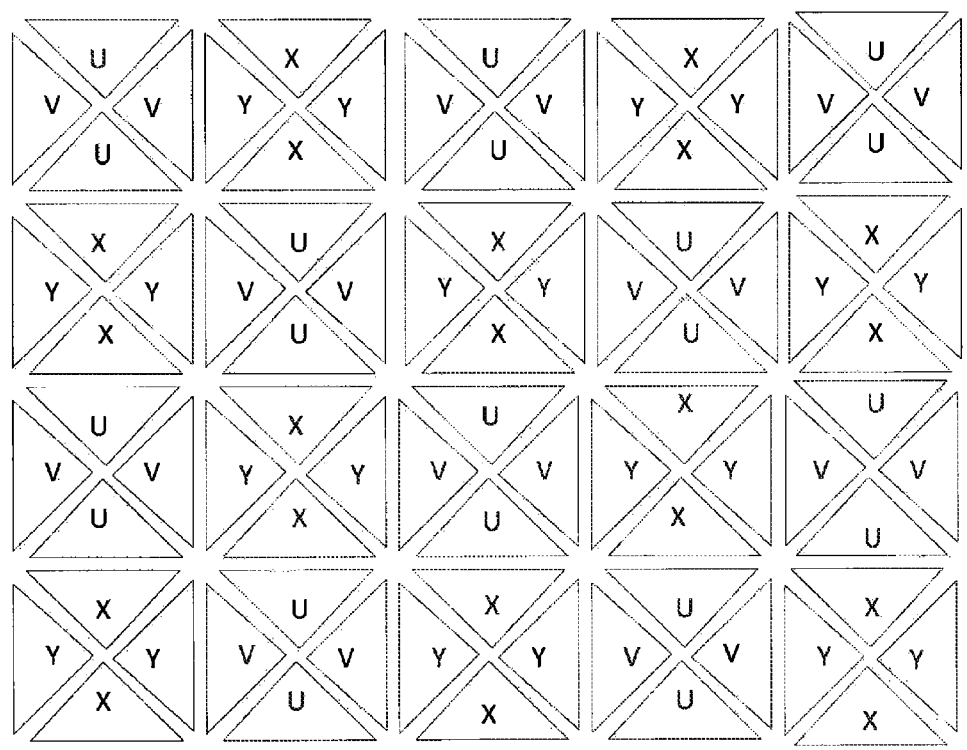
FIG. 34 shows the XYUV sensing array of FIG. 33 in accordance with some embodiments.

FIG. 33 shows an example XYUV sensing array 3300 in accordance with some embodiments. XYUV sensing array 3300 is an example four sensing axes sensing array including electrodes formed on a single electrode substrate layer. In FIG. 33, only one electrode group per axis is labeled. For example, one X axis electrode group may include the electrodes labeled "X" and may be interconnected (e.g., via bridges providing conductive connections) as shown such that the X axis electrode group defines the X sensing axis. One Y axis electrode group may include the electrodes labeled "Y" and may be interconnected (e.g., via bridges providing conductive connections) as shown such that the Y axis electrode group defines the Y sensing axis. Similarly, one U axis electrode group and V axis electrode group that define, respectively, the U and V sensing axis are also shown, although the conductive connections are omitted to avoid overcomplicating FIG. 33. FIG. 34 shows the XYUV sensing array 3300 of FIG. 33, except here, each electrode is labeled to illustrate electrode placement for multiple electrode groups of the X, Y, U and V sensing axis.

Figure 35:
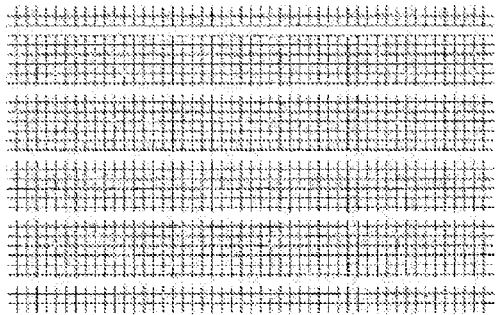
FIG. 35 show example conductive meshes in accordance with some embodiments.
Figure 35:
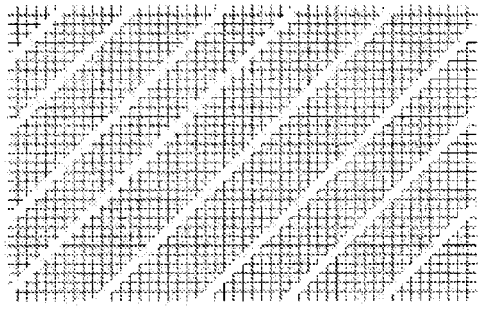
Figure 35:
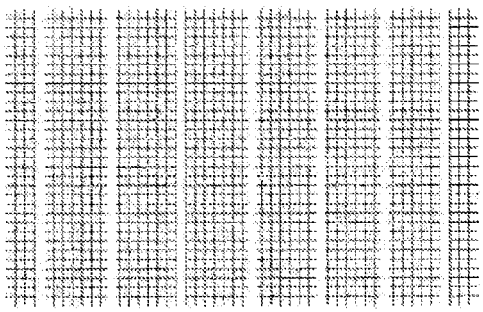
Figure 35:
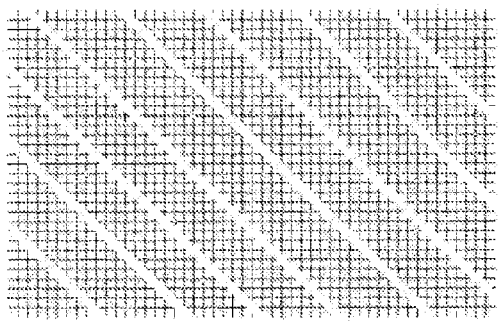

In some embodiments, a sensing array may be formed of conductive mesh electrodes rather than electrodes formed of continuous coatings. FIG. 35 shows example conductive meshes 3500, 3520, 3540 and 3560 in accordance with some embodiments. Conductive meshes 3500, 3520, 3540 and 3560 may be each formed of thin and highly conductive metallic material, such as copper or silver. The line widths may be sufficiently fine (e.g., perhaps only a few microns wide) and/or cover such a small fraction of the surface area that from a user's perspective the mesh may be perceived as transparent (e.g., even when the metallic material would be otherwise opaque). Furthermore, to electrically isolate neighboring electrodes, conductive meshes 3500, 3520, 3540 and 3560 may each include deletion lines (e.g., where trace lines are absent) that define the sensing axis. For example, conductive mesh 3500 may define the Y sensing axis, conductive mesh 3520 may define the V sensing axis, conductive mesh 3540 may define the X sensing axis, and conductive mesh 3460 may define the U sensing axis. Advantageously, the open structure of the conductive meshes may prevent top conductive mesh layers from completely shielding bottom conductive mesh layers when the conductive meshes are disposed on top of each other to form a sensing array.

Figure 36:
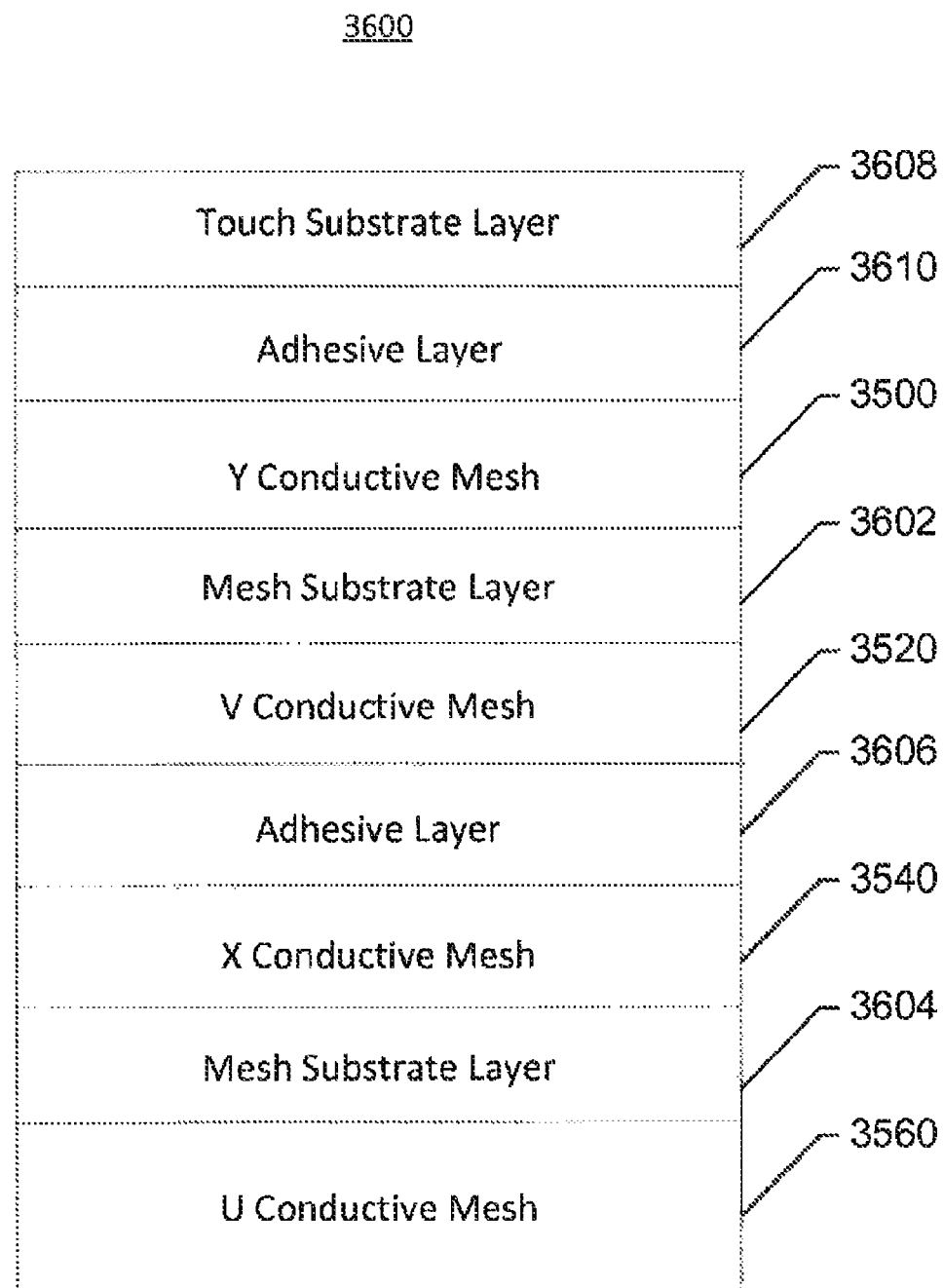
FIG. 36 shows a cross sectional view of an example XYUV sensing array including conductive meshes shown in FIG. 35 in accordance with some embodiments.

FIG. 36 shows a cross sectional view of an example XYUV sensing array 3600 in accordance with some embodiments. XYUV sensing array 3600 may include Y (e.g., Y sensing axis) conductive mesh 3500, V conductive mesh 3520, X conductive mesh 3540, and U conductive mesh 3560. Y conductive mesh 3500 and V conductive mesh 3520 may be disposed on opposite sides of mesh substrate layer 3602, which in some embodiments, may include PET. Similarly, X conductive mesh 3540 and U conductive mesh 3560 may be disposed on opposite sides of mesh substrate layer 3604. Mesh substrate layers 3602 and 3604 (including their conductive meshes) may be joined via adhesive layer 3606, which may be further joined to touch substrate layer 3608 via adhesive layer 3610. In various embodiments, the layering of the conductive meshes within XYUV sensing array 3600 may be different. For example, the Y and U conductive meshes may be exchanged within the layer structure and/or any other two conductive meshes.

Multi-User Multi-Touch Applications

The touch sensors discussed herein may be leveraged in virtually any context or embodiment in which multiple users simultaneously operate a touch screen. Advantageously, some embodiments may support multi-touch functionality for multiple users at the same time.

Figure 37A:
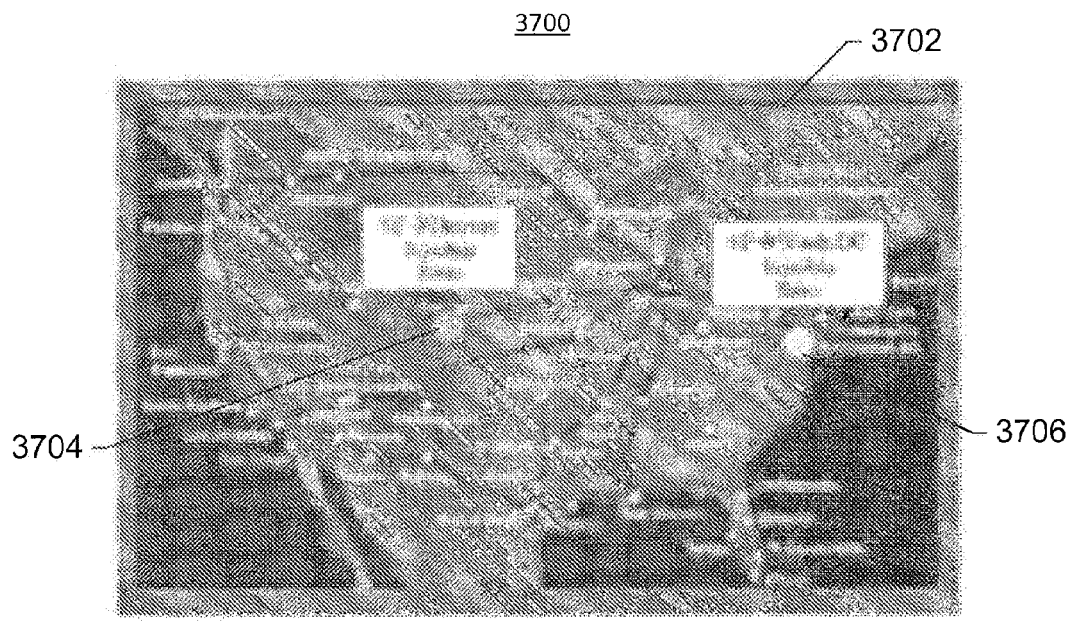
FIGS. 37A and 37B show example interactive digital signage in accordance with some embodiments.
Figure 37B:
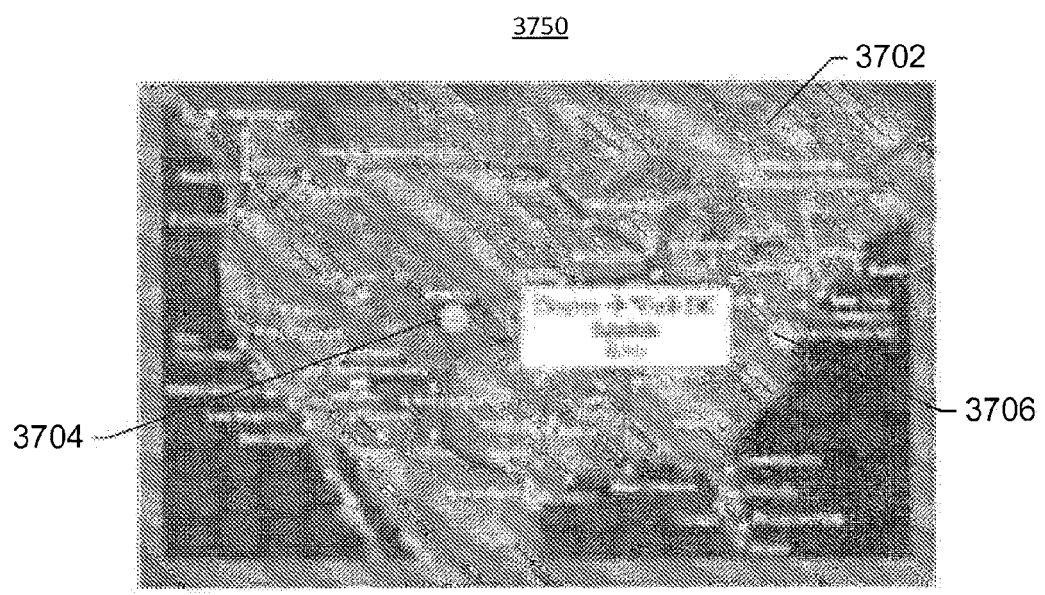

FIGS. 37A and 37B show example interactive digital signage 3700 and 3750 in accordance with some embodiments. An interactive digital signage may include a display for providing a user interface and touch sensor. Via touches on the touch sensor, users may be allowed to interact with the user interface. For example, interactive digital signage 3700 and 3750 may be located in a train station in San Francisco for traveler use and may include an interactive map 3702. As shown in FIG. 37A, in response to determining that touches 3704 and 3706 do not share an anti-ghost, and therefore, are generated by different touch entities, a multiple touch-entity interaction mode may be initiated. Here, touch 3704 indicates Denver on interactive map 3702, and as such, information regarding train schedules and rates from San Francisco) to Denver may also be provided for the benefit of the first user. Concurrently, touch 3706 indicates Washington D.C. on interactive map 3702, and as such, information regarding train schedules and rates from San Francisco to Washington D.C. may be provided in response for the benefit of the second user.

As shown in FIG. 37B, in response to determining that touches 3704 and 3706 share at least one anti-ghost, and therefore, are generated by a common touch entity (e.g., an individual person), a common touch entity interaction made may be initiated. For example, the common touch entity interaction mode may provide multi-touch capability for the common touch entity based on touches 3704 and 3706. Here, because touch 3604 (e.g, placed first) indicates Denver and touch 3606 indicates Washington D.C., information regarding train schedules and rates from Denver to Washington D.C. may be provided in response.

Figure 38:
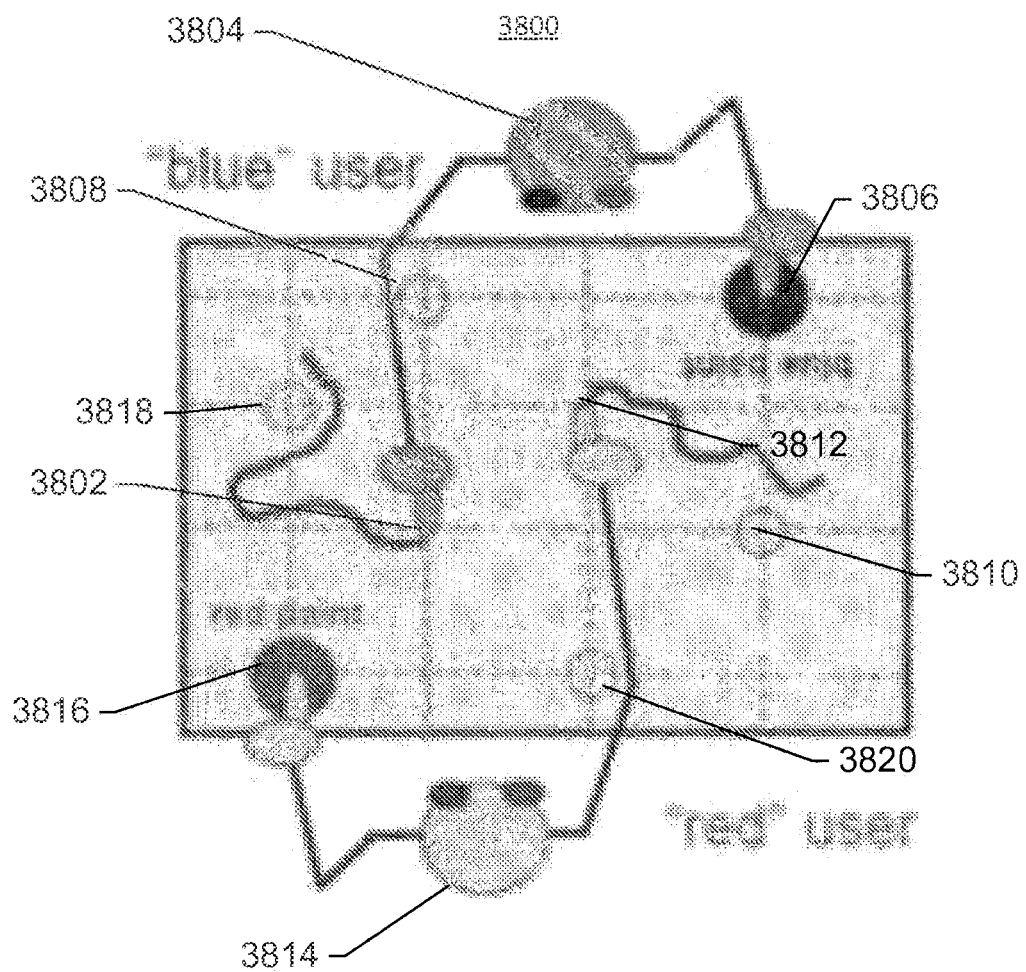
FIG. 38 shows an example computing device in accordance with some embodiments.

In some embodiments, a touch sensor and/or application (e.g., for interaction via the touch sensor) may be configured to identify a user based on a first touch and to receive touch inputs (e.g., for application interaction) via other concurrent touches of the user. FIG. 38 shows an example computing device 3800 that may include a touch sensor in accordance with some embodiments. As shown, touch 3802 may be associated with the same user as touch 3806 (e.g., user 3804) because touch 3802 and 3806 share anti-ghosts 3808 and 3810. As such, the left hand of user 3804 may be used to select the blue virtual paint can selection displayed at touch 3806 while the right hand of user 3804 may be used to concurrently draw with the blue virtual paint. Similarly, touch 3812 may be associated with the same user as touch 3816 (e.g., user 3814) because touch 3812 and 3816 share anti-ghosts 3818 and 3820. As such, the left hand of user 3814 may be used to select the red virtual paint can selection displayed at touch 3816 while the right hand of user 3814 may be used to concurrently draw with the red virtual paint.

Other examples of user touch identification may include a multi-user shopping cart application. For example, the display of an interactive digital signage may show a number of images and/or icons for items that can be purchased. A user may put an item into their shopping cart by touching a desired item with a first touch (e.g., using hand) and concurrently touching the user's shopping cart (e.g., icon) with a second touch (e.g., using the other hand). Advantageously, multiple users may operate the touch sensor and their touches may be identified based on shared anti-ghosts for concurrent touches without having to split the display or touch area into designated areas for each user.

In some embodiments, as discussed above in connection with FIG. 10, the touch sensor may be configured to determine whether a first person and a second person establish and/or discontinue electrically conductive contact. Such a feature may be leveraged in applications that require users to touch each other. For example, an application (e.g., a multi-player game), may ask two users to shake hands, high five, hug, or otherwise establish electrically conductive contact, which may be determined to have been successfully completed upon detecting an anti-ghost and determining it is shared with a first touch and a second touch, despite the anti-ghost being previously undetected when the first touch and the second touch were first detected.

In some embodiments, the touch sensor may be leveraged in applications that require two people to be present, such as for safety and/or security reasons. For example, the touch controller may be part of a building directory interactive digital signage (IDS) application in a building with an unsupervised swimming pool with a safety policy that no one is allowed to use the pool alone. In addition to written messages stating the safety policy on the IDS display and elsewhere, an IDS application may go a step further and not give directions and/or access to the swimming pool until two people simultaneously touch the IDS touchscreen (e.g., at least two touches that do not share any anti-ghosts). While solo swimmers may be tempted to simultaneously touch with two or more fingers in an attempt to satisfy the multi-touch IDS application, the IDS application can be configured to generate and then detect anti-ghosts, which may in turn be used to indicate touches from the same user (e.g., any two of the touches share at least one anti-ghost). In another example, an IDS access application with the ability to unlock a door (e.g., of a bank, warehouse or other facility storing high-value items) may be programmed to do so only if two users (e.g., employees) simultaneously request entry.

Figure 39:
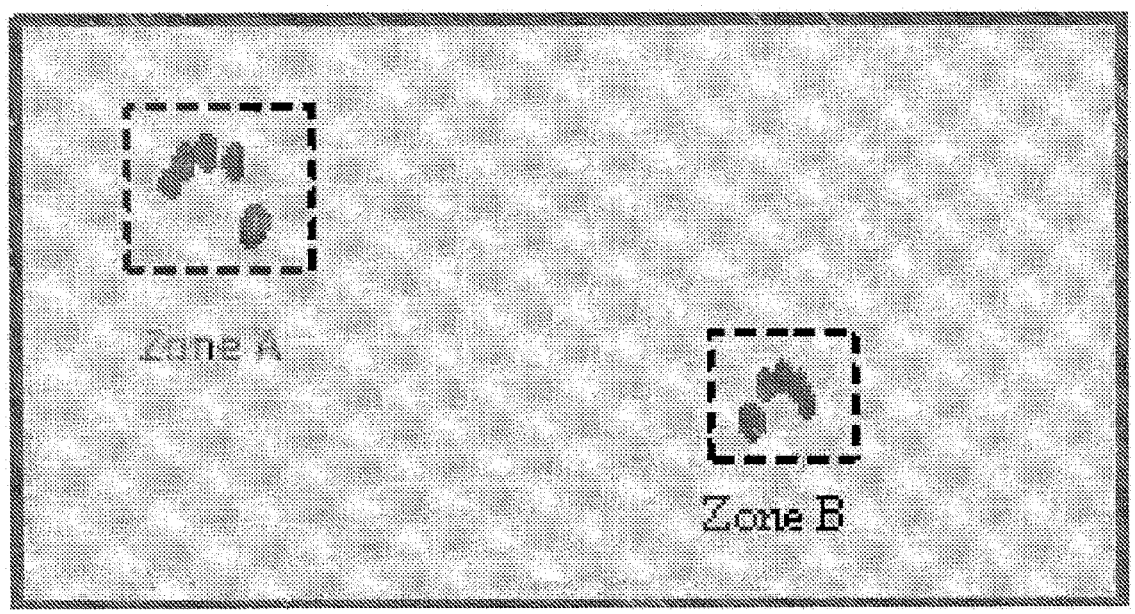
FIG. 39 shows an example interactive digital signage in accordance with some embodiments.

In some embodiments, special codes may be used that take advantage of anti-ghosts, such as for providing added security. FIG. 39 shows an example interactive digital signage (IDS) 3900 in accordance with some embodiments. For example, a preschool may provide IDS 3900 for allowing adults to check in and check out their children. As students arrive with their parents, a log-in application may be running on the IDS system. Each parent-child pair may have their own security code to enter while the parent's right hand is holding the child's left hand. The private security code of one particular parent-child pair may be a five finger touch in a (e.g., larger adult) left hand pattern in Zone A by the parent simultaneous with a five finger touch in a (e.g., smaller child) right hand pattern in Zone B. In some embodiments, Zone A and Zone B may be part of a displayed image of various animals and the parent-child's secret code could be "while holding hands simultaneously five-finger touch our favorite animal with our free hand". More sophisticated and unique codes (e.g., preferably for the adult, not the child) may be possible by varying the number of required touches in each hand, requiring more spread out or tightly clustered touches, tapping patterns etc. Anti-ghosts may be used to confirm that the parent and child are holding hands while touching, reducing the likelihood of spurious log-in data.

Multi-User Multi-Touch Tracking Using Multiple Touch Sensors

Some embodiments may provide for multiple touch sensors that support multi-touch functionality for multiple users at the same time. For multiple touches occurring concurrently on the different touch sensors, the touch sensors may be configured to determine touches that belong to a common touch entity and initiate a common touch entity interaction mode accordingly for those touches. The touch sensors may also determine that touches belong to different touch entities and may initiate a multi-touch entity interaction mode. For example, in the multi-touch entity interaction mode, multiple common touch entity interaction modes may be initiated for two or more users concurrently.

Figure 40A:
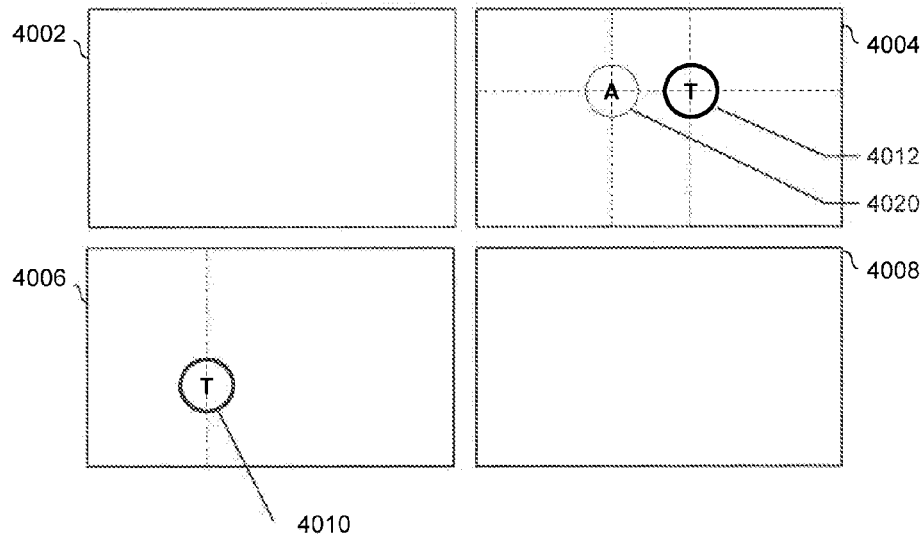
FIGS. 40A and 40B show example sense signal data plots from multiple touch sensors in accordance with some embodiments.
Figure 40B:
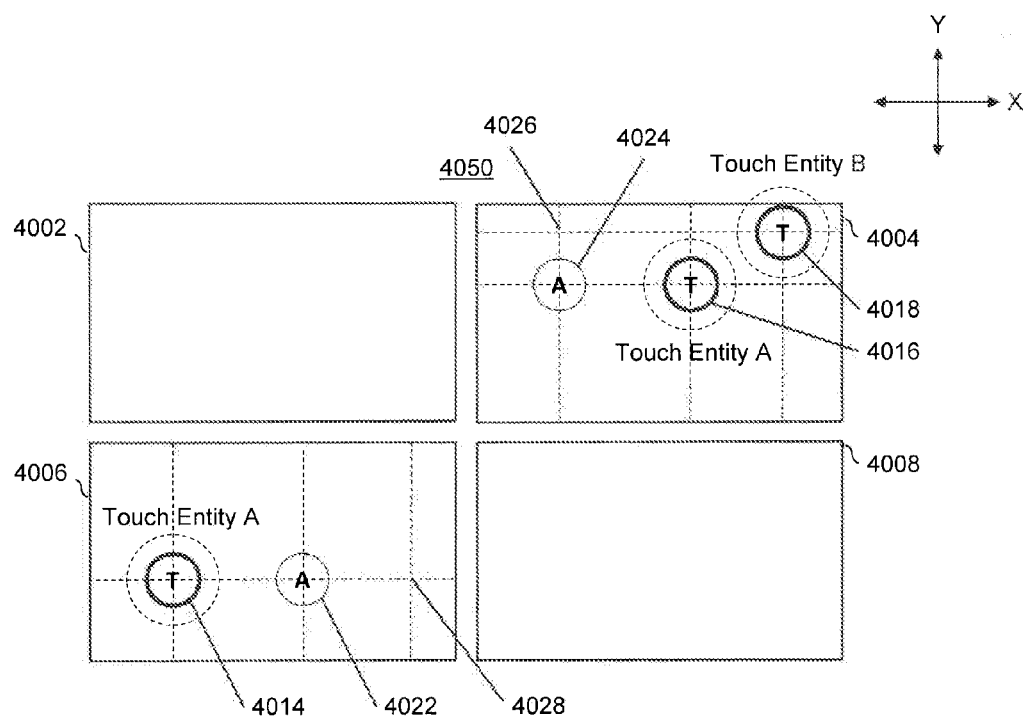

FIGS. 40A and 40B show example sense signal data plots 4000 and 4050, respectively, from multiple touch sensors in accordance with some embodiments. Like FIGS. 3, 5, 7, 8A, and 8B, for example, FIGS. 40A and 40B represent tables of entries corresponding to intersections between drive and sense electrodes. FIG. 40A shows touch sensors running asynchronously; FIG. 40B shows touch sensors running synchronously.

FIGS. 40A and 40B include touch sensors 4002, 4004, 4006, and 4008. In an embodiment, touch sensors 4002, 4004, 4006, and 4008 are each the same type of touch sensor as touch sensor 100, although in other embodiments, different sensor types are used. Although FIGS. 40A and 40B depict four touch sensors, embodiments of the invention also support any combination of type or number of touch sensors. For example, embodiments of the invention support 2, 3, 6, 10, etc. touch sensors.

In FIGS. 40A and 40B, touch sensors 4002, 4004, 4006, and 4008 are in communication with each other via a shared controller (not shown) that receives or transmits sense signals from touch sensors to one another. Alternatively or additionally, touch sensors 4002, 4004, 4006, and 4008 can each have their own controller, have a shared controller that is in communication with the touch sensors' respective controllers, or any combination thereof.

For clarity of presentation, electrodes in FIGS. 40A and 40B are not shown as numerous small entry boxes as in FIGS. 3, 5 and 7, but rather represent electrodes as a quasi-continuous horizontal axis and electrodes as a quasi-continuous vertical axis. Sense signal data plots 4000 and 4050 may be generated based on the sense signal data received from sensing arrays of the respective touch sensors, such as during a sensing cycle. Sense signal plots 4000 and 4050 may include backgrounds of the touch sensors representing the baseline mutual capacitance between drive and sense electrodes. Touches 4010, 4012, 4014, and 4016 may be generated by a first touch entity (e.g., touch entity A) and may represent mutual capacitance values less than the baseline mutual capacitance. Similarly, touch 4018 may be generated by a second touch entity (e.g., touch entity B) and may also represent mutual capacitance values less than the baseline mutual capacitance.

Referring to FIG. 40A, because touches 4010 and 4012 are from a common touch entity (e.g., touch entity A), circuitry discussed herein, e.g. a shared controller, can be configured to detect an anti-ghost associated with any two pairs of touches 4010 and 4012. Upon detecting an anti-ghost associated with a pair of touches from the sense signals received from the sensing arrays, the circuitry may be further configured to determine that pair of touches "share" an anti-ghost. For example, anti-ghost 4020 may be determined to be shared by touches 4010 and 4012.

In an embodiment, anti-ghost 4020 may be determined to be shared by touches 4010 and 4012 by detecting anti-ghost 4020 along a sense line shared with touch 4012. For example, the electronics of touch sensor 4006 can be driving the X electrode indicated by the dashed vertical line running through 4010, and the electronics of touch sensor 4004 can be driving the X electrode indicated by the vertical dashed line running through anti-ghost 4020. This will result in the anti-ghost signal 4020 appearing on the indicated horizontal sense line that associated electronics will associate with the position indicated at anti-ghost 4020. If the drive signal oscillation of the lower left electronics is in phase with the drive signals of the upper right electronics, the touch will produce anti-ghost 4020. If the two sets of electronics happen to be exactly or substantially 180° out of phase, then it may be determined that there is a ghost, but not an anti-ghost, at the location of anti-ghost 4020. More generally, touch sensor 4004 may be subjected to extra measurable electronic noise or interference when measuring mutual capacitance at the position of anti-ghost 4020. This extra measurable electronic noise or interference, when detected along the sense line shared with touch 4012, can indicate that touches 4010 and 4012 are by a common touch entity.

Because touch sensors 4002, 4004, 4006, and 4008 in FIG. 40A are running asynchronously, the offset between the driven vertical electrodes of the two touches along the sensing line may be random and vary with time. Accordingly, the location of extra electronic noise or interference can drift randomly along the sensing electrode, which is represented by the thin horizontal line passing under touch 4012.

In some embodiments, drive signals from touch sensor 4004 can pass through the common touch entity to sense electrodes (not shown) in touch sensor 4006 resulting in a measured location of electronic noise or interference that can drift randomly along a common sense line with touch 4010, e.g. at a position along horizontal electrodes under the touch 4010.

Referring to FIG. 40B, because touches 4014 and 4016 are from a common touch entity (e.g., touch entity A), circuitry discussed herein, e.g. a shared controller, can be configured to detect an anti-ghost associated with any two pairs of touches 4014 and 4016. Upon detecting an anti-ghost associated with a pair of touches from the sense signals received from the sensing arrays, the circuitry may be further configured to determine that pair of touches "share" an anti-ghost. For example, anti-ghost 4022 may be determined to be shared by touches 4014 and 4016.

In the example of FIG. 40B, touch sensors 4002, 4004, 4006, and 4008 run synchronously, i.e. corresponding electrodes from the touch sensors are concurrently driven. For example, when the left most X electrode of touch sensor 4006 is driven, so is the left most X electrode touch sensors 4002, 4004, and 4008. Although the following will discuss the situation in which the sensors are driven along the X axis placement, embodiments of the invention support other techniques for mapping electrodes of the touch sensors to each other. For example, the mapping can include an offset (e.g. X electrode of touch sensor 4002 corresponds to X+3 electrode of touch sensor 4004), an arbitrary mapping, or any mapping thereof. In an embodiment, drive signals from any combination of all or some of the touch sensors can be in phase.

In an embodiment, anti-ghost 4022 is determined to be shared by touches 4014 and 4016 by detecting anti-ghost 4022 along a sense line shared with touch 4014, by detecting anti-ghost 4024 along a sense line shared with touch 4016, or both. Touch sensors 4004 and 4006 are synchronized so that when a line on touch sensor 4004's X axis is driven, a corresponding line on touch sensor 4006 is driven at the same location on the X axis. For example, FIG. 40B shows a scenario in which one user touches the touch sensor 4006 at coordinates (X1,Y1), i.e. touch 4014, and another user touches the touch sensor 4004 at coordinates (X2,Y2), i.e. touch 4016. Because the two users are in electrical contact forming touch entity A, the anti-ghosts will appear and be steady and true anti-ghosts with opposite signal polarity relative to true touch locations. Anti-ghost 4022 will appear at location (X2,Y1) of the touch sensor 4006 and anti-ghost 4024 will appear at location (X1,Y2) in touch sensor 4004. In this example, the numerical values of X1, X2, Y1 and Y2 are with respect to the local coordinate system of the touch sensor containing the touch or anti-ghost.

As shown in FIG. 40B, anti-ghosts may be detected at intersections of projections of a first touch of a touch entity on a first touch sensor and the driven line on the first touch sensor corresponding to a driven line of a second touch on a second touch sensor. For example, anti-ghost 4024 may be detected at the intersection of the projection of touch 4016 along the X axis and the projection along the Y axis of the line corresponding to the driven line from touch 4014. Similarly, anti-ghost 4022 may be detected at the intersection of the projection of touch 4014 along the X axis direction and the projection along the Y axis of the line corresponding to the driven line from touch 4016, which results in anti-ghost 4022.

As shown in sense signal data plot 4050, two touches from different touch entities do not share anti-ghosts. For example, no anti-ghost may be detected at intersection 4026 of projections along sX axis from touch 4018 (from touch entity B) and projections along Y axis along the driven line on touch sensor 4004 corresponding to the driven line of touch 4014 (from touch entity A). Similarly, there is no anti-ghost detected on touch sensor 4006 at the intersection 4028 of projections along X axis of touch 4014 (from touch entity A) and projections along Y axis along the driven line on touch sensor 4006 corresponding to the driven line of touch 4018 (from touch entity B).

In an embodiment, using appropriate synchronization methods, the principles of multi-user anti-ghost PCAP can be extended from single touch sensor to tiled arrays of touch sensors. The presence or absence of anti-ghosts at predictable locations can be used to determine when pairs of touches electrically connected. Further, the principles above are independent of the geometry of the tiling. The tiling "array" could be a horizontal row of touch sensors, a vertical row of touch sensors, or a "tiling" can be a set of touch sensors placed in any configuration, e.g. at arbitrary or random locations on the walls of room.

Figure 41:
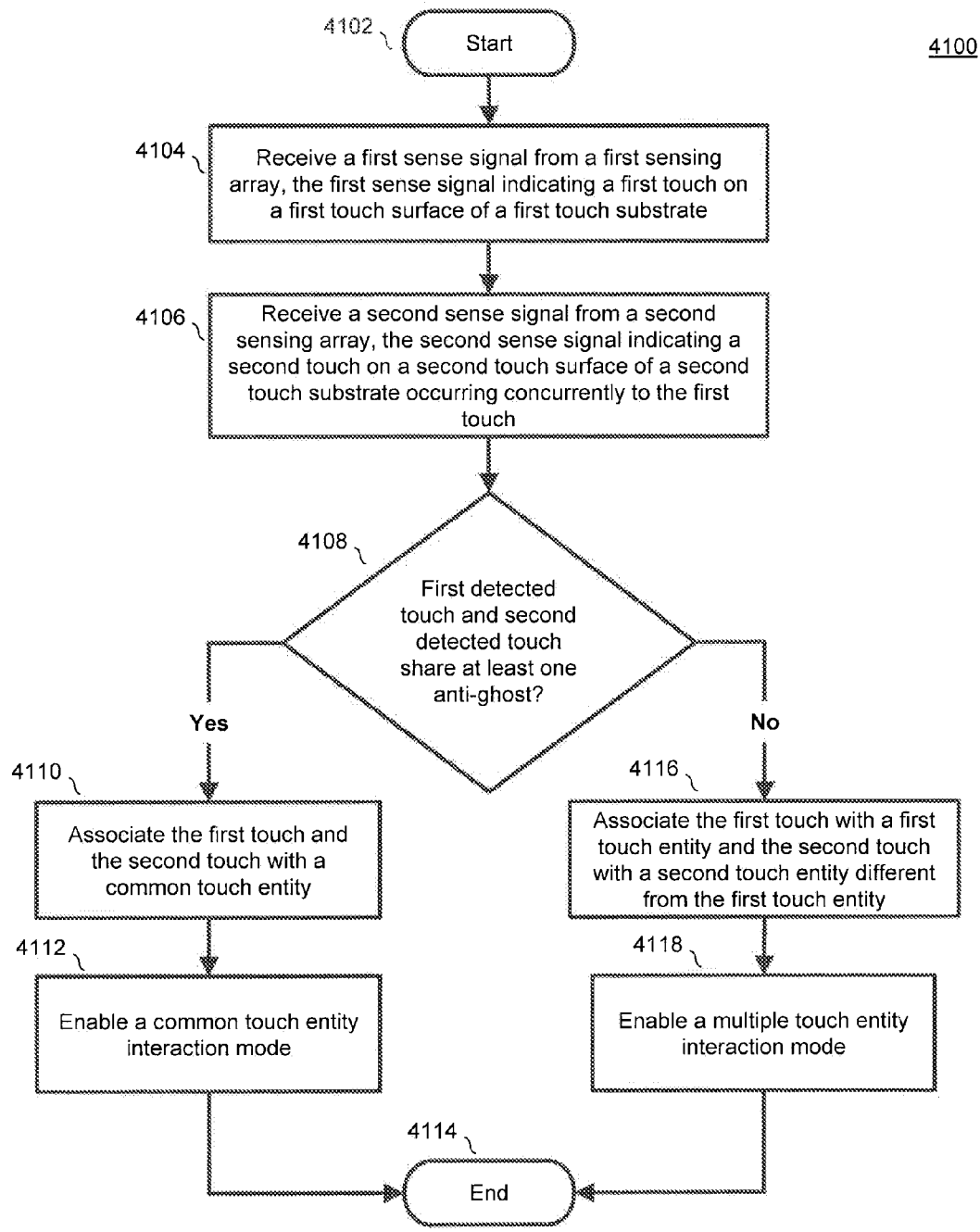
FIG. 41 shows an example method for providing multi-user multi-touch functionality using multiple touch sensors based on anti-ghosts in accordance with some embodiments.

FIG. 41 shows an example method 4100 for providing multi-user multi-touch functionality using multiple touch sensors based on anti-ghosts performed in accordance with some embodiments. Method 4100 may be performed to leverage the anti-ghost effect discussed above. In some embodiments, method 4100 may be performed by a shared controller and/or other suitably configured circuitry, such as controller 108 of touch sensor 100 shown in FIG. 1.

Method 4100 may begin at 4102 and proceed to 4104, where the shared controller may be configured to receive a first sense signal from a first sensing array. The first sense signal may indicate a first touch on a first touch surface of a first touch substrate, such as touch surface 110 of touch substrate 102 of touch sensor 4004. At 4106, the shared controller may be configured to receive a second sense signal from a second sensing array. The second sense signal may indicate a second touch occurring concurrently to the first touch on a second touch surface of a second touch substrate, such as touch surface 110 of touch substrate 102 of touch sensor 4006.

In some embodiments, the sense signals may represent sense signal data acquired during sensing cycles of touch sensors 4004 and 4006. As such, the first touch and the second touch may occur "concurrently" on their respective touch surfaces when present during a single sensing cycle. For example, the first touch and the second touch may first occur (e.g., begin) simultaneously and may be maintained for the single sensing cycle. Furthermore, the first touch and the second touch may occur "concurrently" despite beginning at separate times. For example, the first touch may occur (e.g. begin) on the first touch surface prior to the second touch on the second touch surface and may be maintained on the first touch surface such that the first touch is concurrent with the second touch (e.g., for the single sensing cycle).

At 4108, the shared controller may be configured to determine whether the first touch and the second touch share at least one anti-ghost based on the first and second sense signals. For example, and as discussed above in connection with FIGS. 40A and 40B (e.g., touches 4010 and 4012 of FIG. 40A or touches 4014 and 4016 of FIG. 40B), the shared controller may be configured to determine that the first touch and the second touch share the at least one anti-ghost when the at least one anti-ghost is present at the intersection of a sense line shared with a touch and a driven line corresponding to a touch from another touch sensor (e.g. at anti-ghosts 4022 and 4024). Similarly, the shared controller may be configured to determine that the first touch and the second touch fail to share the at least one anti-ghost when no anti-ghost is present at the intersection of a sense line shared with a touch and a driven line corresponding to a touch from another touch sensor (e.g. intersections 4026 and 4028 of FIG. 40B).

In response to the controller determining that the first touch and the second touch share the at least one anti-ghost, method 4100 may proceed to 4110, where the controller may be configured to associate the first touch and the second touch with a common touch entity. As discussed above, the common touch entity may be an individual person or may be two or more people in electrically conductive contact.

At 4112, the controller may be configured to enable a common touch entity interaction mode. For example, the first touch and the second touch may be used to determine a multi-touch capability of the shared controller such as pinch to zoom, two-finger scrolling, secondary select, and/or any other suitable multi-touch input. Method 4100 may then proceed to 4114 and end.

Returning to 4108, in response to determining that the first touch and the second touch fail to share the at least one anti-ghost (e.g., do not share any anti-ghosts), method 4100 may proceed to 4116, where the shared controller may be configured to associate the first touch with a first touch entity and the second touch with a second touch entity different from the first touch entity. For example, the first touch entity may be a first person and the second touch entity may be a second person.

At 4118, the controller may be configured to enable a multiple touch-entity interaction mode. For example, the first touch and the second touch may each be used to determine separate single touch capability of shared controller. Although method 4100 is discussed with respect to two touches, it is appreciated that more than two touches may be detected in the sense signals. For example, a third touch may be detected and share at least one anti-ghost with the first touch and no anti-ghosts with the second touch. Here, common touch entity interaction mode may be enabled for the first and third touch and multiple touch-entity interaction mode be enabled for the second touch and the combination of the first touch and the third touch. In that sense, a multiple touch-entity interaction mode may include two or more separate common touch entity interaction modes. Method 4100 may then end at 4114.

In an embodiment, one or more techniques for monitoring the continuity of anti-ghosts are used with multiple touch sensors that support multi-touch functionality for multiple users. For example, method 1400 can be executed to determine, at least partially, whether a second touch belongs to the same touch entity as the first touch if it is not readily discernable two touches of a common touch entity share at least one anti-ghost when the two touches first become concurrent on the touch surface, such as but not limited to when multiple anti-ghosts appear in tiled touch sensors running asynchronously. In some embodiments, method 1400 may be performed by a controller and/or other suitably configured circuitry, such as a shared controller or controller 108 of touch sensor 100 shown in FIG. 1.

In an embodiment, one or more techniques for providing multi-user multi-touch functionality based on signal strength of touches are used with multiple touch sensors that support multi-touch functionality for multiple users. For example, method 1500 can be executed to, at least partially, resolve the detection of touches associated with the same touch entity despite not detecting anti-ghosts due to the anti-ghosts overlapping with the touches or not being able to determine that an anti-ghost corresponds to which of one or more touches. For example, method 1500 may be helpful when a first touch occurs prior to a second touch and is maintained on the touch surface such that the first touch is concurrent with the second touch. Independent of whether there is a potential anti-ghost overlap or not, the method 1500 may be performed to determine whether or not the second touch belongs to the same touch entity as the first touch. In that sense, method 1500 may be performed in response to the second touch being determined as being along a common sensing axis direction as the first touch and/or when the first touch occurs prior to the second touch regardless of whether the first touch and the second touch are along a common sensing axis. In some embodiments, like other methods discussed herein, method 1500 may be performed by a controller and/or other suitably configured circuitry, such as a shared controller or controller 108 of touch sensor 100 shown in FIG. 1.

Interactions Between Multiple Touch Entities

Some embodiments may provide for one or more touch sensors that support multi-touch interactions between multiple users at the same time. For multiple touches occurring concurrently on the same or different touch sensors, the one or more touch sensors may be configured to determine that multiple touch entities form a common touch entity and initiate an event for those interactions.

Figure 42:
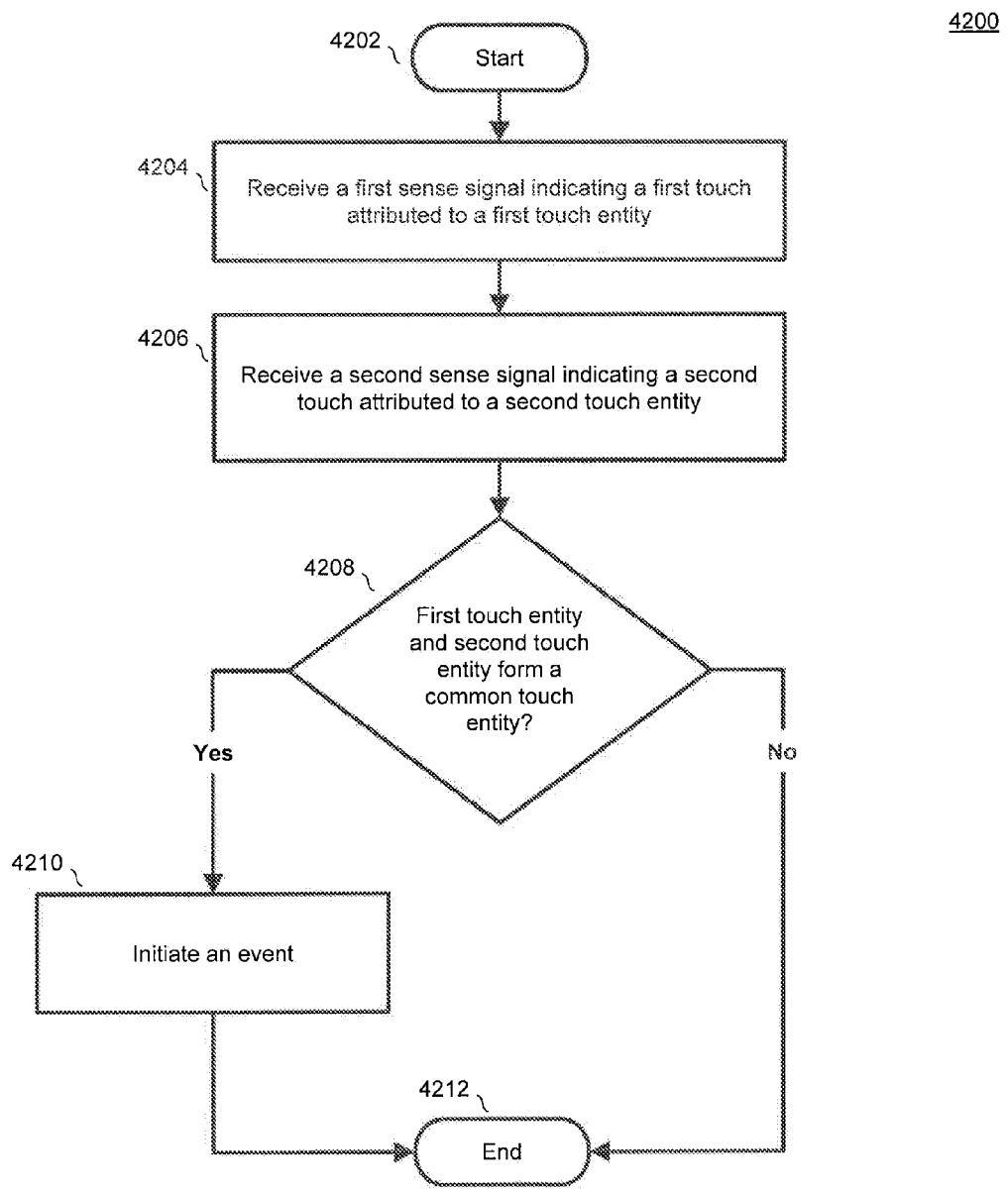
FIG. 42 shows an example method for responding to multi-user multi-touch interactions between multiple touch entities in accordance with some embodiments.

FIG. 42 shows an example method 4200 for responding to multi-user multi-touch interactions between multiple touch entities performed in accordance with some embodiments. Method 4200 may be performed to leverage the anti-ghost effect discussed above. In some embodiments, method 4200 may be performed by a shared controller and/or other suitably configured circuitry, such as controller 108 of touch sensor 100 shown in FIG. 1.

Method 4200 may begin at 4202 and proceed to 4204, where a shared controller may be configured to receive a first sense signal indicating a first touch attributed to a first touch entity. The first touch can be from a first touch surface of a first touch substrate, such as touch surface 110 of touch substrate 102 of touch sensor 100 or of touch sensor 4004.

At 4206, the shared controller may be configured to receive a second sense signal indicating a second touch attributed to a second touch entity. The second touch may occur concurrently to the first touch on the same or a different touch surface, such as touch surface 110 of touch substrate 102 of touch sensor 100 or touch sensor 4006.

In some embodiments, the sense signals may represent sense signal data acquired during sensing cycles of touch sensors. As such, the first touch and the second touch may occur "concurrently" on their respective touch surfaces when present during a single sensing cycle. For example, the first touch and the second touch may first occur (e.g., begin) simultaneously and may be maintained for the single sensing cycle. Furthermore, the first touch and the second touch may occur "concurrently" despite beginning at separate times. For example, the first touch may occur (e.g. begin) on the first touch surface prior to the second touch on the second touch surface and may be maintained on the first touch surface such that the first touch is concurrent with the second touch (e.g., for the single sensing cycle).

At 4208, the shared controller may be configured to determine whether the first touch entity and the second touch entity form a common touch entity. The first touch entity and the second touch entity can be determined to form a common touch entity using any approach, such as any of the techniques discussed herein, but not limited thereto. For example, the first and second touch entities can be determined to form a common touch entity based on the presence or absence of anti-ghosts, the timing of touches, sensed signal strength of touches, or any combination thereof.

In response to the controller determining that the first touch entity and the second touch entity form a common touch entity, method 4200 may proceed to 4210, where the controller may be configured to initiate an event. Method 4200 may then proceed to 4212 and end.

In some embodiments, the event comprises transferring a virtual object from the first touch entity to the second touch entity. The following provides non-limiting examples of transferring a virtual object form the first touch entity to the second touch entity.

As an example, the first touch entity and second touch entity can be playing a multiplayer game, such as soccer. In the game, the first touch entity may be represented by an avatar, e.g. a first soccer player, and the second touch entity may be represented by another avatar, e.g. a second soccer player. Each touch entity may control the avatar by touching some control area, e.g. a portion of a touch screen or the avatar on the touch screen. The first touch entity can initiate transferring an in game object, e.g. passing a soccer ball, to the second touch entity by touching the second touch entity, e.g. a tap on the shoulder with the first touch entity's free hand. When a controller determines that the first touch entity and the second touch entity form a common touch entity, the controller can send a signal to the game to initiate the transfer. For example, in the game this translates to the first avatar attempting to pass the soccer ball to the second avatar. Although soccer is used in this example, embodiments of the invention support any game, such as football, hockey, etc.

As another example, the first touch entity and second touch entity can be interacting with data in a GUI (graphical user interface), such as different applications in a windowing system. In the GUI, the first touch entity may be highlighting data in a spreadsheet application using a first touch. The second touch entity may be highlighting a data entry field in a second application using the second touch. The first touch entity can initiate transferring the data from the spreadsheet to the second application by touching the second touch entity, e.g. by tapping the second touch entity on the shoulder. When a controller determines that the first touch entity and the second touch entity form a common touch entity, the controller can send a signal to the GUI to initiate the transfer. As a result, the highlighted data is copied from the spreadsheet application to the second application. In this example, the formed common touch entity may be temporary and revert to separate first and second touch entities when the triggered actions are completed and electrical contact between the first and second touch entities is terminated.

In some embodiments, the event comprises assigning a designation of the first touch entity to the second touch entity. The designation can indicate that the entities are a part of the same team, unit, organization, side, etc. For example, a user on a first team of a game can tag a second user to indicated that the second user is on the first team.

In some embodiments, the shared controller may be configured to determine that the first touch entity and the second touch entity have stopped forming a common touch entity based on the first sense signal and second sense signal. The first touch entity and the second touch entity can be determined to have stopped forming a common touch entity using any approach, such as any of the techniques discussed herein, but not limited thereto. For example, the first and second touch entities can be determined to have stopped forming a common touch entity based on the presence or absence of anti-ghosts, the timing of touches, sensed signal strength of touches, or any combination thereof. In response to determining that the first touch entity and the second touch entity have stopped forming a common touch entity, the shared controller may be configured to initiate a second event.

In some embodiments, the second event comprises maintaining an association of the first touch entity and the second touch entity after the first touch entity and second touch entity separate. The association, like a designation, can indicate that the entities are a part of the same team, unit, organization, side, etc. For example, referring back to the example of assigning a designation, if the first and second touch entities separate and stop forming a common touch entity, the first and second touch entities can both be designated as members of the same team.

In some embodiments, the shared controller may be configured to receive a third sense signal indicating a third touch attributed to a third touch entity. Based on the third sense signal and second sense signal, the shared controller may be configured to determine that the third touch entity and the second touch entity form a second common touch entity. In response to determining that the third touch entity and the second touch entity form the second common touch entity, the shared controller may be configured to initiate a third event. The third event can include, for example, transferring a virtual object from the second touch entity to the third touch entity, assigning a designation of the third touch entity to the second touch entity, maintaining an association of the second touch entity or third touch entity, or any combination thereof.

In some embodiments, the association of touches is tracked using touch group identifiers. A touch group entity identifier may be assigned for each touch. The touch group entity identifier may be unique. For example, the touch group entity identifier may be implemented using a unique 32 bit integer number. The touch group entity identifier may be assigned to one or more touches that belong to a same owner group identity. For example, a group of touches that have strong PCAP anti-ghost presence between any two of them, such as touches from one or more people identified as belonging to a common touch entity, can belong to a same touch group entity. As another example, a single touch which does not have any anti-ghost or might have noise level anti-ghost presence, such as a single touch from a single touch entity, can have its own unique touch group entity identification.

In some embodiments, different touch group entities can join to become one touch-group-entity by making a new physical contact between at least one of the members of these different touch group entities. Similarly, when two or more touch entities get separated by removing a physical contact, these touch group entities can each become a new touch group entity. Alternatively, when two or more touch entities are separated by removing a physical contact, one resulting touch entity may inherit the existing group entity and the other touch entities may form new group entities.

In some embodiments, the touch group entity group and its identification exists while at least one touch that belongs to the group is touching the screen. While the touch group entity group exists, the touches that belong to the touch group entity can disappear from the group by lifting those touches from the screen and new touches can be added to the touch group entity by additional touches with a strong physical connection to the touch group entity are made. In some cases, a weak anti-ghosting signal may be observed with two users in close proximity but not actually touching; this may be due to drive signal transfer between the users due to a small capacitive coupling between the two users. In an embodiment, if it is desired to only associate the two users when they are in true physical contact, it may be required that the anti-ghost signal be sufficiently strong. As it is common in the touch industry to refer to the strength of a touch signal as the "Z" coordinate or value of the touch, it is natural to associate a Z value with the strength of an anti-ghost signal. The strength of physical connection is recognized, for example, through the value of the Z value of the anti-ghost points between touches that exceed a specified threshold.

In some embodiments, each touch can have a unique contact identifier during the period a touch is made to the screen until the touch is lifted from the screen. A touch can also have a touch group entity identifier. The contact identifier can be given to a newly sensed touch. Touches that are not new but continuous, which can be determined through examining the existing valid touch history by one or more techniques, inherits the touch group identifier and contact identifier from the previous valid touch that it was identified with. New touches that have a strong anti-ghost relationship with any of the touches that with the existing touch can inherit the touch group identifier of the existing touch.

In some embodiments, when a touch panel scans the touch input, the controller determines the touch groups, and a data structure (e.g. an array) that identifies the correspondence of touches to touch groups is passed to next iteration for processing these data. The initial iteration of data processing may include grouping the touch data into touch groups, e.g. by identifying common touch entities. For example, the data structure can be processed into physical cluster peak touches by examining anti-ghost presence of two peaks at a time, and if there is a strong physical connection of two touch peaks, they will be clustered into the same cluster group; if one of belongs to a physical cluster, the other will inherit the same cluster. If neither of the two touches have any cluster associated with, a new physical cluster identification, e.g. touch group entity identifier, can be assigned to these two touches. A touch peak data that does not have any anti-ghost relationship will have a new touch group entity identifier assigned to it. After all of the pairs of peaks have been examined, all the touches will be clustered.

In some embodiments, in subsequent iterations of processing the data structure, the data structure from the previous iteration, alone or as a part of a touch history table, can be examined to identify to which group the touch belongs. For example, with an already existing touch, if a peak is identified with an existing touch, all the touches that belong to the same cluster will inherit this touch group entity identifier. If a peak from the same cluster is traced into an existing touch, and if the peak one belongs to a different touch group entity in the touch history, the earlier created touch group entity identifier (such as a smaller valued integer value) can be assigned as a primary group entity, but the differing group entity identification can be also stored as a previous touch group entity. This earlier created touch group identifier can also be assigned to the rest of the cluster. For new touches, a new touch entry table is generated and put into the touch history table. For a new cluster, a new touch group entity can be assigned to the touches in the cluster.

Touch Sensors with Additional Input

In some embodiments, a touch sensor may be combined with another input system, such as a visual input system (e.g. including one or more cameras), which may include three dimensional tracking capabilities. The other input system may be configured to track the movements of users to further associate users with touches. For example, when a first touch and a second touch are not concurrent in time, the first touch and the second touch will not share any anti-ghosts regardless of whether they were generated by a common touch entity or different touch entities. As such, a touch sensor that is configured to associate touches based on anti-ghosts may be combined with the other input system to associate concurrent touches and touches that are separated in time.

Figure 43:
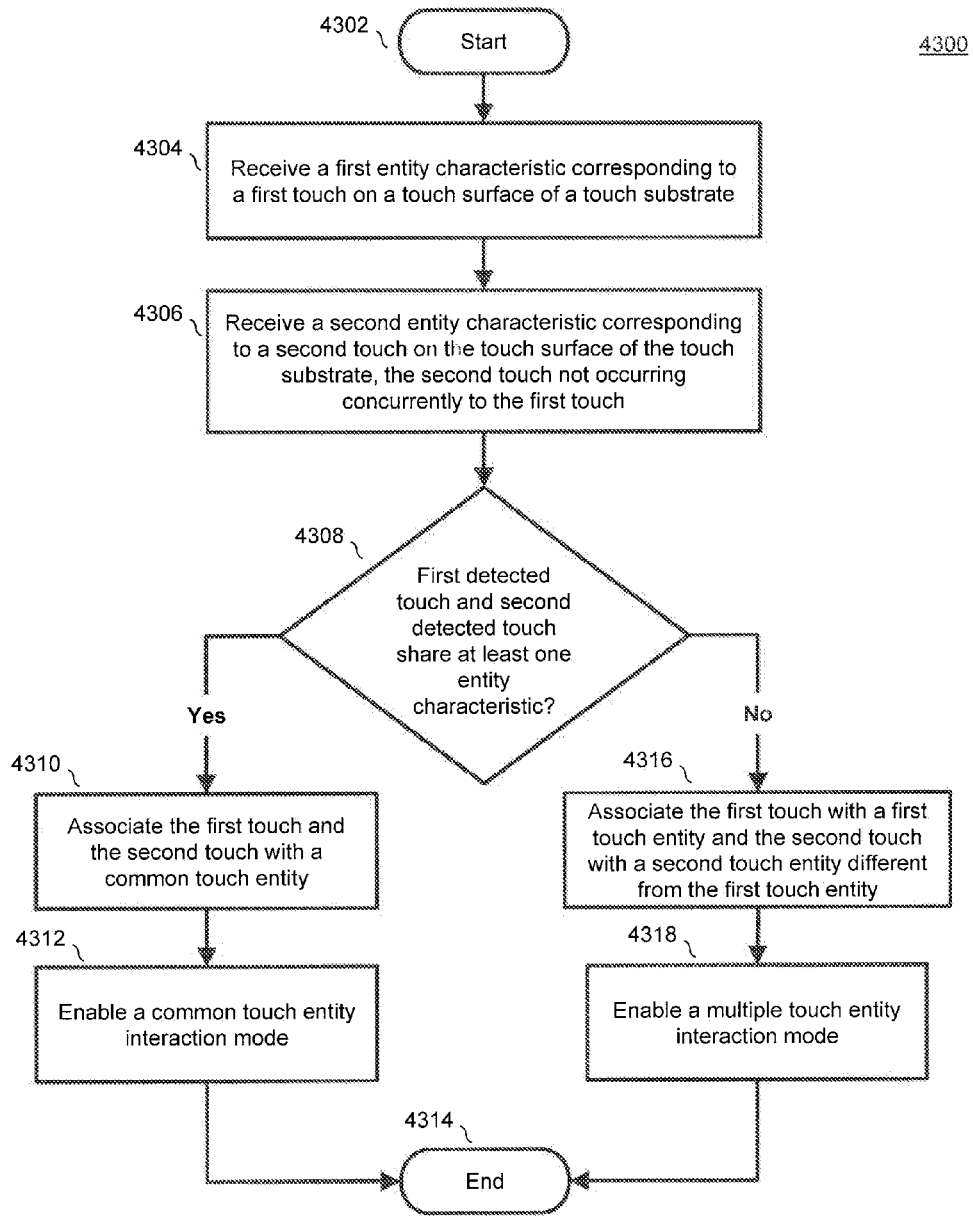
FIG. 43 shows an example method for providing multi-user multi-touch functionality for non-concurrent touches in accordance with some embodiments.

FIG. 43 shows an example method 4300 for providing multi-user multi-touch functionality for non-concurrent touches in accordance with some embodiments. Method 4300 may be performed to leverage the anti-ghost effect discussed above. In some embodiments, method 4300 may be performed by a shared controller and/or other suitably configured circuitry, such as controller 108 of touch sensor 100 shown in FIG. 1. Although method 4300 is discussed with respect to using one touch sensor, embodiments of the invention support multiple touch sensors (for example, four touch sensors as illustrated in FIG. 40), as well as in combination with additional input devices (such as one or more cameras).

Method 4300 may begin at 4302 and proceed to 4304, where controller 108 may be configured to receive a first entity characteristic corresponding to a first touch. A first sense signal may indicate the first touch on a first touch surface of a first touch substrate, such as touch surface 110 of touch substrate 102 of touch sensor 100. At 4306, the shared controller may be configured to receive a second entity characteristic corresponding to a second touch. A second sense signal may indicate the second touch not occurring concurrently to the first touch on the touch surface, such as touch surface 110 of touch substrate 102 of touch sensor 100. The first touch and the second touch do not occur concurrently on their respective touch surfaces when they are both not present during any sensing cycles. For example, the first touch can occur during a first time period, and after the first touch ends, the second touch may first occur.

In some embodiments, the entity characteristics may represent data acquired from one or more sources. An entity characteristic may refer to any attribute that can be used to distinguish one touch entity from another. For example, an entity characteristic can include, but is not limited to, a name, an identifier, the color of an item worn, a face, a user's size, a user's physical capabilities, a user's age, a type of input device (e.g., a gloved finger, a bare finger, a stylus, a mobile handheld computing device, etc.), a number of users, or any combination thereof. The one or more sources can include, for example, a sensor, a camera, a video, an image source, a RFID reader, a near-field communication device, a microphone, ultrasonic receiver, such as sonar, an electromagnetic sensor, such as LIDAR, or any combination thereof.

At 4308, the shared controller may be configured to determine whether the first touch and the second touch share at least one entity characteristic based on the first and second entity characteristics. For example, both entity characteristics may be that the user is wearing blue glasses.

In response to the controller determining that the first touch and the second touch share the at least one entity characteristic, method 4300 may proceed to 4310, where the controller may be configured to associate the first touch and the second touch with a common touch entity. As discussed above, the common touch entity may be an individual person or may be two or more people in electrically conductive contact.

At 4312, the controller may be configured to enable a common touch entity interaction mode. For example, the second touch may be used to continue an interaction previously engaged in using the first touch, such as drawing a picture. Method 4300 may then proceed to 4314 and end.

Returning to 4308, in response to determining that the first touch and the second touch fail to share the at least one entity characteristic, method 4300 may proceed to 4316, where the shared controller may be configured to associate the first touch with a first touch entity and the second touch with a second touch entity different from the first touch entity. For example, the first touch entity may be a first person and the second touch entity may be a second person.

At 4318, the controller may be configured to enable a multiple touch-entity interaction mode. For example, the first touch and the second touch may each be used to determine separate single touch capability of shared controller. Although method 4300 is discussed with respect to two touches, it is appreciated that more than two touches may be detected in the sense signals. For example, a third touch may be detected and share at least one anti-ghost with the first touch and no anti-ghosts with the second touch. Here, common touch entity interaction mode may be enabled for the first and third touch and multiple touch-entity interaction mode be enabled for the second touch and the combination of the first touch and the third touch. In that sense, a multiple touch-entity interaction mode may include two or more separate common touch entity interaction modes. Method 4300 may then end at 4314.

Figure 44:
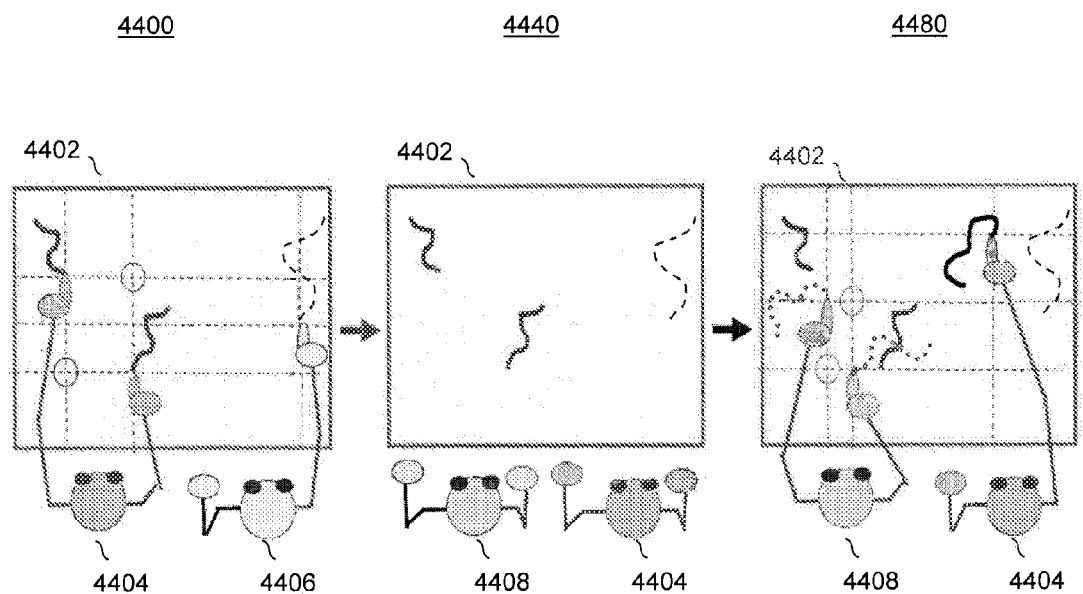
FIG. 44 shows an example computing device that includes a touch sensor during multiple states in accordance with some embodiments.

FIG. 44 shows an example computing device that includes a touch sensor 4402 in states 4400, 4440, and 4480 in accordance with some embodiments. States 4400, 4440, and 4480 show an example of method 4300 in practice. However, FIG. 44 is only an example of one instantiation of method 4300, and does not limit method 4300.

In state 4400, touch sensor 4402 associates the two touches of the user 4404 and responds with the same color for the user 4404's right and left hands. User 4404 may have blue glasses, and the color of the trails drawn by user 4404 may match the color. The blue glasses are an entity characteristic detected by a camera associated with touch sensor 4402. Touch sensor 4402 can associate user 4404's touches based on anti-ghosts detected on touch sensor 4402. In contrast, touch sensor 4402 may display the touch from user 4406 a different paint color based on, for example, a lack of anti-ghosts that indicates the touches belong to a separate touch entity. In this example, user 4406 has red glasses, and the paint color of the marks left by 4406 is also red (red marks being represented in FIG. 44 as dashed marks).

State 4440 represents a time after state 4400, by which time user 4406 had walked away from touch sensor 4402, and user 4404 had moved to the right side of touch sensor 4402. Further, a new user 4408 with purple glasses has walked up to the left side of touch sensor 4402.

In state 4480, user 4404 starts drawing on touch sensor 4402 again by touching it. Using the anti-ghost effect alone, touch sensor 4402 may not be able to determine that the upper right touch during state 4480 is from user 4404. However, by tracking the movements of the users with a camera system, the touch sensor 4402 can recognize the touch is from user 4404 and provide the paint color consistent with user 4404's earlier touches. The camera system can also recognize that the user 4408 is a new user and provide a new paint color accordingly (represented in FIG. 44 by dotted marks). Thus the anti-ghost PCAP system in combination with a camera system can not only associate simultaneous touches of a user, but also associate the user's touches that are separated in time.

In an embodiment, touch sensor 4402 is configured to determine a paint color for each user. For example, touch sensor 4402 can receive a color selection from the user, such as by the user selected the color by first touching a virtual paint can. Alternatively or additionally, touch sensor 4402 can be configured to select the color based on an entity characteristic, such as eye color or shirt color, of the camera image of the user.

Increased Anti-Ghost Signal Via Electrode Design

In some embodiments, the strength of the anti-ghost signals are a side effect of projected-capacitive touch system design decisions made with other considerations in mind. In other embodiments, projected-capacitive touch systems may be designed in a way to enhance the strength of anti-ghost signals relative to touch signals. Electrostatic simulations may be used to test various ideas for design alternations.

In some embodiments, reducing the user's capacitance to ground ($C_{GROUND}$) increases the anti-ghost signal. Techniques to increase the anti-ghost signal can include, for example, reducing thickness or increasing the dielectric constant of selected dielectric layers, such as the exterior layer, of the touch sensor stack.

In some embodiments, although touch-to-electrode coupling to both sense and drive lines are important to the anti-ghost signal, only the touch-to-electrode coupling to sense lines contributes to undesired electronic noise. Thus, to improve the strength of anti-ghost signals, sense electrode may be designed to so that user capacitive coupling to sense electrodes ($C_{SENSE}$) is less than user capacitive coupling to drive electrodes ($C_{DRIVE}$). This relationship may be represented by the equation $C_{SENSE} < C_{DRIVE}$.

Figure 45A:
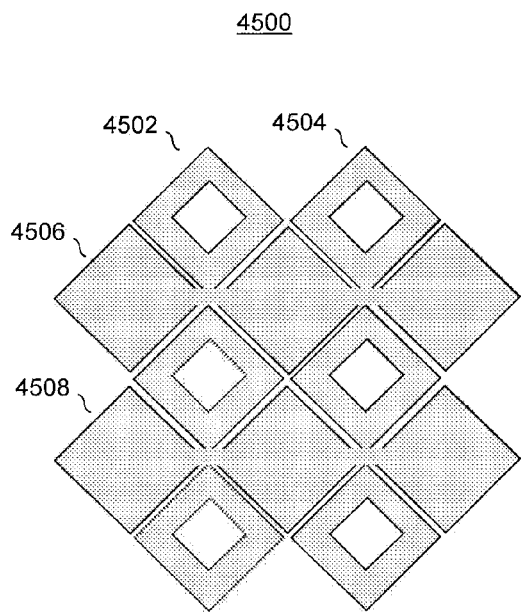
FIGS. 45A-45C show example sensing arrays in accordance with some embodiments.
Figure 45B:
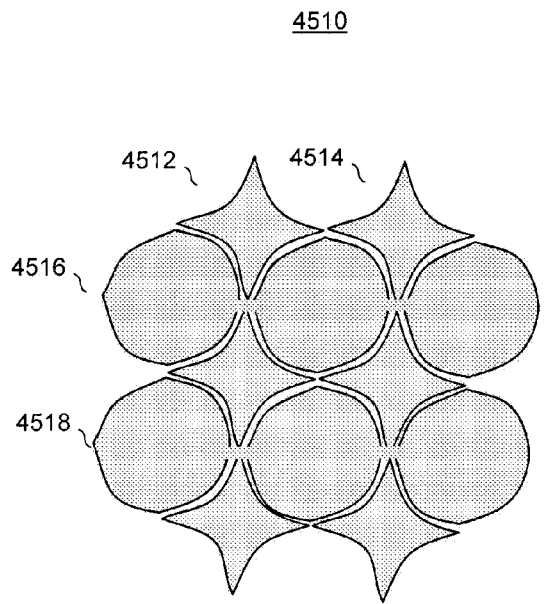
Figure 45C:
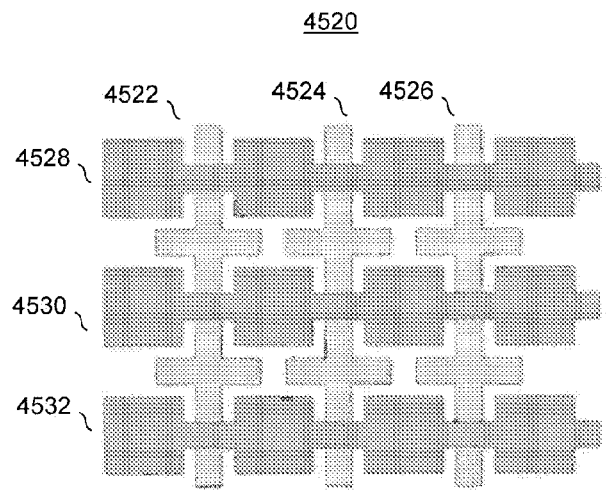

FIGS. 45A-45C show example sensing arrays 4500, 4510, and 4520, respectively, in accordance with some embodiments. Sensing arrays 4500, 4510, and 4520 are designed to improve the strength of anti-ghost signals by satisfying the relationship $C_{SENSE} < C_{DRIVE}$. In some embodiments, sensing arrays 4500, 4510, or 4520, or any combination thereof, may be employed in any type of PCAP device, such as those discussed herein.

Sensing array 4500 includes sense electrodes 4502 and 4504 and drive electrodes 4506 and 4508. Although two sense and two drive electrodes are shown, embodiments of the invention support any number or combination of sense or drive electrodes. By removing centers of the sense electrodes 4502 and 4504, noise from self-capacitive coupling to the user is reduced.

Sensing array 4510 includes sense electrodes 4512 and 4514 and drive electrodes 4516 and 4518. Although two sense and two drive electrodes are shown, embodiments of the invention support any number or combination of sense or drive electrodes. The hypocycloidal shape of sense electrodes 4512 and 4514 paired with the circular shape of drive electrodes 4516 and 4518 produce a geometry that leaves touch-induced mutual capacitance roughly the same due to the similar boundary lengths between the sense and drive electrodes. This arrangement can also decrease noise by reducing $C_{SENSE}$, but also leaves the anti-ghost signal strength roughly the same by compensating the decreased $C_{SENSE}$ by increasing $C_{DRIVE}$ by increasing the area of drive electrodes 4516 and 4518.

Sensing array 4520 includes sense electrodes 4522, 4524, and 4526 and drive electrodes 4528, 4530, and 4532. Although three sense and three drive electrodes are shown, embodiments of the invention support any number or combination of sense or drive electrodes. The design of sensing array 4520 may be well suited for designs in which the increase in surface area of drive electrodes 4528, 4530, and 4532 relative to sense electrodes 4522, 4524, and 4526 produces the relationship $C_{SENSE} < C_{DRIVE}$.

In an embodiment, sensing arrays 4500, 4510, and 4520 may each be implemented with a variety of transparent electrode materials including, for example, indium tin oxide (ITO), silver nanowires, carbon nanotubes as well as metal-mesh.

In some embodiments, the anti-ghosts are measured in the same mutual-capacitance scan as the touches themselves. Alternatively or additionally, two or more scans may be used, in which at least one scan is configured to collect touch data, such as with the anti-ghosts minimized, and in which at least one other scan is configured to collect anti-ghost data, such as measuring anti-ghosts between parallel electrodes.

Example Computer System

Figure 46:
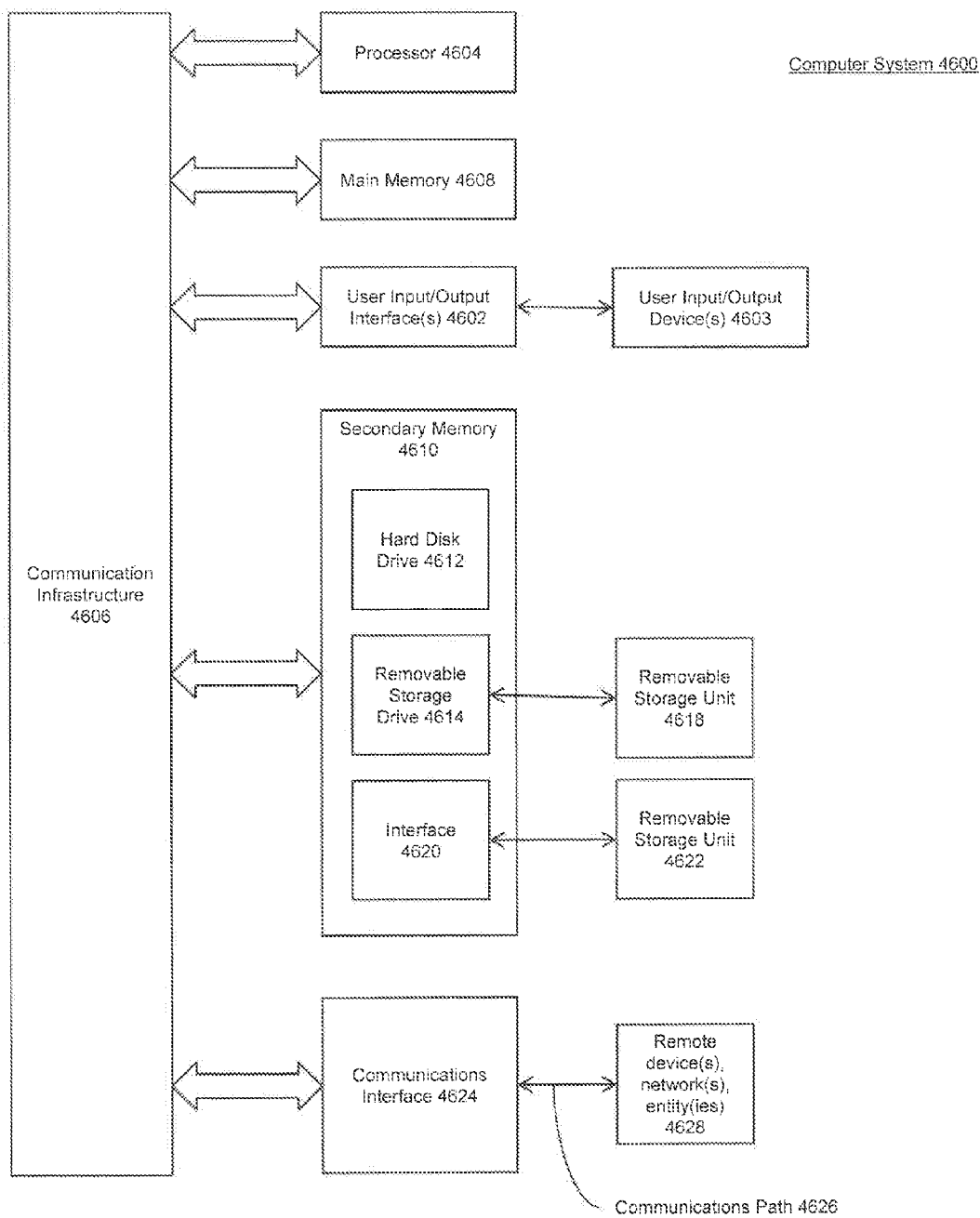
FIG. 46 is an example computer system useful for implementing various embodiments.

Various embodiments can be implemented, for example, using one or more well-known computer systems, such as computer system 4600 shown in FIG. 46. Computer system 4600 can be any well-known computer capable of performing the functions described herein, such as computers available from International Business Machines, Apple, Sun, HP, Dell, Sony, Toshiba, etc.

Computer system 4600 includes one or more processors (also called central processing units, or CPUs), such as a processor 4604. Processor 4604 is connected to a communication infrastructure or bus 4606.

One or more processors 4604 may each be a graphics processing unit (GPU). In an embodiment, a GPU is a processor that is a specialized electronic circuit designed to rapidly process mathematically intensive applications on electronic devices. The GPU may have a highly parallel structure that is efficient for parallel processing of large blocks of data, such as mathematically intensive data common to computer graphics applications, images and videos.

Computer system 4600 also includes user input/output device(s) 4603, such as monitors, keyboards, pointing devices, etc., which communicate with communication infrastructure 4606 through user input/output interface(s) 4602.

Computer system 4600 also includes a main or primary memory 4608, such as random access memory (RAM). Main memory 4608 may include one or more levels of cache. Main memory 4608 has stored therein control logic (i.e., computer software) and/or data.

Computer system 4600 may also include one or more secondary storage devices or memory 4610. Secondary memory 4610 may include, for example, a hard disk drive 4612 and/or a removable storage device or drive 4614. Removable storage drive 4614 may be a floppy disk drive, a magnetic tape drive, a compact disk drive, an optical storage device, tape backup device, and/or any other storage device/drive.

Removable storage drive 4614 may interact with a removable storage unit 4618. Removable storage unit 4618 includes a computer usable or readable storage device having stored thereon computer software (control logic) and/or data. Removable storage unit 4618 may be a floppy disk, magnetic tape, compact disk, DVD, optical storage disk, and/any other computer data storage device. Removable storage drive 4614 reads from and/or writes to removable storage unit 4618 in a well-known manner.

According to an exemplary embodiment, secondary memory 4610 may include other means, instrumentalities or other approaches for allowing computer programs and/or other instructions and/or data to be accessed by computer system 4600. Such means, instrumentalities or other approaches may include, for example, a removable storage unit 4622 and an interface 4620. Examples of the removable storage unit 4622 and the interface 4620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 4600 may further include a communication or network interface 4624. Communication interface 4624 enables computer system 4600 to communicate and interact with any combination of remote devices, remote networks, remote entities, etc. (individually and collectively referenced by reference number 4628). For example, communication interface 4624 may allow computer system 4600 to communicate with remote devices 4628 over communications path 4626, which may be wired and/or wireless, and which may include any combination of LANs, WANs, the Internet, etc. Control logic and/or data may be transmitted to and from computer system 4600 via communication path 4626.

In an embodiment, a tangible apparatus or article of manufacture comprising a tangible computer useable or readable medium having control logic (software) stored thereon is also referred to herein as a computer program product or program storage device. This includes, but is not limited to, computer system 4600, main memory 4608, secondary memory 4610, and removable storage units 4618 and 4622, as well as tangible articles of manufacture embodying any combination of the foregoing. Such control logic, when executed by one or more data processing devices (such as computer system 4600), causes such data processing devices to operate as described herein.

Based on the teachings contained in this disclosure, it will be apparent to persons skilled in the relevant art(s) how to make and use the invention using data processing devices, computer systems and/or computer architectures other than that shown in FIG. 46. In particular, embodiments may operate with software, hardware, and/or operating system implementations other than those described herein.

CONCLUSION

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A projected capacitive touch sensor, comprising:
   a touch substrate including a touch surface;
   a sensing array configured to provide sense signals indicating a first touch and a second touch occurring concurrently on the touch surface of the touch substrate; and
   a controller configured to:
      receive the sense signals from the sensing array;
      based on the sense signals, determine whether the first touch and the second touch share at least one anti-ghost;
      in response to determining that the first touch and the second touch share the at least one anti-ghost, associate the first touch and the second touch with a common touch entity;
      based on the sense signals, determine a disappearance time for the at least one anti-ghost indicating a length of time that the anti-ghost disappeared while the first touch and the second touch remained detected;
      determine whether the disappearance time exceeds a continuity threshold; and
      in response to determining that the disappearance time fails to exceed the continuity threshold, associate the first touch and the second touch with the common touch entity within the disappearance time.

2. The touch sensor of claim 1, wherein the controller is further configured to, in response to determining that the first touch and the second touch fail to share the at least one anti-ghost, associate the first touch with a first touch entity and the second touch with a second touch entity different from the first touch entity.

3. The touch sensor of claim 1, wherein the controller is further configured to, based on the sense signals, determine that the first touch occurs prior to the second touch and is maintained on the touch surface such that the first touch is concurrent with the second touch.

4. The touch sensor of claim 1, wherein the common touch entity is an individual person.

5. The touch sensor of claim 1, wherein the common touch entity is a first person and a second person in electrically conductive contact.

6. The touch sensor of claim 5, wherein the controller is further configured to:
   determine that the at least one anti-ghost was undetected in the sense signals when the first touch and the second touch were first detected; and
   in response to determining that the at least one anti-ghost was undetected in the sense signals when the first touch and the second touch was first concurrently detected, determine a contact time between the first person and the second person based on when the anti-ghost first become detected in the sense signals.

7. The touch sensor of claim 1, wherein the sensing array includes a plurality of drive and sense electrodes, each drive and sense electrode switchable between a drive mode and sense mode.

8. The touch sensor of claim 1, wherein the sensing array includes a first plurality of electrodes defining a first sensing axis, a second plurality of electrodes defining a second sensing axis, and a third plurality of electrodes defining a third sensing axis.

9. The touch sensor of claim 8, wherein:
the first plurality of electrodes are drive electrodes, the second plurality of electrodes are sense electrodes and the third plurality of electrodes are drive and sense electrodes; and
each of the drive and sense electrodes are switchable between a drive mode and sense mode.

10. The touch sensor of claim 8, wherein the first plurality of electrodes, the second plurality of electrodes and the third plurality of electrodes are disposed on a common electrode substrate layer.

11. The touch sensor of claim 8, wherein the sensing array includes at least one single layer bridge where a first two electrodes of the first plurality of electrodes are electrically connected, a second two electrodes of the second plurality of electrodes are electrically connected, and a third two electrodes of the third plurality of electrodes are electrically connected.

12. The touch sensor of claim 1, wherein the sensing array includes a first plurality of electrodes defining a first sensing axis, a second plurality of electrodes defining a second sensing axis, a third plurality of electrodes defining a third sensing axis, and a fourth plurality of electrodes defining a fourth sensing axis.

13. The touch sensor of claim 12, wherein:
the first plurality of electrodes and the second plurality of electrodes are disposed on a first electrode substrate layer of the sensing array; and
the third plurality of electrodes and the fourth plurality of electrodes are disposed on a second electrode substrate layer of the sensing array.

14. The touch sensor of claim 12, wherein the first plurality of electrodes, the second plurality of electrodes, the third plurality of electrodes and the fourth plurality of electrodes define a common layer of the sensing array.

15. The touch sensor of claim 1, wherein the sensing array includes a conductive mesh defining a sensing axis.

16. The touch sensor of claim 1, wherein the sensing array includes:
a first conductive mesh defining a first sensing axis and a first layer of the sensing array;
a second conductive mesh defining a second sensing axis and a second layer of the sensing array; and
a third conductive mesh defining a second sensing axis and a second layer of the sensing array.

17. The system of claim 1, wherein the sensing array comprises one or more sense electrodes and one or more drive electrodes, and user capacitive coupling to the one or more sense electrodes is less than user capacitive coupling to the one or more drive electrodes.

18. A projected capacitive touch sensor, comprising:
a touch substrate including a touch surface;
a sensing array configured to provide sense signals indicating a first touch and a second touch occurring concurrently on the touch surface of the touch substrate; and
a controller configured to:
receive the sense signals from the sensing array;
based on the sense signals, determine whether the first touch and the second touch share at least one anti-ghost;
in response to determining that the first touch and the second touch share the at least one anti-ghost, associate the first touch and the second touch with a common touch entity;
determine that the first touch occurs prior to the second touch and is maintained on the touch surface such that the first touch is concurrent with the second touch; and
determine whether occurrence of the second touch coincided with a signal strength drop for the first touch;
in response to determining that the occurrence of the second touch coincided with a signal strength drop for the first touch, associate the first touch and the second touch with the common touch entity; and
in response to determining that the occurrence of second touch failed to coincide with a signal strength drop for the first touch, associate the first touch with a first touch entity and the second touch a second touch entity different from the first touch entity.

19. The touch sensor of claim 18, wherein:
the sensing array defines a sensing axis; and
the controller is further configured to:
determine whether the first touch and the second touch occurred along the sensing axis;
responsive to determining that the first touch and the second touch occurred along the sensing axis, determine whether the first touch and the second touch share a one axis anti-ghost; and
in response to determining that the first touch and the second touch share the one axis anti-ghost, associate the first touch and the second touch with the common touch entity.

20. The touch sensor of claim 18, wherein:
the sensing array defines a sensing axis; and
the controller is further configured to:
determine whether the first touch and the second touch occurred along the sensing axis;
in response to determining that the first touch and the second touch occurred along the sensing axis, determine whether the first touch and the second touch share a one axis anti-ghost; and
in response to determining that the first touch and the second touch fail to share the one axis anti-ghost, associate the first touch with a first touch entity and the touch a second touch entity different from the first touch entity.

21. A method, comprising:
receiving sense signals from a sensing array, the sensing array configured to provide the sense signals indicating a first touch and a second touch occurring concurrently on a touch surface of a touch substrate;
based on the sense signals, determining whether the first touch and the second touch share at least one anti-ghost;
in response to determining that the first touch and the second touch share the at least one anti-ghost, associating the first touch and the second touch with a common touch entity;
based on the sense signals, determining a disappearance time for the at least one anti-ghost indicating a length of time that the anti-ghost disappeared while the first touch and the second touch remained detected;
determining whether the disappearance time exceeds a continuity threshold; and
in response to determining that the disappearance time fails to exceed the continuity threshold, associating the first touch and the second touch with the common touch entity within the disappearance time.

22. The method of claim 21 further comprising, in response to determining that the first touch and the second touch fail to share the at least one anti-ghost, associating the first touch with a first touch entity and the second touch with a second touch entity different from the first touch entity.

23. The method of claim 21 further comprising, based on the sense signals, determining that the first touch occurs prior to the second touch and is maintained on the touch surface such that the first touch is concurrent with the second touch.

24. The method of claim 21, wherein the common touch entity is an individual person.

25. The method of claim 21, wherein the common touch entity is a first person and a second person in electrically conductive contact.

26. The method of claim 25 further comprising:
determining that the at least one anti-ghost was undetected in the sense signals when the first touch and the second touch were first detected; and
in response to determining that the at least one anti-ghost was undetected in the sense signals when the first touch and the second touch was first concurrently detected, determining a contact time between the first person and the second person based on when the anti-ghost first became detected in the sense signals.

27. A non-transitory, tangible computer-readable device having instructions stored thereon that, when executed by at least one computing device, causes the at least one computing device to perform operations comprising:
receiving sense signals from a sensing array, the sensing array configured to provide the sense signals indicating a first touch and a second touch occurring concurrently on a touch surface of a touch substrate;
based on the sense signals, determining whether the first touch and the second touch share at least one anti-ghost;
responsive to determining that the first touch and the second touch share the at least one anti-ghost, associating the first touch and the second touch with a common touch entity;
based on the sense signals, determining a disappearance time for the at least one anti-ghost indicating a length of time that the anti-ghost disappeared while the first touch and the second touch remained detected;
determining whether the disappearance time exceeds a continuity threshold; and
in response to determining that the disappearance time fails to exceed the continuity threshold, associating the first touch and the second touch with the common touch entity within the disappearance time.

28. A system, comprising:
a memory; and
at least one processor coupled to the memory and configured to:
receive sense signals from a sensing array, the sensing array configured to provide the sense signals indicating a first touch and a second touch occurring concurrently on a touch surface of a touch substrate;
based on the sense signal, determine whether the first touch and the second touch share at least one anti-ghost;
responsive to determining that the first touch and the second touch share the at least one anti-ghost, associate the first touch and the second touch with a common touch entity;
based on the sense signals, determine a disappearance time for the at least one anti-ghost indicating a length of time that the anti-ghost disappeared while the first touch and the second touch remained detected;
determine whether the disappearance time exceeds a continuity, threshold; and
in response to determining that the disappearance time fails to exceed the continuity threshold, associate the first touch and the second touch with the common touch entity within the disappearance time.

29. A method, comprising:
receiving a first sense signal from a first sensing array, the first sensing array configured to provide the first sense signal indicating a first touch on a first touch surface of a first touch substrate;
receiving a second sense signal from a second sensing array, the second sensing array configured to provide the second sense signal indicating a second touch on a second touch surface of a second touch substrate occurring concurrently to the first touch;
based on the first sense signal and second sense signal, determining whether the first touch and the second touch share at least one anti-ghost;
in response to determining that the first touch and the second touch share the at least one anti-ghost, associating the first touch and the second touch with a common touch entity;
based on the first sense signal and second sense signal, determining a disappearance time for the at least one anti-ghost indicating a length of time that the anti-ghost disappeared while the first touch and the second touch remained detected;
determining whether the disappearance time exceeds a continuity threshold; and
in response to determining that the disappearance time fails to exceed the continuity threshold, associating the first touch and the second touch with the common touch entity within the disappearance time.

30. The method of claim 29, further comprising:
based on the first sense signal and the second sense signal, determining that the first touch occurs prior to the second touch and is maintained such that the first touch is concurrent with the second touch.

31. The method of claim 29, wherein the common touch entity is at least one of:
an individual person, or
a plurality of people in electrically conductive contact.

32. The method of claim 29, further comprising:
determining that the at least one anti-ghost was undetected in the first sense signal and second sense signal when the first touch and the second touch were first detected; and
in response to determining that the at least one anti-ghost was undetected in the sense signals when the first touch and the second touch was first concurrently detected, determining a contact time between a first person of the common touch entity and a second person of the common touch entity based on when the anti-ghost first become detected in the first sense signal and second sense signal.

33. The method of claim 29, further comprising:
in response to determining that the first touch and the second touch fail to share the at least one anti-ghost, associating the first touch with a first touch entity and the second touch with a second touch entity different from the first touch entity.

34. A system, comprising:
a memory; and
at least one processor coupled to the memory and configured to:
receive a first sense signal from a first sensing array, the first sensing array configured to provide the first sense signal indicating a first touch on a first touch surface of a first touch substrate;

receive a second sense signal from a second sensing array, the second sensing array configured to provide the second sense signal indicating a second touch on a second touch surface of a second touch substrate occurring concurrently to the first touch;

based on the first sense signal and second sense signal, determine whether the first touch and the second touch share at least one anti-ghost;

in response to determining that the first touch and the second touch share the at least one anti-ghost, associate the first touch and the second touch with a common touch entity;

based on the first sense signal and second sense signal, determine a disappearance time for the at least one anti-ghost indicating a length of time that the anti-ghost disappeared while the first touch and the second touch remained detected;

determine whether the disappearance time exceeds a continuity threshold; and in response to determining that the disappearance time fails to exceed the continuity threshold, associate the first touch and the second touch with the common touch entity within the disappearance time.

35. The system of claim 34, the at least one processor further configured to:
in response to determining that the first touch and the second touch fail to share the at least one anti-ghost, associate the first touch with a first touch entity and the second touch with a second touch entity different from the first touch entity.

36. The system of claim 34, the at least one processor further configured to:
based on the first sense signal and the second sense signal, determine that the first touch occurs prior to the second touch and is maintained such that the first touch is concurrent with the second touch.

37. The system of claim 34, wherein the common touch entity is at least one of:
an individual person, or
a plurality of people in electrically conductive contact.

38. The system of claim 34, the at least one processor further configured to:
determine that the at least one anti-ghost was undetected in the first sense signal and second sense signal when the first touch and the second touch were first detected; and
in response to determining that the at least one anti-ghost was undetected in the sense signals when the first touch and the second touch was first concurrently detected, determine a contact time between a first person of the common touch entity and a second person of the common touch entity based on when the anti-ghost first become detected in the first sense signal and second sense signal.

39. A non-transitory, tangible computer-readable device having instructions stored thereon that, when executed by at least one computing device, causes the at least one computing device to perform operations comprising:
receiving a first sense signal from a first sensing array, the first sensing array configured to provide the first sense signal indicating a first touch on a first touch surface of a first touch substrate;
receiving a second sense signal from a second sensing array, the second sensing array configured to provide the second sense signal indicating a second touch on a second touch surface of a second touch substrate occurring concurrently to the first touch;

based on the first sense signal and second sense signal, determining whether the first touch and the second touch share at least one anti-ghost;

in response to determining that the first touch and the second touch share the at least one anti-ghost, associating the first touch and the second touch with a common touch entity;

based on the first sense signal and second sense signal, determining a disappearance time for the at least one anti-ghost indicating a length of time that the anti-ghost disappeared while the first touch and the second touch remained detected;

determining whether the disappearance time exceeds a continuity threshold; and in response to determining that the disappearance time fails to exceed the continuity threshold, associating the first touch and the second touch with the common touch entity within the disappearance time.

40. A method, comprising:
receiving a first sense signal indicating a first touch attributed to a first touch entity;
receiving a second sense signal indicating a second touch attributed to a second touch entity;
based on the first sense signal and second sense signal, determining that the first touch entity and the second touch entity are a common touch entity and share an anti-ghost;
in response to determining that the first touch entity and the second touch entity form a common touch entity, initiating an event; and
wherein determining that the first touch entity and the second touch entity are a common touch entity further comprises:
determining that the first touch occurs prior to the second touch and is maintained on the touch surface such that the first touch is concurrent with the second touch; and
determining whether occurrence of the second touch coincided with a signal strength drop for the first touch;
in response to determining that the occurrence of the second touch coincided with a signal strength drop for the first touch, associating the first touch and the second touch with the common touch entity; and
in response to determining that the occurrence of second touch failed to coincide with a signal strength drop for the first touch, associating the first touch with a first touch entity and the second touch a second touch entity different from the first touch entity.

41. The method of claim 40, wherein the event comprises transferring a virtual object from the first touch entity to the second touch entity.

42. The method of claim 40, wherein the event comprises assigning a designation of the first touch entity to the second touch entity.

43. The method of claim 40, further comprising:
based on the first sense signal and second sense signal, determining that the first touch entity and the second touch entity have stopped forming a common touch entity; and
in response to determining that the first touch entity and the second touch entity have stopped forming a common touch entity, initiating a second event.

44. The method of claim 43, wherein the second event comprises maintaining an association of the first touch entity and the second touch entity after the first touch entity and second touch entity separate.

45. The method of claim 44, further comprising:
receiving a third sense signal indicating a third touch attributed to a third touch entity;
based on the third sense signal and second sense signal, determining that the third touch entity and the second touch entity form a second common touch entity; and
in response to determining that the third touch entity and the second touch entity form a common touch entity, initiating a third event.

46. A system, comprising:
a memory; and
at least one processor coupled to the memory and configured to:
receive a first sense signal indicating a first touch attributed to a first touch entity;
receive a second sense signal indicating a second touch attributed to a second touch entity;
based on the first sense signal and second sense signal, determine that the first touch entity and the second touch entity are a common touch entity and share an anti-ghost;
in response to determining that the first touch entity and the second touch entity form a common touch entity, initiate an event; and
wherein to determine that the first touch entity and the second touch entity are a common touch entity, the process is further configured to:
determine that the first touch occurs prior to the second touch and is maintained on the touch surface such that the first touch is concurrent with the second touch; and
determine whether occurrence of the second touch coincided with a signal strength drop for the first touch;
in response to determining that the occurrence of the second touch coincided with a signal strength drop for the first touch, associate the first touch and the second touch with the common touch entity; and
in response to determining that the occurrence of second touch failed to coincide with a signal strength drop for the first touch, associate the first touch with a first touch entity and the second touch a second touch entity different from the first touch entity.

47. The system of claim 46, wherein the event comprises transferring a virtual object from the first touch entity to the second touch entity.

48. The system of claim 46, wherein the event comprises assigning a designation of the first touch entity to the second touch entity.

49. The system of claim 46, the at least one processor further configured to:
based on the first sense signal and second sense signal, determine that the first touch entity and the second touch entity have stopped forming a common touch entity; and
in response to determining that the first touch entity and the second touch entity have stopped forming a common touch entity, initiate a second event.

50. The system of claim 49, wherein the second event comprises maintaining an association of the first touch entity and the second touch entity after the first touch entity and second touch entity separate.

51. The system of claim 50, the at least one processor further configured to:
receive a third sense signal indicating a third touch attributed to a third touch entity;
based on the third sense signal and second sense signal, determine that the third touch entity and the second touch entity form a second common touch entity; and
in response to determining that the third touch entity and the second touch entity form a common touch entity, initiate a third event.

52. A non-transitory, tangible computer-readable device having instructions stored thereon that, when executed by at least one computing device, causes the at least one computing device to perform operations comprising:
receiving a first sense signal indicating a first touch attributed to a first touch entity;
receiving a second sense signal indicating a second touch attributed to a second touch entity;
based on the first sense signal and second sense signal, determining that the first touch entity and the second touch entity are a common touch entity and share an anti-ghost;
in response to determining that the first touch entity and the second touch entity form a common touch entity, initiating an event; and
wherein the determining that the first touch entity and the second touch entity are a common touch entity comprising:
determining that the first touch occurs prior to the second touch and is maintained on the touch surface such that the first touch is concurrent with the second touch; and
determining whether occurrence of the second touch coincided with a signal strength drop for the first touch;
in response to determining that the occurrence of the second touch coincided with a signal strength drop for the first touch, associating the first touch and the second touch with the common touch entity; and
in response to determining that the occurrence of second touch failed to coincide with a signal strength drop for the first touch, associating the first touch with a first touch entity and the second touch a second touch entity different from the first touch entity.

* * * * *